United States Patent
Hori et al.

(10) Patent No.: US 7,010,809 B2
(45) Date of Patent: Mar. 7, 2006

(54) REPRODUCTION DEVICE STOPPING REPRODUCTION OF ENCRYPTED CONTENT DATA HAVING ENCRYPTED REGION SHORTER THAN PREDETERMINED LENGTH

(75) Inventors: Yoshihiro Hori, Gifu (JP); Takatoshi Yoshikawa, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 828 days.

(21) Appl. No.: 09/948,569

(22) Filed: Sep. 10, 2001

(65) Prior Publication Data

US 2002/0131594 A1 Sep. 19, 2002

(30) Foreign Application Priority Data

Mar. 13, 2001 (JP) .............................. 2001-070085

(51) Int. Cl.
*G06F 11/30* (2006.01)
*G06F 12/14* (2006.01)
*H04L 9/00* (2006.01)
*H04L 9/32* (2006.01)
*H04N 7/167* (2006.01)

(52) U.S. Cl. ....................................... 726/26; 380/201
(58) Field of Classification Search ................ 380/200; 713/26, 30

See application file for complete search history.

(56) References Cited

U.S. PATENT DOCUMENTS

| 5,805,700 A | * | 9/1998 | Nardone et al. ............. 380/217 |
| 5,951,648 A | * | 9/1999 | Kailash ....................... 709/237 |
| 2002/0016919 A1 | * | 2/2002 | Sims ........................... 713/193 |

FOREIGN PATENT DOCUMENTS

| JP | 2000-047987 | 2/2000 |
| JP | 2000-261483 | 9/2000 |
| JP | 2002-007234 | 1/2002 |

* cited by examiner

*Primary Examiner*—Gregory Morse
*Assistant Examiner*—Peter Poltorak
(74) *Attorney, Agent, or Firm*—Westerman, Hattori, Daniels & Adrian, LLP

(57) ABSTRACT

A controller of a reproduction terminal determines whether a block read from a memory card is an encrypted block or a non-encrypted block, and then applies the read block to a content decrypting circuit. The controller stops supplying the block to the content decrypting circuit when a predetermined number of non-encrypted blocks are continuously read from the memory card. Consequently, reproduction of the encrypted content data can be stopped if the encrypted content data includes a continuous non-encrypted portion in which the number of non-encrypted blocks is equal to or larger than a predetermined non-zero number.

21 Claims, 37 Drawing Sheets

FIG.3

| SYMBOL | TYPE | ATTRIBUTE | CHARACTERISTIC |
|---|---|---|---|
| Dc | CONTENT DATA | UNIQUE TO CONTENTS | EX.: MUSIC DATA, RECITAL DATA, EDUCATIONAL DATA, IMAGE DATA ENCRYPTED CONTENT DATA DECRYPTABLE WITH Kc DISTRIBUTED AS {Dc}Kc AND HELD IN MEMORY CARD |
| Dc-inf | ADDITIONAL INFORMATION | UNIQUE TO CONTENTS | PLAINTEXT DATA RELATED TO Dc |
| Kc | LICENSE | UNIQUE TO CONTENTS | LICENSE DECRYPTION KEY FOR DECRYPTING ENCRYPTED CONTENT DATA |
| ACm/ACp | LICENSE | UNIQUE TO LICENSE | RESTRICTION INFORMATION RESTRICTIONS ON REPRODUCTION AND LICENSE HANDLING |
| TRANSACTION ID | LICENSE | UNIQUE TO LICENSE | ADMINISTRATION CODE FOR IDENTIFYING DISTRIBUTION |
| CONTENT ID | LICENSE | UNIQUE TO CONTENTS | ADMINISTRATION CODE FOR IDENTIFYING CONTENTS |
| LICENSE ID | LICENSE | UNIQUE TO LICENSE | GENERAL TERM OF TRANSACTION ID + CONTENT ID |
| LICENSE | LICENSE | UNIQUE TO LICENSE | GENERAL TERM OF Kc + ACm + ACp + LICENSE ID |
| CRL | CERTIFICATE REVOCATION LIST | COMMON TO SYSTEM | LIST OF INVALID CERTIFICATE DAT INCLUDING UPDATE DATA (CRLdate) OF CRL |

FIG.4

| | SYMBOL | TYPE | ATTRIBUTE | CHARACTERISTIC |
|---|---|---|---|---|
| DISTRIBUTION SERVER | KPa/KPb | PUBLIC AUTHENTICATION KEY | COMMON TO SYSTEM | KEY FOR DECRYPTING AUTHENTICATION DATA BY AUTHENTICATION STATION KPa FOR MEMORY CARD, KPb FOR LICENSE ADMINISTRATION MODULE |
| | Ks1 | SYMMETRIC KEY | UNIQUE TO SESSION | GENERATED FOR EACH LICENSE DISTRIBUTION TO MEMORY CARD, LICENSE ADMINISTRATION DEVICE AND LICENSE ADMINISTRATION MODULE |
| MEMORY CARD | KPa | PUBLIC AUTHENTICATION KEY | COMMON TO SYSTEM | KEY FOR DECRYPTING AUTHENTICATION DATA BY AUTHENTICATION STATION SAME AS KPa IN DISTRIBUTION SERVER |
| | KPmw | PUBLIC ENCRYPTION KEY | UNIQUE TO CLASS | STORED AS DECRYPTED AUTHENTICATION DATA IN AUTHENTICATION STATION TOGETHER WITH CERTIFICATE Cmw w IS IDENTIFIER FOR IDENTIFYING CLASS |
| | Kmw | PRIVATE DECRYPTION KEY | UNIQUE TO CLASS | ASYMMETRICAL DECRYPTION KEY FOR DECRYPTING DATA ENCRYPTED WITH PUBLIC ENCRYPTION KEY KPmw |
| | KPmcx | PUBLIC ENCRYPTION KEY | UNIQUE | UNIQUE TO EACH MEMORY CARD x IS IDENTIFIER FOR IDENTIFYING MODULE. |
| | Kmcx | PRIVATE DECRYPTION KEY | UNIQUE | ASYMMETRICAL DECRYPTION KEY FOR DECRYPTING DATA ENCRYPTED WITH PUBLIC ENCRYPTION KEY KPmcx |
| | Ks2 | SYMMETRIC KEY | UNIQUE TO SESSION | GENERATED FOR EACH LICENSE TRANSFER BETWEEN DISTRIBUTION SERVER AND CONTENT REPRODUCTION CIRCUIT |
| | Cmw | CERTIFICATE | CLASS CERTIFICATE | CLASS CERTIFICATE OF MEMORY CARD AND LICENSE ADMINISTRATION MODULE HAVING AUTHENTICATION FUNCTION RECORDED IN FORM OF {KPmw//Cmw}KPa OR {KPmw//Cmw}KPb WHEN SHIPPED * BEING DIFFERENT DEPENDING ON CLASS w OF MEMORY CARD AND LICENSE ADMINISTRATION MODULE |
| LICENSE ADMINISTRATION MODULE (SOFT TAMPER) | KPpy | PUBLIC ENCRYPTION KEY | UNIQUE TO CLASS | STORED AS AUTHENTICATION DATA DECRYPTED BY AUTHENTICATION AUTHORITY TOGETHER WITH CERTIFICATE Cmw y IS IDENTIFIER FOR IDENTIFYING CLASS |
| | Kpy | PRIVATE DECRYPTION KEY | UNIQUE TO CLASS | ASYMMETRICAL DECRYPTION KEY FOR DECRYPTING DATA ENCRYPTED WITH PUBLIC ENCRYPTION KEY KPpy |
| | Ks3 | SYMMETRIC KEY | UNIQUE TO SESSION | GENERATED FOR EACH REPRODUCTION SESSION OF BETWEEN MUSIC REPRODUCTION MODULE AND MEMORY CARD |
| CONTENT REPRODUCTION DEVICE | Cpy | CERTIFICATE | CLASS CERTIFICATE | CLASS CERTIFICATE OF CONTENT REPRODUCTION DEVICE, HAVING AUTHENTICATION FUNCTION RECORDED IN FORM OF {KPpy//Cpy}KPa WHEN SHIPPED * BEING DIFFERENT DEPENDING ON CLASS y OF CONTENT REPRODUCTION DEVICE |

FIG.21

REPRODUCTION TERMINAL (MEMORY CARD)

PERSONAL COMPUTER (LICENSE ADMINISTRATION MODULE)

FROM S622

RECEIVE DUMMY TRANSACTION ID//[Ks22]Km3 — S624

RECEIVE AND DECRYPT [Ks22]Km3 WITH Km3 TO RECEIVE Ks22 — S626

GENERATE SESSION KEY Ks2 — S628

OBTAIN CRLdate FROM CRL IN MEMORY — S630

ENCRYPT Ks2, KPmc4 AND CRLdate WITH Ks22, AND SEND [Ks2//KPmc4//CRLdate]Ks22 — S632

RECEIVE [Ks2//KPmc4//CRLdate]Ks22 — S634

DECRYPT [Ks2//KPmc4//CRLdate]Ks22 WITH Ks22, AND ACCEPT Ks2, KPmc4 AND CRLdate — S636

KPmc4 CHECK-OUT? INFORMATION — S638

No → TO S670

Yes

ENCRYPT DUMMY TRANSACTION ID, DUMMY CONTENT ID, DUMMY Kc, DUMMY ACm AND DUMMY ACp WITH KPmc4, AND GENERATE [DUMMY TRANSACTION ID//DUMMY CONTENT ID//DUMMY Kc//DUMMY ACm//DUMMY ACp]Kmc4 — S640

ENCRYPT [DUMMY TRANSACTION ID//DUMMY CONTENT ID//DUMMY Kc//DUMMY ACm//DUMMY ACp]Kmc4 WITH Ks2, AND SEND [[DUMMY TRANSACTION ID//DUMMY CONTENT ID//DUMMY Kc//DUMMY ACm//DUMMY ACp]Kmc4]Ks2 — S642

RECEIVE [[DUMMY TRANSACTION ID//DUMMY CONTENT ID//DUMMY Kc//DUMMY ACm//DUMMY ACp]Kmc4]Ks2 — S644

TO S646

REPRODUCTION DEVICE STOPPING REPRODUCTION OF ENCRYPTED CONTENT DATA HAVING ENCRYPTED REGION SHORTER THAN PREDETERMINED LENGTH

BACKGROUND OF THE INVENTION

1. Field of the Invention

The present invention relates to a reproduction device for decrypting and reproducing encrypted data obtained by a data distribution system, which can secure a copyright relating to copied information.

2. Description of the Background Art

By virtue of the progress in information communication networks and the like such as the Internet in these few years, each user can now easily access network information through individual-oriented terminals employing a cellular phone or the like.

In such information communication, information is transmitted through digital signals. It is now possible to obtain copied music and video information transmitted via the aforementioned information communication network without degradation in the audio quality and picture quality of the copy data, even in the case where an individual user performs the copy.

Thus, there is a possibility of the copyright of the copyright owner being significantly infringed unless some appropriate measures to protect copyrights are taken when any content data subject to copyright protection such as music data and image data is to be transmitted on the information communication network.

However, if copyright protection is given top priority so that distribution of content data through the disseminating digital information communication network is suppressed, the copyright owner who can essentially collect a predetermined copyright royalty for copies of a copyrighted work will also incur some disbenefit.

Instead of the distribution over the digital information communication network described above, distribution may be performed via record mediums storing digital data. In connection with the latter case, music data stored in CDs (compact disks) on the market can be freely copied in principle into magneto-optical disks (e.g., MDs) as long as the duplication is only for the personal use. However, a personal user performing digital recording or the like indirectly pays predetermined amounts in prices of the digital recording device itself and the medium as guaranty moneys to a copyright holder.

However, the music data is digital data, which does not cause deterioration of information when it is copied as digital signals from a CD to an MD. Therefore, for the copyright protection, such structures are employed that the music information cannot be copied as digital data from the recordable MD to another MD.

In view of the above, the public distribution itself of the music data and image data over the digital information communication network is restricted by the public transmission right of the copyright holder, and therefore sufficient measures must be taken for the copyright protection.

For the above case, it is necessary to inhibit unauthorized further duplication of the content data such as music data or image data, which was once distributed to the public over the information communication network.

Such a data distribution system has been proposed that a distribution server holding the encrypted content data distributes the encrypted content data to memory cards attached to terminal devices such as cellular phones via the terminal devices. In this data distribution system, a public encryption key of the memory card, which has been authenticated by an authentication station, and its certificate are sent to the distribution server when requesting the distribution of encrypted content data. After the distribution server determines the reception of the authenticated certificate, the encrypted content data and a license key for decrypting the encrypted content data are sent to the memory card. When distributing the encrypted content data and the license key, the distribution server and the memory card generate a session key, which is different from those generated in other distribution. With the session key thus generated, the public encryption key is encrypted, and the keys are exchanged between the distribution server and the memory card.

Finally, the distribution server sends the license key, which is encrypted with the public encryption key unique to each memory card, and is further encrypted with the session key, as well as the encrypted content data to the memory card. The memory card records the license key and the encrypted content data thus received in a memory.

When the encrypted content data recorded in the memory card is to be reproduced, the memory card is attached to the reproduction terminal. In addition to an ordinary function of the telephone, the reproduction terminal has a dedicated circuit for decrypting the encrypted content data sent from the memory card, and reproducing it for external output. Owing to this circuit, use as the reproduction terminal can be achieved.

As described above, the user of the cellular phone can receive the encrypted content data from the distribution server via the cellular phone, and can reproduce the encrypted content data.

In another manner, encrypted content data is distributed over the internet to personal computers. For distributing the encrypted content data to the personal computers, software installed in the personal computer is used for distributing the encrypted content data.

Music CDs storing music data are very popular, and ripping is performed for obtaining the music data from music CDs. The ripping generates encrypted music data (encrypted content data) from the music data and a license key for decrypting and reproducing the encrypted music data. In this ripping, the content data is encrypted for inhibiting free duplication of the content data obtained by the ripping.

As described above, the music data is distributed as the encrypted content data. It is preferable that the encrypted content data to be distributed is entirely encrypted, as is done in encrypted content data 90 shown in FIG. 37. However, encrypted content data 91, which is prepared by partially encrypting the content data, may be distributed in practical systems. Thus, encrypted regions 911 and non-encrypted regions 912 are mixed in encrypted content data 91 to be distributed.

Encryption and decryption of encrypted content data 90 and 91 are performed by a reproduction terminal 900 shown in FIG. 38.

Reproduction terminal 900 includes a controller 901, a memory card interface 902, a content decrypting circuit 903 and a decoder 904. Controller 901 obtains encrypted content data 91 from memory card 910 via memory card interface 902 for each block, and applies the same to content decrypting circuit 903 via a bus BS6. Memory card interface 902 controls transmission between bus BS6 and memory card 910. When content decrypting circuit 903 receives the encrypted content data, it decrypts the encrypted content data with a license key, and sends it to decoder 904. When plaintext of content data is received, content decrypting circuit 903 outputs the content data to decoder 904. Decoder 904 decodes the content data sent from content decrypting circuit 903, and converts the content data thus decoded from digital signals to analog signals for outputting it to an external output device such as headphones (not shown). Memory card 910 holds encrypted content data 91 divided into a plurality of blocks as well as the license key.

Reproduction terminal 900 reproduces the encrypted content data in accordance with a flowchart of FIG. 39. Referring to FIG. 39, when the operation starts, controller 901 obtains the license key from memory card 910 via memory card interface 902 and bus BS6 (step S1000), and supplies it to content decrypting circuit 903 (step S1001). Controller 901 obtains all the blocks of the encrypted content data from memory card 910 block by block in accordance with the order of reproduction, and supplies them to content decrypting circuit 903. Thereafter, controller 901 determines whether all the blocks forming the encrypted content data are completely obtained from memory card 910 or not (step S1002). If the obtaining of all the blocks has ended, the reproduction operation ends (step S1006). When it is determined in step S1002 that the obtaining of all the blocks has not ended, controller 901 reads out one block from memory card 910 via memory card interface 902 (step S1003), and outputs the block thus read to content decrypting circuit 903 via bus BS6 (step S1004). Content decrypting circuit 903 makes determination on the respective blocks forming the encrypted content data thus supplied in accordance with the order of supply, and more specifically determines whether each block is encrypted or not. If encrypted, the encrypted content data is reproduced by decrypting it with the license key supplied in step S1001. If not encrypted, content decrypting circuit 903 reproduces it as it is. Content decrypting circuit 903 sends a data request to controller 901 so that the following blocks may be supplied thereto in accordance with the timing allowing continuous reproduction.

Controller 901 determines whether data request from content decrypting circuit 903 is present or not (step S1005), and repeats this determining operation until the data request is issued. When content decrypting circuit 903 issues the data request, the operation moves to step S1002, and steps S1002–S1005 are repeated until the end of reproduction of encrypted content data. In this manner, reproduction terminal 900 in the prior art obtains the encrypted content data a block from memory card 910 and reproduces it.

However, the method of reproducing the encrypted content data by the conventional reproduction terminal suffers from such a problem that even the non-encrypted content data formed of only the non-encrypted blocks can be reproduced, and the user can reproduce the content data, which is prepared by free duplication and/or processing without taking any measures for copyright protection. This means the free reproduction of original music data, which is not encrypted. When the original music data in the music CD or the like is freely duplicated and taken into another medium, device or the like, this infringes the right of the copyright holder.

However, duplication for reasonable use by the user must be appropriately allowed, and it is necessary to provide a reproduction device for reproducing only the data, which is duplicated under predetermined rules securing the rights of the copyright holders. Likewise, it is necessary to allow reproduction of the music data, which is prepared under the predetermined rules, and is electronically distributed. In view of complimentary or promotional purposes or the like, it is desired to allows test-listen of a portion, which is formed of the continuous non-encrypted blocks, of the music data prepared based on the above rules before obtaining the license key and thus before paying a fee.

SUMMARY OF THE INVENTION

Accordingly, an object of the invention is to provide a reproducing device for stopping reproduction of encrypted content data having non-encrypted portions, which are continuous to each other, and are shorter than a predetermined length.

According to the invention, a reproducing device for decrypting and reproducing encrypted content data divided into a plurality of blocks formed of an encrypted block including encrypted data and a non-encrypted block including non-encrypted data, includes a decrypting circuit for detecting whether each of the plurality of blocks is the encrypted block or the non-encrypted block, and operating to decrypt the encrypted data and output the non-encrypted data in the case of the encrypted block and to output the non-encrypted data in the case of the non-encrypted block, and a control circuit, the control circuit receiving a result of detection in the decrypting circuit, and stopping application of the block to the decrypting circuit when the data included in the continuously detected non-encrypted blocks reaches a predetermined data length or more.

Preferably, the control circuit stops application of the block to the decrypting circuit when a predetermined number or more of the non-encrypted blocks are continuously detected.

Preferably, the control circuit stops application of the block to the decrypting circuit when a predetermined number or more of the non-encrypted blocks are continuously detected, or when only a predetermined number or less of the encrypted blocks are continuously detected.

Preferably, the control circuit stops application of the block to the decrypting circuit when a predetermined number or more of the non-encrypted blocks are continuously detected among a predetermined number of the blocks.

Preferably, the control circuit stops application of the block to the decrypting circuit when the non-encrypted blocks are continuously detected for a predetermined period.

Preferably, the control circuit stops application of the block to the decrypting circuit when the non-encrypted blocks are continuously detected for a first predetermined period, or when the encrypted blocks are continuously detected for a period equal to a second predetermined period.

Preferably, the control circuit stops application of the block to the decrypting circuit when the non-encrypted blocks detected for a predetermined period are equal to or larger than a predetermined value in number.

Preferably, each of the plurality of blocks includes a data region storing the encrypted data or the non-encrypted data, and a header region storing a first flag indicating the fact that the data region includes the encrypted data, or a second flag indicating the fact that the data region includes the non-encrypted data; and the decrypting circuit detects the first or second flag to detect whether each of the blocks is the encrypted block or the non-encrypted block.

Preferably, the encrypted content data is prepared by dividing the encoded content data, which is prepared by encoding source data in a predetermined encoding format, into a plurality of blocks, and selectively encrypting the blocks on the block-by-block basis; the reproducing device further includes a decoder for decoding the encoded content data in accordance with the predetermined encoding format and reproducing the source data; and the decrypting circuit includes a header detection unit for detecting the header region from each of the plurality of blocks, outputting a first signal when the first flag is recorded in the detected header region, outputting a second signal when a second flag is recorded in the header region, and outputting the encrypted data or the non-encrypted data included in each of the blocks, a decryption unit for decrypting the encrypted data and outputting the non-encrypted data, and a selection unit for selecting the non-encrypted data sent from the decryption unit in accordance with the first signal for output to the decoder, and selecting the non-encrypted data in accordance with the second signal for output to the decoder.

Preferably, the decrypting circuit further includes a delay unit for delaying the non-encrypted data in the data region output from the header detection unit, and the delay unit delays the non-encrypted data by a time corresponding to a decrypting time of the encrypted content data in the decryption unit.

Preferably, the encrypted content data and a license key for decrypting the encrypted content data are recorded in a data recording device; and the control circuit reads the license key from the data record device for applying the same to the decrypting circuit, and reads one block from the data recording device for applying the same to the decrypting circuit upon every reception of an input request for each block from the decrypting circuit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows characteristics of data, information and others for communication in the data distribution systems shown in FIGS. 1 and 2;

FIG. 4 shows characteristics of data, information and others for communication in the data distribution systems shown in FIGS. 1 and 2;

FIGS. 20–22 are first to third flowcharts showing a check-in operation for the license of the encrypted content data in the data distribution systems shown in FIGS. 1 and 2, respectively;

DESCRIPTION OF THE PREFERRED EMBODIMENTS

Embodiments of the invention will now be described with reference to the drawings. The same or similar parts or portions bear the same reference numbers in the figures, and description thereof will not be repeated.

Figure 1:
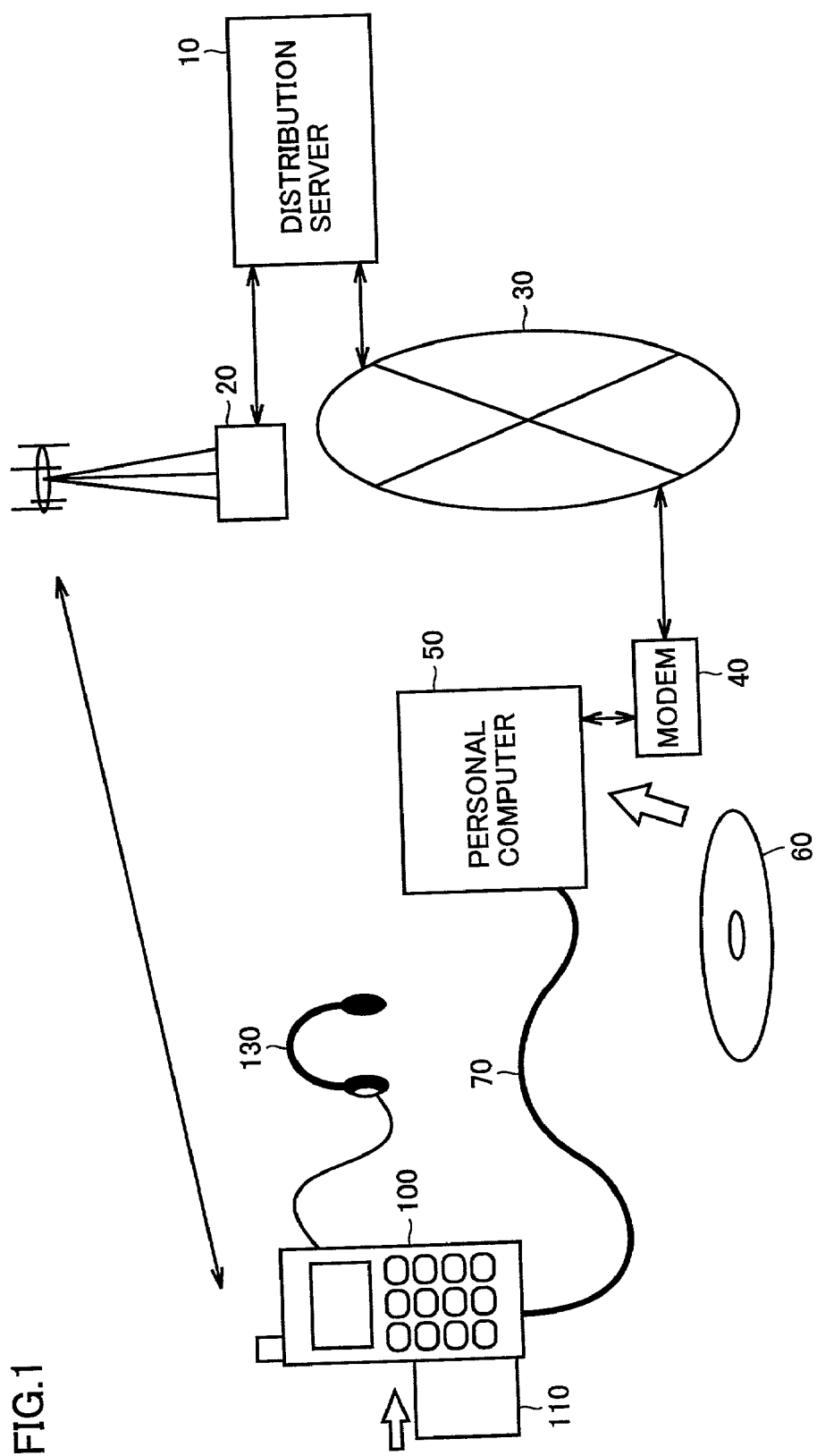
FIG. 1 is a schematic diagram showing a concept of a data distribution system.

FIG. 1 is a schematic diagram showing a concept of a whole structure of a data distribution system, from which encrypted content data is obtained by a cellular phone provided with a music reproducing function according to the invention.

Description will now be given by way of example on a data distribution system distributing digital music data to a memory card 110 of each user via a cellular phone network will be described as an example, and a data distribution system distributing digital music data to personal computers on the internet. However, as will become apparent from the following description, the present invention is not limited to such a case. The present invention is applicable to the distribution of other copyrighted materials, i.e., content data such as video data, image data, text data and programs, and further applicable.

Referring to FIG. 1, a distribution carrier 20 relays a distribution request, which is sent from a user over a cellular phone network, to a distribution server 10. Distribution server 10, which administers the copyrighted music data, determines whether memory card 110 on cellular phone 100 of the user requesting the data distribution has proper or legal authentication data or not, and thus whether memory card 110 is a legal memory card or not. If legal, the music data, which will be referred to also as "content data" hereinafter, will be distributed to the legal memory card by distribution carrier 20, i.e., the cellular phone company after being encrypted in a predetermined encryption manner. For this distribution, distribution carrier 20 is supplied from distribution server 10 with the encrypted content data as well as a license including a license key for decrypting the encrypted content data as information, which is required for reproducing the encrypted content data.

Distribution carrier 20 sends the encrypted content data and the license via the cellular phone network and cellular phone 100 to memory card 110 attached to cellular phone 100, which sent the distribution request over its own cellular phone network.

In FIG. 1, memory card 110 is releasably attached to cellular phone 100 of the user. Memory card 110 receives the encrypted content data received by cellular phone 100, applies decryption on the above encryption, and then provides the decrypted data to music reproduction unit (not shown) in cellular phone 100.

The cellular phone user, for example, can "reproduce" the content data to listen to the music via headphones 130 or the like connected to cellular phone 100.

By such a structure, any user cannot receive the distribution data from distribution server 10 for reproducing the music without memory card 110.

By taking count of the number of times content data of, for example, one song, is distributed in distribution carrier 20, the copyright royalty fee induced every time a user receives (downloads) content data distribution can be collected by distribution carrier 20 in the form of telephone bills of respective cellular phones. Thus, the royalty fee of the copyright owner can be ensured.

In FIG. 1, a personal computer 50 is equipped with a license administration module, which is a kind of administration tool configured to secure the copyright. A user of personal computer 50 utilizes the license administration module for sending a request of distribution of the content data. Distribution server 10 receives over internet network 30 and modem 40 the distribution request from the user of personal computer 50. Thereby, distribution server 10 determines whether personal computer 50 accessing thereto for data distribution uses software provided with the license administration module having proper authentication data or not, and thus whether the legal license administration module is used or not. If the proper license administration module is used, the personal computer is supplied over internet network 30 and model 40 with the encrypted content data, which is prepared by encrypting music data in a predetermined manner, as well as the license. The license administration module of personal computer 50 records the received encrypted content data on a hard disk (HDD) or the like as it is, and also records the received license on the HDD after encrypting it for protection.

In FIG. 1, personal computer 50 uses the license administration module to generate the encrypted content data, which is restricted to local use, from the music data obtained from a music CD (Compact Disk) 60 storing the music data as well as a license for reproducing the encrypted content data. This processing is referred to as "ripping" corresponds to an operation of duplicating the content data from the music CD and generates the encrypted content data and the license. Handling of the encrypted content data by the ripping is restricted in view of its features. The ripping will be described later in greater detail.

Further, personal computer 50 is coupled to cellular phone 100 via a USB (Universal Serial Bus) cable 70, and can transmits the encrypted content data and the license to and from memory card 110 on cellular phone 100, as will be described later in greater detail.

In FIG. 1, personal computer 50 may further has a function of reproducing the encrypted content data, which is directly administered by the license administration module, by using the license administration module. The specific manner of reproduction by the personal computer is similar to that of reproduction by cellular phone 100, and therefore description thereof is not repeated.

In the data distribution system shown in FIG. 1, personal computer 50 receives the encrypted content data and the license via modem 40 and over internet network 30 from distribution server 10, and also obtains the encrypted content data and the license from the music CD. Memory card 110 attached to cellular phone 100 receives the encrypted content data and the license over the cellular phone network from distribution server 10, and also receives the encrypted content data and the license, which are obtained from distribution server 10 or music CD 60 by personal computer 50. The user of cellular phone 100 can obtain the encrypted content data and the license from the music CD by utilizing personal computer 50 between them.

Memory card 110 attached to cellular phone 100 can save the encrypted content data and the license, which are received from distribution server 10 over the cellular phone network, in personal computer 50.

Figure 2:
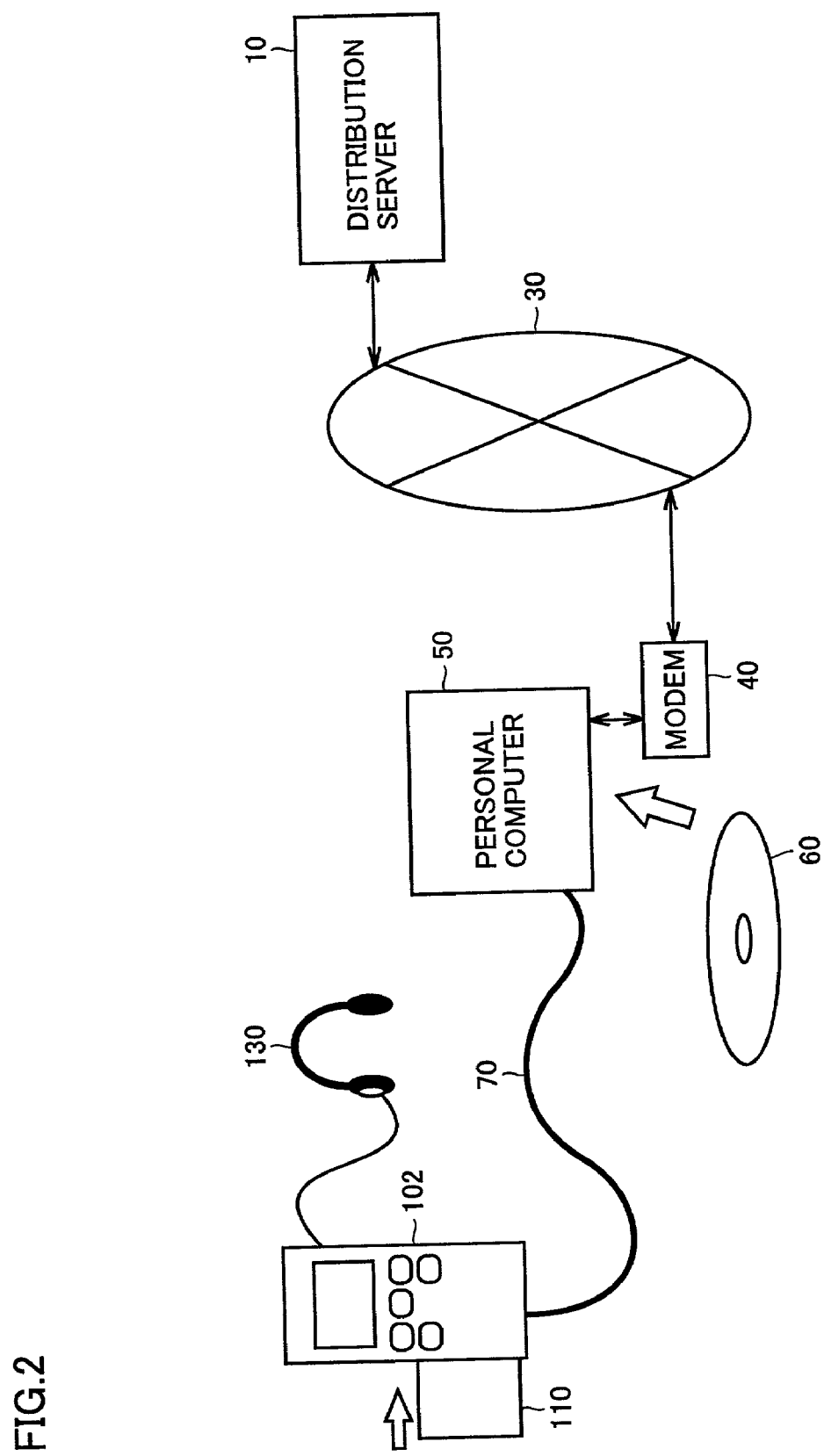
FIG. 2 is a schematic view showing a concept of another data distribution system.

FIG. 2 shows a data distribution system using a reproduction terminal 102, which does not have a function of receiving the encrypted content data and the license from distribution server 10 over the cellular phone network. In the data distribution system shown in FIG. 2, memory card 110 attached to reproduction terminal 102 receives the encrypted content data and the license, which are obtained from distribution server 10 or music CD 60 by personal computer 50. Since personal computer 50 obtains the encrypted content data and the license, even the user of reproduction terminal 102 not having a communication function can receive the encrypted content data.

In the structures shown in FIGS. 1 and 2, the system requires several manners or the like for allowing reproduction of the content data, which is distributed in the encrypted form, on the user side of the cellular phone or the personal computer. First, it requires a manner for distributing the license key in a communication system. Second, the manner of encrypting the content data to be distributed is required. Third, it is required to employ the manner or structure of protecting the license key for inhibiting unauthorized copy, in a format allowing reproduction, of the distributed content data.

Embodiments of the invention, which will now be described, particularly relate to structures for enhancing the ability to protect the copyright of the content data in such a manner that can enhance functions for authentication and check of a receiver or a destination of the content data at the time of generation of each of the distribution session and reproduction session, and can prevent from outputting the content data to an unauthenticated record device or data reproduction terminal (the data reproduction terminal capable of content reproduction may also be referred to as the "cellular phone" or "personal computer" hereinafter) as well as the record device or data reproduction terminal, in which the decryption key is broken.

In the following description, transmission of the content data from distribution server 10 to various cellular phones, personal computers and others will be referred to as "distribution" hereinafter.

FIG. 3 shows characteristics of data, information and others used for communication in the data distribution systems shown in FIGS. 1 and 2;

First, data distributed from distribution server 10 will be described. Dc indicates the content data such as music data. Content data Dc is encrypted and can be decrypted with a license key Kc. Encrypted content data {Dc}Kc, which can be decrypted with license key Kc, is distributed by distribution server 10 to users of the cellular phones or personal computers while keeping this format.

In the following description, the expression "{Y}X" represents that data Y is encrypted to allow decryption with decryption key X.

Together with the encrypted content data, distribution server 10 distributes additional information Dc-inf, which is plaintext information relating, e.g., to copyright of the content data or server access. As licenses, license key Kc as well as a transaction ID, which is an administration code for specifying the distribution of the license key or the like from distribution server 10, are transmitted between distribution server 10 and cellular phone 100, or between distribution server 10 and personal computer 50. The transaction ID is used also for specifying the license, which is not distributed, and thus the license generated for the purpose of local use by ripping or the like. For distinguishing between the license to be distributed license and that for local use, the transaction ID bear "0" at its leading end for indicating the local use. The transaction ID bearing the number other than "0" at its leading end is used by distribution. The licenses further include a content ID, which is a code for identifying content data Dc, an access control information ACm, which is information relating to restriction at the time of access to the license in the memory card or license administration module, reproduction control information ACp, which is control information for reproduction in the data reproduction terminal, and others. Access control information ACm and reproduction control information ACp are generated based on license purchase conditions AC including the number of licenses, which is determined by designation from the user side, restriction on functions and others. More specifically, access control information ACm is the control information for externally outputting the license or license key from the memory card or the license administration module, and includes an allowed reproduction number (the number of times of license key output for reproduction), and restriction information relating to the transfer and duplication of the licenses. Reproduction control information ACp is used for restricting reproduction after the content reproduction circuit receives the license key for reproduction, and relates to the reproduction time limit, reproduction speed change restriction, reproduction range designation (partial license) and others.

In the following description, the transaction ID and the content ID will be collectively referred to as the license ID, and license key Kc, license ID, access control information ACm and reproduction control information ACp will be collectively referred to as the license.

In the following description, access control information ACm restricts, for simplicity reason, only the two items, i.e., the number of reproduction times (0: no reproduction, 1-254: allowed reproduction number, 255: no limit), which is the control information for restricting the reproduction time(s), and the transfer/duplication flag (0: transfer/duplication are inhibited, 1: only transfer is allowed, 2: transfer/duplication are allowed), which can restrict the transfer and duplication of the license. For the same reason, reproduction control information ACp restricts only the reproduction period (UTC time code), which is the control information specifying the period allowing reproduction.

In the embodiments, a certificate revocation list CRL is operated so that the distribution and reproduction of the content data can be inhibited for each of the classes of the record devices (memory cards or license administration modules) or the cellular phones reproducing the content data. In the following description, the symbol CRL may represent the data in the certificate revocation list, if necessary.

The information relating to the certificate revocation list includes certificate revocation data CRL including a list of classes of the cellular phone, memory card and the license administration modules on the personal computer, which are inhibited from the license distribution and the reproduction. This list includes all the devices and programs for performing the administration and storage of the licenses relating to protection of the content data as well as the reproduction.

Certificate revocation data CRL is administered in distribution server 10. Further, certificate revocation data CRL is administered and held in the memory card by a license administration device. The certificate revocation list must be updated at appropriate times. For the change in data, distribution server 10 determines the date/time of update of the certificate revocation list received from the cellular phone or the personal computer (license administration device or license administration module) when distributing the content data and/or the license such as a license key. When it is determined that the date/time of the received certificate revocation list are not earlier than those in the certificate revocation list CRL held thereby, the latest certificate revocation list is distributed to the cellular phone or personal computer. For changing the certificate revocation list, such a structure may be employed that a differential CRL, which is differential data reflecting only the addition, is generated on the distribution server side, and the change is added to certificate revocation list CRL in the memory card in accordance with the differential data thus generated. Update date/time CRLdate is also recorded in certificate revocation list CRL administered in the memory card or the license administration module.

As described above, certificate revocation list CRL is held and operated not only in the distribution server but also in memory card or the license administration module, which records and administers the license. Thereby, in the case of reproduction as well as the transfer, duplication and checkout of the license, supply of the license Key or license to the content reproducing device, the license administration device or the license administration module operating on the personal computer is inhibited when the decryption key unique to the class, i.e., the decryption key unique to the kind of the content reproducing device (cellular phone and reproduction terminal), the license administration device or the license administration module is broken. Therefore, the content reproducing device cannot reproduce the content data, and the license administration module of the memory card or the personal computer cannot newly obtain the license.

As described above, certificate revocation list CRL stored in the memory card or certificate revocation list CRL administered by the license administration module is configured to update the data in response to distribution. Administration of certificate revocation list CRL in the memory card is recorded independently of the higher level in a tamper resistant module ensuring security in hardware. Administration of certificate revocation list CRL in the license administration module is recorded on the HDD or the like of the personal computer, which is protected at least against tampering by the encryption. Therefore, it is impossible to tamper certificate revocation list CRL from the higher level such as a file system, application program or the like. As a result, the protection of copyright of the data can be enhanced.

FIG. 4 shows characteristics of data, information and others for authentication, which are used in the data distribution systems shown in FIGS. 1 and 2.

Each of the content reproduction circuit, memory card and license administration module is provided with a unique public encryption keys KPpy and KPmw. Public encryption key KPpy can be decrypted with a secret decryption key Kpy unique to the content reproduction circuit. Public encryption key KPmw can be decrypted with a secret decryption key Kmw unique to the memory card or the license administration module. These public encryption key and secret decryption key have values, which depend on the types of the content reproduction circuit, memory card and license administration module. These public encryption key and secret decryption key are collectively referred to as class keys. The public encryption key and the secret decryption key are referred to as the class public encryption key and the class secret decryption key, respectively. The unit, in which the class key is commonly used, is referred to as the class. The class depends on a manufacturer, a kind of the product, a production lot and others.

Cpy is employed as a class certificate of the content reproduction circuit (cellular phone or reproduction terminal). Cmw is employed as a class certificate of the memory card and the license administration module. These class certificates have information depending on the classes of the content reproduction circuit, memory card and license administration module. The tamper resistant module may be broken, or the encryption by the class key may be broken. The class, in which the secret decryption key is divulged in this manner, is listed up in the certificate revocation list, and is handled as the object or target, for which license obtaining is inhibited.

The class public encryption key and the class certificate of the content reproduction circuit are recorded as the authentication date {KPpy//Cpy}KPa in the content reproduction circuit at the time of shipment. The class public encryption key and the class certificate of the memory card are recorded as the authentication date {KPmw//Cmw}KPa in the memory card at the time of shipment. The class public encryption key and the class certificate of the license administration module are recorded as the authentication date {KPmw//Cmw}KPb in the license administration module at the time of shipment. As will be described later, KPa and KPb are public authentication keys, which are common to the whole distribution system. KPa is used when the security is ensured by hardware. KPb is used when the security is ensured by software.

The keys for administering data processing in memory card 110 and the license administration module include public encryption key KPmcx, which is set for each of the mediums and administration software such as a memory card and a license administration module, and also include secret decryption key Kmcx, which is independent of the others and allows decryption of data encrypted with public encryption key KPcmx. The public encryption key and the secret decryption key, which are unique to each memory card, will be collectively referred to as "unique keys" public encryption key KPmcx will be referred to as a "unique public encryption key" and secret decryption key Kmcx will be referred to as a "unique secret decryption key".

As encryption keys for security in data transmission, common keys Ks1–Ks3 are used. These common keys are generated in distribution server 10, content reproduction circuit (cellular phone 100 or reproduction terminal 102), memory card 110 and the license administration module every time the content data is distributed or reproduced.

Common keys Ks1–Ks3 are unique common keys, which are generated for each "session", which is the unit of access or communication between the distribution server and the content reproducing circuit, memory card or license administration module. These common keys Ks1–Ks3 will be referred to as "session keys", hereinafter.

These common keys Ks1–Ks3 have values unique to respective sessions, and are administered by the distribution server, the content reproduction circuit, memory card and license administration module. More specifically, session key Ks1 is generated for each distribution session by the distribution server. Session key Ks2 is generated for each distribution session and reproduction session by the memory card or the license administration module. Session key Ks3 is generated for each reproduction session in the content reproduction circuit. The level of security can be improved in each session by transferring these session keys and receiving the session key generated by another apparatus to perform encryption using the session keys and transmitting the license key and others.

Figure 5:
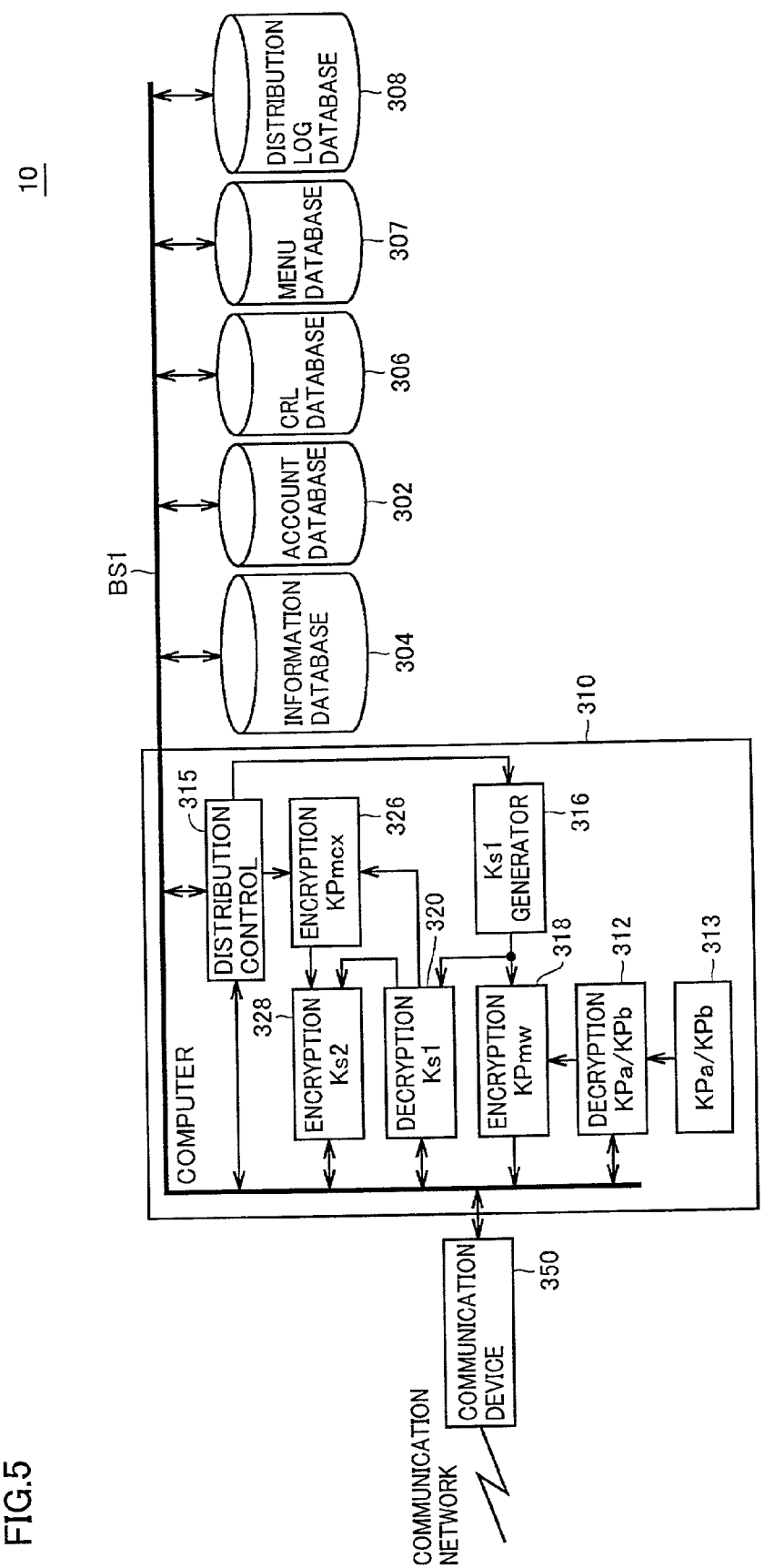
FIG. 5 is a schematic block diagram showing a structure of a distribution server in the data distribution systems shown in FIGS. 1 and 2.

FIG. 5 is a schematic block diagram showing a structure of distribution server 10 shown in FIGS. 1 and 2.

Distribution server 10 includes an information database 304 for storing content data encrypted according to a predetermined scheme as well as distribution data such as a content ID, an account database 302 for storing accounting information according to the start of access to content data for each of the users of the cellular phones and personal computers, a CRL database 306 for administering certificate revocation lists CRL, a menu database 307 for holding the menu of content data held in information database 304, a distribution log database 308 for holding a log relating to distribution of the transaction ID and others specifying the distribution of the content data, license key and others for each distribution of the license, a data processing unit 310 for receiving data via a bus BS1 from information database 304, account database 302, CRL database 306, menu database 307 and distribution log database 308, and performing predetermined processing, and a communication device 350 for transmitting/receiving data between distribution carrier 20 and data processing unit 310 over the communication network.

Figure 6:
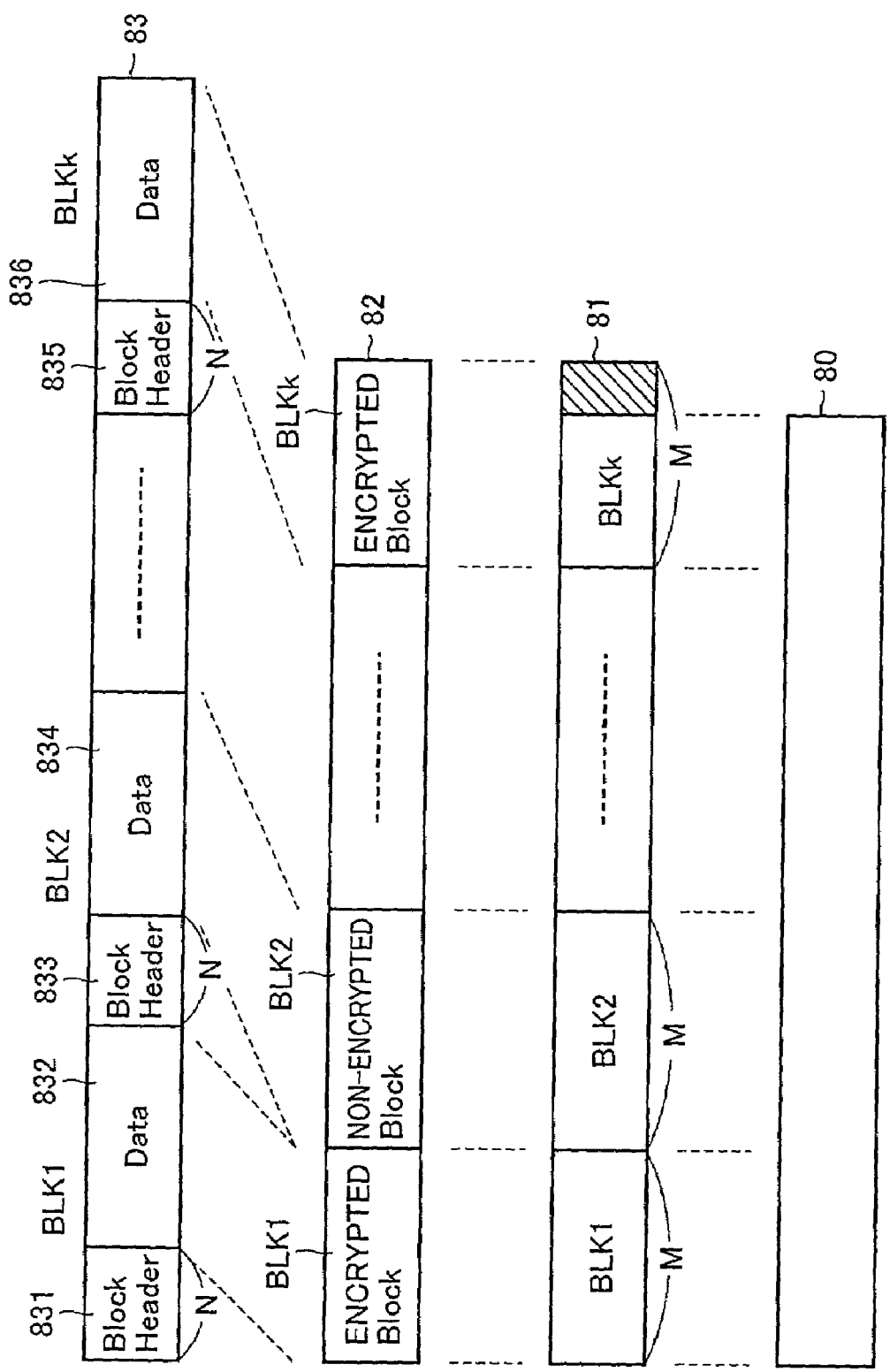
FIG. 6 conceptually shows a format of encrypted content data held in the distribution server shown in FIGS. 1 and 2.

Referring to FIG. 6, description will now be given on a format of the encrypted content data held in information database 304. Information database 304 holds encrypted content data {Dc}Kc83. Encrypted content data {Dc}Kc83 is generated as follows. Source data 80, which is plaintext of the content data, is divided into blocks BLK1, BLK2, . . .

BLKk of k in number (k: natural number) to produce block-form data 81. Each of blocks BLK1, BLK2, . . . BLKk has a size of M bytes. Last block BLKk has a portion (hatched portion), in which source data 80 is lacking. This portion is filled with dummy data to form the data block of M bytes. One or some of blocks BLK1, BLK2, . . . BLKk are encrypted to produce encrypted data 82. In the case shown in FIG. 6, blocks BLK1 and BLKk are encrypted, and block BLK2 is not encrypted. Thereafter, headers are added to respective blocks BLK1, BLK2, . . . BLKk to form encrypted content data {Dc}Kc83. Thus, block BLK1 is formed of a header 831 and encrypted data 832, block BLK2 is formed of a header 833 and encrypted data 834, and block BLKk is formed of a header 835 and encrypted data 836. Each of headers 831, 833 and 835 has a size of N bytes, and includes a scramble flag indicating whether the block is the encrypted block or the non-encrypted block. Each of headers 831, 833 and 835 includes "1" indicating the encrypted block or "0" indicating the non-encrypted block. In FIG. 6, headers 831 and 835 include scramble flags of "1", and header 833 includes a scramble flag of "0". Since the headers include the scramble flags indicating whether respective blocks BLK1, BLK2, . . . BLKk are encrypted or not, decryption and reproduction of encrypted content data {Dc}Kc83 can be stopped if a predetermined number or more of non-encrypted blocks are continuous to each other, or only a predetermined number or less of encrypted blocks are continuous to each other, as will be described later.

Referring to FIG. 5 again, data processing unit 310 includes a distribution control unit 315 for controlling an operation of data processing unit 310 in accordance with the data on bus BS1, a session key generation unit 316 which is controlled by distribution control unit 315 to generate session key Ks1 in the distribution session, an authentication key holding unit 313 holding two kinds of public authentication keys KPa and KPb for decrypting authentication data {KPmw//Cmw}KPa or {KPmw//Cmw}KPb sent for authentication from the memory card or the license administration module, a decryption processing unit 312 which receives authentication data {KPmw//Cmw}KPa or {KPmw//Cmw}KPb sent for authentication from the memory card or license administration module via communication device 350 and bus BS1, and decrypts it with public authentication key KPa or KPb output from authentication key holding unit 313, a session key generation unit 316 for generating session key Ks1, an encryption processing unit 318 which encrypts session key Ks1 generated by session key generation unit 316 with class public encryption key KPmw obtained by decryption processing unit 312, and outputting it onto bus BS1, and a decryption processing unit 320 for receiving and decrypting the data encrypted with session key Ks1.

Data processing unit 310 further includes an encryption processing unit 326 for encrypting license key Kc and access control information ACm, which are obtained from distribution control unit 315, with unique public encryption key KPmcx, which is obtained by decryption processing unit 320 and is unique to each of the memory card and license administration module, as well as an encryption processing unit 328 for further encrypting the output of encryption processing unit 326 with a session key Ks2 applied from decryption processing unit 320, and outputting it onto bus BS1.

Operations in the distribution session of distribution server 10 will be described later in greater detail with reference to flowcharts.

Figure 7:
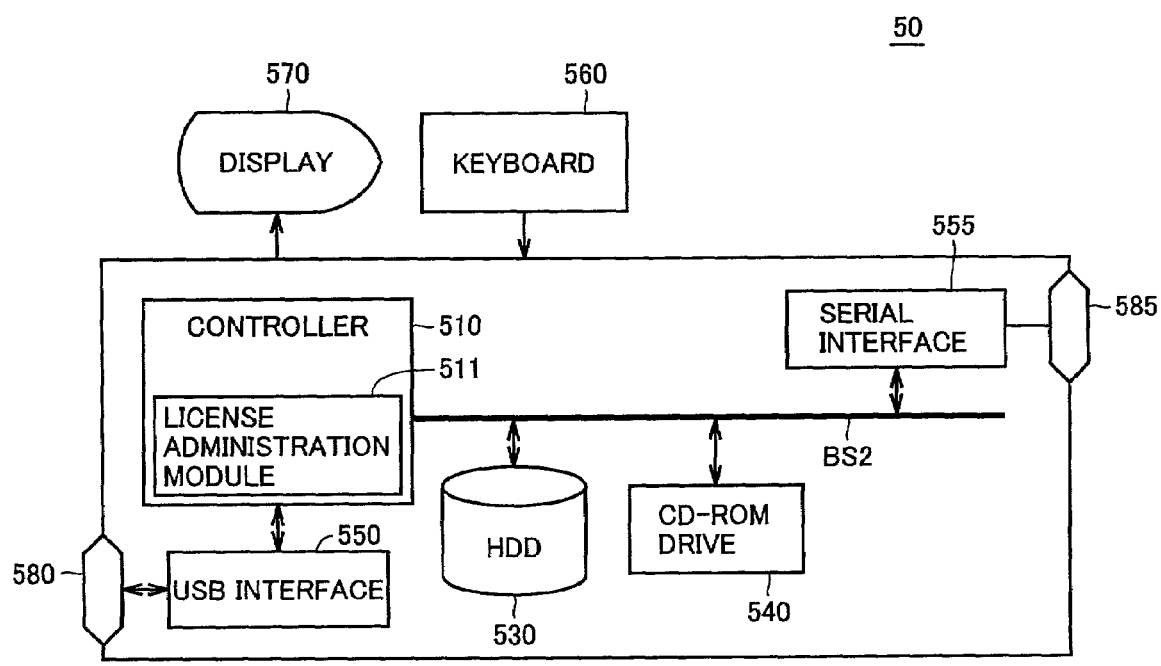
FIG. 7 is a schematic block diagram showing a structure of a personal computer in the data distribution systems shown in FIGS. 1 and 2.

FIG. 7 is a schematic block diagram showing a structure of personal computer 50 shown in FIGS. 1 and 2. Personal computer 50 includes a bus BS2 for data transmission to and from various portions in personal computer 50 and a controller (CPU) 510 for internally controlling the personal computer and executing various programs. Personal computer 50 also includes a hard disk (HDD) 530 and a CD-ROM drive 540, which are large-capacity storage devices connected to bus BS2 for recording and/or storing programs and/or data, as well as a keyboard 560 for entering user's instructions and a display 570 for visually showing various kinds of information to users.

Personal computer 50 further includes a USB interface 550 for controlling transmission of data between controller 510 and a terminal 580 during transmission of the encrypted content data and the license to or from cellular phone 100 or the like, terminal 580 for connecting USB cable 70, a serial interface 555 for controlling data transmission between controller 510 and a terminal 585 during communication of distribution server 10 over internet network 30 and modem 40, and terminal 585 for connection to modem 40 via a cable.

Controller 510 performs the control for sending the encrypted content data and others from distribution server 10 to license administration module 511 over internet network 30, and more specifically controls the transmission of data to and from distribution server 10. Also, controller 510 performs the control when the encrypted content data and the license are to be generated by ripping from a music CD via CD-ROM drive 540. Further, personal computer 50 includes license administration module 511, which is a program to be executed by controller 510 for performing administration when the encrypted content data and the license are to be received from distribution server 10, and more specifically, for administering the licenses used for transmitting various keys to and from distribution server 10 and reproducing the distributed encrypted content data.

License administration module 511 transmits the data for receiving the encrypted content data and the license from distribution server 10, and more specifically performs this data transmission by software using a program executed by controller 510. Also, license administration module 511 generates the encrypted content data and the license for local use by ripping from the, music CD. License administration module 511 stores and administers the license thus generated on HDD 530 after protecting it by encryption. This license administration may be entirely or partially performed by a device or the like, which performs the administration by hardware. The license administration module may have a content reproduction function of decrypting and reproducing the encrypted content data using the encrypted content data and the license.

As described above, personal computer 50 is internally provided with license administration module 511, which administers the encrypted content data and the license received from distribution server 10 over internet network 30, or administers the encrypted content data and the license generated by ripping from the music CD.

Figure 8:
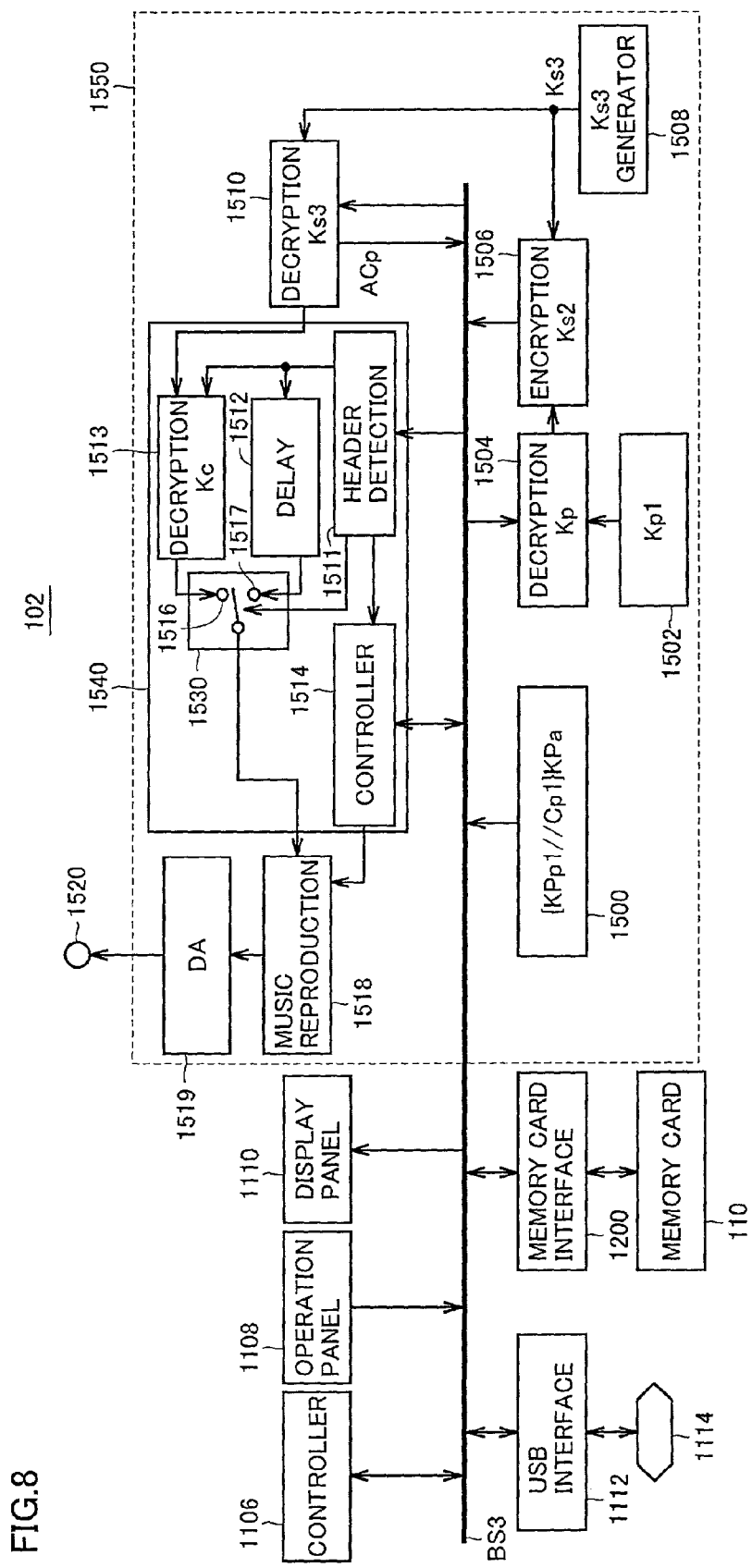
FIG. 8 is a schematic block diagram showing a structure of a reproduction terminal in the data distribution system shown in FIG. 2.

FIG. 8 is a schematic block diagram showing a structure of reproduction terminal 102 shown in FIG. 2.

Reproduction terminal 102 includes a bus BS3 for data transmission to various portions in reproduction terminal 102, a controller 1106 for controlling the operation of reproduction terminal 102 via bus BS3, an operation panel 1108 for externally applying instructions to reproduction terminal 102 and a display panel 1110 for displaying information sent from controller 1106 and others to the user.

Reproduction terminal 102 further includes removable memory card 110, which can store the encrypted content data (music data) and has an encryption processing function for protecting the license, a memory card interface 1200 for controlling transmission of data between memory card 110 and bus BS3, a USB interface 1112 for controlling data transmission between bus BS3 and a terminal 1114 when receiving the encrypted content data and the license from personal computer 50, and terminal 1114 for connecting USB cable 70.

Reproduction terminal 102 further includes an authentication data holding unit 1500 for holding authentication data {KPp1//Cp1}KPa encrypted into a state, which can authenticates the validity by class public encryption key KPp1 and class certificate Cp1 obtained by decryption with public authentication key KPa. The class y of reproduction terminal 102 is equal to 1 (y=1).

Reproduction terminal 102 further includes a Kp holding unit 1502 for holding Kp1, which is a decryption key unique to the class, and a decryption processing unit 1504, which decrypts the data received from bus BS3 with decryption key Kp1 to obtain session key Ks2 generated by memory card 110.

Reproduction terminal 102 further includes a session key generation unit 1508 for generating a session key Ks3, e.g., based on a random number for encrypting the data to be transmitted to and from memory card 110 via bus BS3 in the reproduction session, which is performed for reproducing the content data stored in memory card 110, and an encryption processing unit 1506, which encrypts session key Ks3 with session key Ks2 obtained by decryption processing unit 1504, and outputs it onto bus BS3 when receiving license key Kc and reproduction control information ACp from memory card 110 in the reproduction session of the encrypted content data.

Reproduction terminal 102 further includes a delay unit 1512 which delays the supplied content data by a time equal to the decrypting time of the encrypted data required in a decryption processing unit 1513, and decryption processing unit 1513 decrypting the supplied content data with license key Kc obtained by decryption processing unit 1510.

Reproduction terminal 102 further includes decryption processing unit 1510 decrypting the data on bus BS3 with session key Ks3 to output license key Kc and reproduction control information ACp, and a header detection unit 1511 receiving encrypted content data {Dc}Kc from bus BS3 in the form divided into blocks BLK1, BLK2, . . . BLKk. Header detection unit 1511 divides blocks BLK1, BLK2, . . . BLKk into headers 831, 833 and 835 and data 832, 834 and 836, respectively, and sends data 832, 834 and 836 to delay unit 1512 and decryption processing unit 1513. When headers 831, 833 and 835 contain the scramble flags of "1", header detection unit 1511 instructs switch 1530 to select a contact 1516, which is an output of decryption processing unit 1513. When the scramble flag is "0", header detection unit 1511 instructs switch 1530 to select a contact 1517, which is an output of delay unit 1512. Further, header detection unit 1511 outputs the result of determination of the scramble flag to controller 1514.

Reproduction terminal 102 further includes a controller 1514 controlling a music reproduction unit 1518, determining the possibility of reproduction based on the scramble flag sent from header detection unit 1511 and the possibility of reproduction based on reproduction control information ACp, stopping reproduction by music reproduction unit 1518 and outputting the result of determination to bus BS3, switch 1530 selecting the content data sent from terminal 1516 or 1517 based on the result of determination of the scramble flag sent from header detection unit 1511, and outputting the selected content data to music reproduction unit 1518, music reproduction unit 1518 for receiving the output of switch 1530 and reproducing the content data, a D/A converter 1519 for converting digital signals sent from the output of music reproduction unit 1518 into analog signals and a terminal 1520 for outputting the output of D/A converter 1519 to an external output device (not shown) such as headphones.

In FIG. 8, a region surrounded by dotted line provides a content reproduction circuit 1550 for reproducing the music data by decrypting the encrypted content data. A content decrypting circuit 1540 is formed of header detection unit 1511, delay unit 1512, decryption unit 1513, controller 1514 and switch 1530.

Cellular phone 100 shown in FIG. 1 has a telephone conversation function over the cellular phone network as well as a function of receiving distribution of the encrypted content data or the license from distribution server 10. Accordingly, the structure of cellular phone 100 shown in FIG. 1 corresponds to the structure shown in FIG. 8. However, the structure of cellular phone 100 additionally has ordinary structures as the cellular phone such as an antenna for receiving radio signals sent over the cellular phone network, a transmission/reception unit for converting the signals received from the antenna into baseband signals, and sending data sent from the cellular phone to the antenna after modulating it, a microphone, a speaker and an audio encoder-decoder. Further, the structure of cellular phone 100 has a dedicated interface and a dedicated terminal instead of USB interface 1112 and terminal 114.

Operations in respective sessions of the respective components of cellular phone 100 and reproduction terminal 102 will be described later in greater detail with reference to flowcharts.

Figure 9:
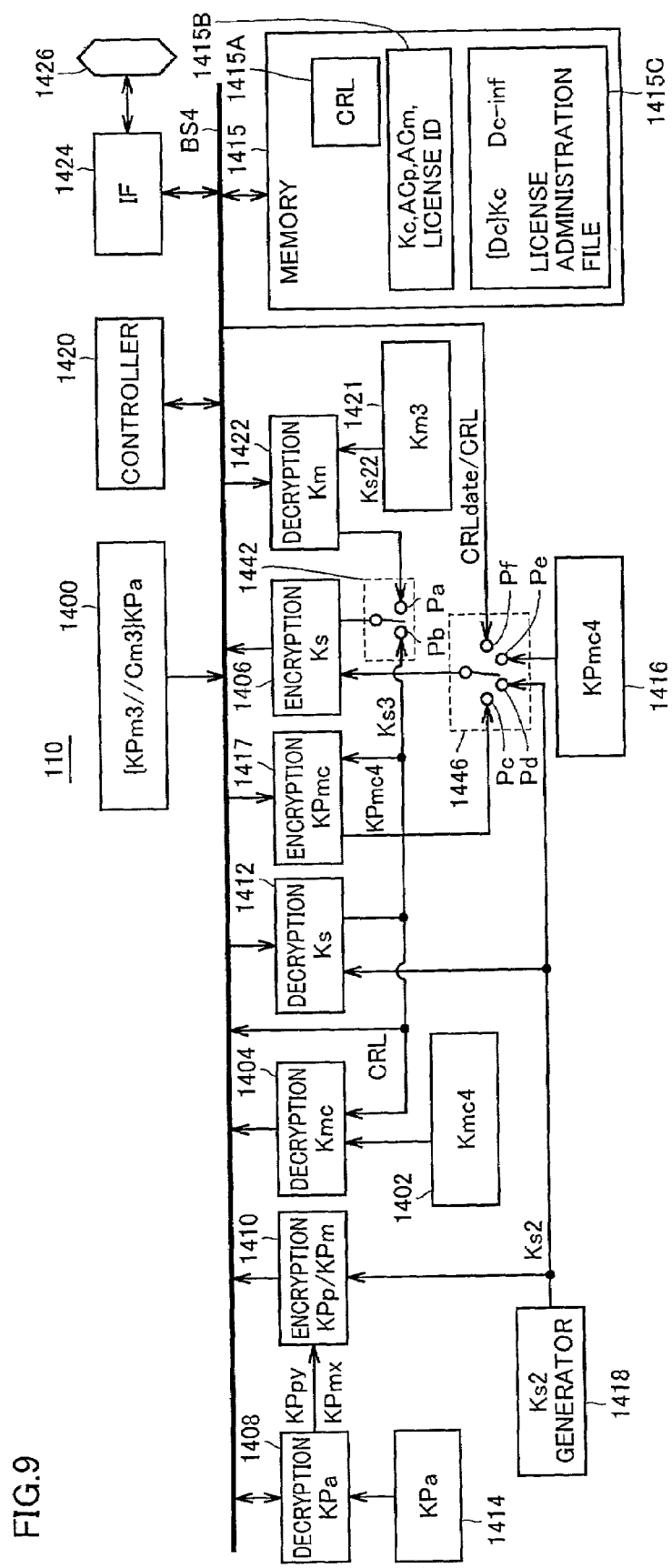
FIG. 9 is a schematic block diagram showing a structure of a memory card in the data distribution systems shown in FIGS. 1 and 2.

FIG. 9 is a schematic block diagram showing a structure of memory card 110 shown in FIGS. 1 and 2.

As already described, KPmw and Kmw are employed as the class public encryption key and the class secret decryption key of the memory card, respectively, and class certificate Cmw in the memory card is also employed. It is assumed that the natural number w is equal to 3 in memory card 110 (w=3). The natural number x for identifying the memory card is equal to 4 (x=4).

Accordingly, memory card 110 includes an authentication data hold unit 1400 for holding authentication data {KPm3//Cm3}KPa, a Kmc hold unit 1402 for holding a unique secret decryption key Kmc4, which is a decryption key unique to each memory card, a Km hold unit 1421 for storing a class secret decryption key Km3 and a KPmc hold unit 1416 for storing a public encryption key KPmc4, which can be decrypted with unique secret encryption key Kmc4.

Owing to provision of the encryption key of the memory card operating as the record device, the encrypted license key for the distributed content data can be administered a memory card on the memory card bases, as will be apparent from the following description.

Memory card 110 further includes an interface 1424 for transmitting signals to and from memory card interface 1200 via a terminal 1426, a bus BS4 for transmitting signals to and from interface 1424, a decryption processing unit 1422 receiving data applied onto bus BS4 via interface 1424, also receiving class secret decryption key Km3 from Km hold unit 1421 and outputting session key Ks1 generated in the distribution session by distribution server 10 to the a contact Pa, a decryption processing unit 1408 decrypting the data sent from bus BS4 with public authentication key KPa sent from KPa hold unit 1414 to send the result of decryption and the class certificate obtained by the decryption to controller 1420 and send the class public key obtained by the decryption to encryption processing unit 1410, respectively, and an encryption processing unit 1406 encrypting the data selectively applied from a switch 1446 with a key selectively applied from a switch 1442, and outputs it onto bus BS4.

Memory card 110 further includes a session key generation unit 1418 for generating session key Ks2 in each of the distribution and reproduction sessions, encryption processing unit 1410 encrypting session key Ks2 sent from session key generation unit 1418 with class public encryption key KPpy or KPmw obtained by decryption processing unit 1408, and sends it onto bus BS4, a decryption processing unit 1412 receiving the data encrypted with session key Ks2 from bus BS4, and decrypts it with session key Ks2 obtained from session key generation unit 1418, and a decryption processing unit 1417 for encrypting license key Kc and reproduction control information ACp, which are read from memory 1415 in the reproduction session of the encrypted content data, with unique public encryption key KPmcx (x≠4) of another memory card 110, which is decrypted by decryption processing unit 1412.

Memory card 110 further includes a decryption processing unit 1404 for decrypting the data on bus BS4 with a unique secret decryption key Kmc4 of memory card 110, which is paired with unique public encryption key KPmc4, and a memory 1415 for receiving, from bus BS 4, and storing certificate revocation list CRL which is successively updated with update date/time CRLdate in the certificate revocation list, encrypted content data {Dc}Kc, a license (Kc, Acp, ACm and license ID) for reproducing encrypted content data {Dc}Kc, additional information Dc-inf, the license administration file for administering the license for the encrypted content data and the reproduction list. Memory 1415 is formed of, e.g., a semiconductor memory device. Memory 1415 is formed of a CRL region 1415A, a license region 1415B and a data region 1415C. CRL region 1415A is a region for recording certificate revocation list CRL. License region 1415B is used for recording the license. Data region 1415C is used for recording encrypted content data {Dc}Kc, related information Dc-inf of the encrypted content data, a license administration file for recording information required for license administration for each encrypted content data, and a reproduction list for recording basic information for accessing the encrypted content data and the license stored in the memory card. Data region 1415C can be externally and directly accessed. The license administration file and reproduction list will be described later in greater detail, License region 1415B stores the licenses license key Kc, reproduction control information ACp, access control information ACm and license ID) in record units, each of which is referred to as "entry" and is dedicated to recording of licenses. For accessing the license, an entry number is used for designating the entry, in which the license is stored or is to be stored.

Memory card 110 further includes a controller 1420, which externally transmits data via bus BS4, and receives access control information and others from bus BS4 for controlling operations of memory card 110.

All the structures except for data region 1415C are formed in a tamper resistant module region.

Description will now be given on respective operations of the data distribution systems shown in FIGS. 1 and 2.

[Distribution 1]

In the data distribution systems shown in FIGS. 1 and 2, the encrypted content data and the license are distributed from distribution server 10 to license administration module 511 of personal computer 50 in the following manner. This operation will be referred to as "distribution 1".

FIGS. 10–13 are first to fourth flowcharts, respectively, which show the distribution operation in the data distribution systems shown in FIGS. 1 and 2, and more specifically, show the distribution to license administration module 511 in personal computer 50 at the time of purchasing the encrypted content data. License administration module 511 executes the program to receive the encrypted content data and the license from distribution server 10. Distribution server 10 uses one of two public authentication keys KPa and KPb, and particularly public authentication key KPb for determining the authentication data of license administration module 511. License administration module 511 is a software module having the substantially same function relating to the copyright protection of memory card 110 except for memory 1415. Natural number w representing the class of license administration module 511 is equal to 5 (w=5), and natural number x for identifying license administration module 511 is equal to 6 (x=6). Accordingly, license administration module 511 holds authentication data {KPm5// Cm5}KPb, unique public secret key KPm6, class secret decryption key Km5 and unique secret decryption key Kmc6.

Figure 10:
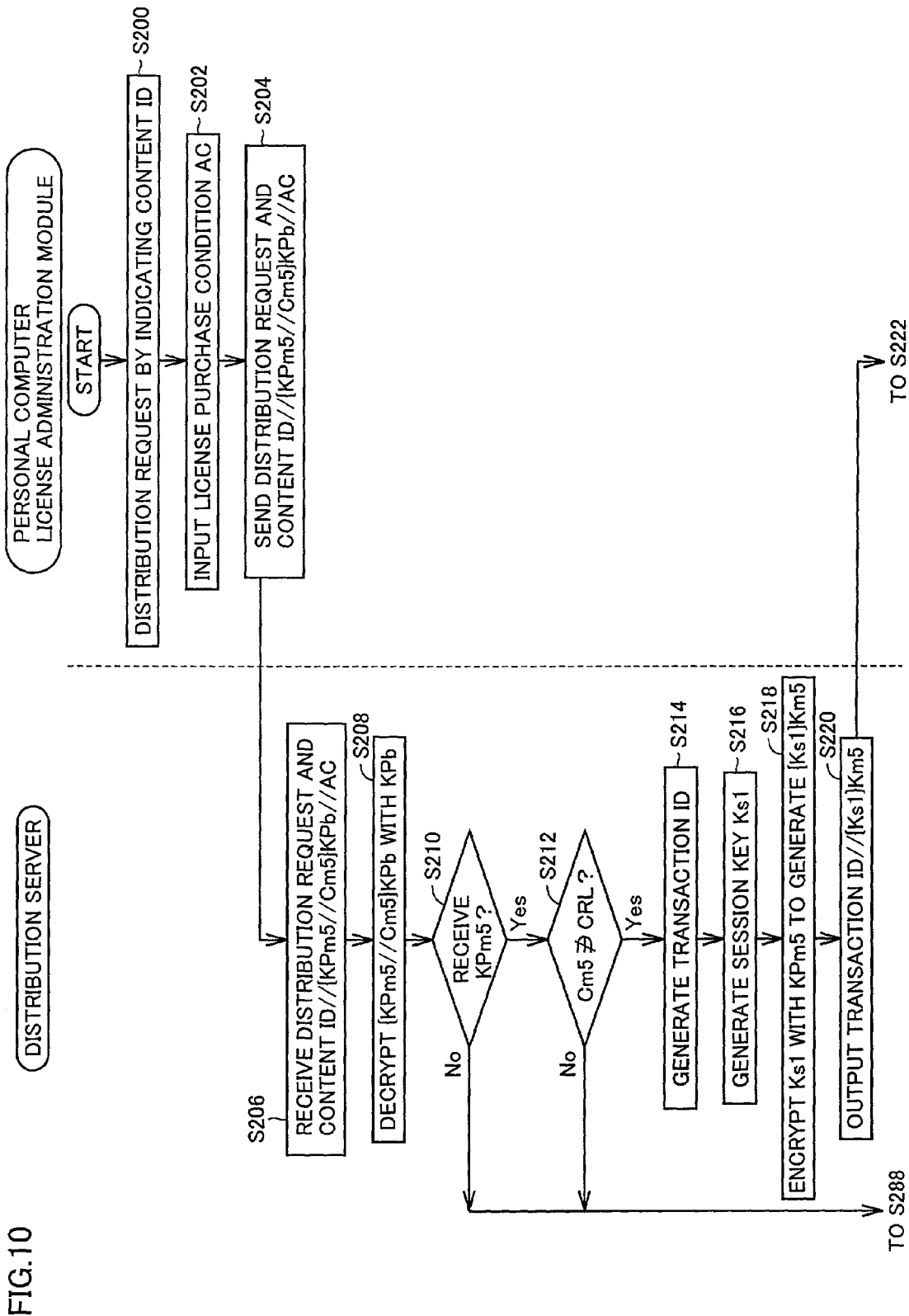
FIGS. 10–13 are first to fourth flowcharts showing an operation of distributing encrypted content data and a license to license administration module included in the personal computer shown in FIGS. 1 and 2, respectively.

Before the processing in FIG. 10, the user connects personal computer 50 to distribution server 10 via modem 40, and thereby obtains the content ID for the intended content, i.e., the content to be purchased from distribution server 10.

Referring to FIG. 10, the user of personal computer 50 enters via keyboard 560 the distribution request by designating the content ID (step S200). Through keyboard 560, the user enters purchase conditions AC for purchasing the license of the encrypted content data (step S202). More specifically, access control information ACm and reproduction control information ACp of the encrypted content data are set, and purchase conditions AC are input for purchasing license key Kc for decrypting the selected encrypted content data.

When purchase conditions AC of encrypted content data are input, controller 510 reads authentication data {KPm5// Cm5}KPb from license administration module 511, and sends, in addition to authentication data {KPm5//Cm5}KPb, the content ID, data AC of the license purchasing conditions and the distribution request to distribution server 10 (step S204).

Distribution server 10 receives from personal computer 50 the distribution request, content ID, authentication data {KPm5//Cm5}KPb and data AC of license purchasing conditions (step S206). Distribution control unit 315 determines based on class certificate Cm5 of authentication data {KPm5//Cm5}KPb whether the distribution at level 1 is request or the distribution at level 2 is requested. Authentication data {KPm5//Cm5}KPb is applied from license administration module 511 for requesting the distribution at level 1 so that distribution control unit 315 determines that the distribution at level 1 is requested. Decryption processing unit 312 decrypts received authentication data {KPm5// Cm5}KPb with public authentication key KPb for level 1 (step S208).

Distribution control unit 315 performs authentication processing based on the result of decryption by decryption processing unit 312, and more specifically determines whether received authentication data {KPm5//Cm5}KPb is the authentication data encrypted for the purpose of verifying its authenticity or validity by a regular system or body for the level 1 or not (step S210). When it is determined that authentication data {KPm5//Cm5}KPb is the valid data for level 1, distribution control unit 315 approves and accepts public encryption key KPm5 and certificate Cm5. The operation moves to a step S212. When distribution control unit 315 determines that it is not the valid authentication data for level 1, the data is not approved, and the processing ends without accepting public secret key KPm5 and certificate Cm5 (step S288).

Although description will be given any longer, distribution server 10 can send the license at level 1 directly to memory card 110 having the security level of 2 via personal computer 50.

When public encryption key KPm5 and certificate Cm5 are accepted as a result of authentication, distribution control unit 315 then refers to CRL database 306 to determine whether class certificate Cm5 of license administration module 511 is listed up in certificate revocation list CRL. If class certificate Cm5 is listed up in the certificate revocation list, the distribution session ends (step S288).

If the class certificate of license administration module 511 is not listed in the certificate revocation list, next processing starts (step S214).

When public encryption key KPm5 and certificate Cm5 are accepted as a result of the authentication, and it is determined that the class certificate is not listed in the certificate revocation list, distribution server 10 generates by distribution control unit 315 the transaction ID, which is the administration code for specifying the distribution (step S214). Session key generation unit 316 generates session key Ks1 for distribution (step S216). Session key Ks1 is encrypted by encryption processing unit 318 with class public encryption key KPm5 corresponding to license administration module 511 and obtained by decryption processing unit 312 (step S218).

The transaction ID and encrypted session key Ks1 are externally output as transaction ID//{Ks1}Km5 via bus BS1 and communication device 350 (step S220).

Figure 11:
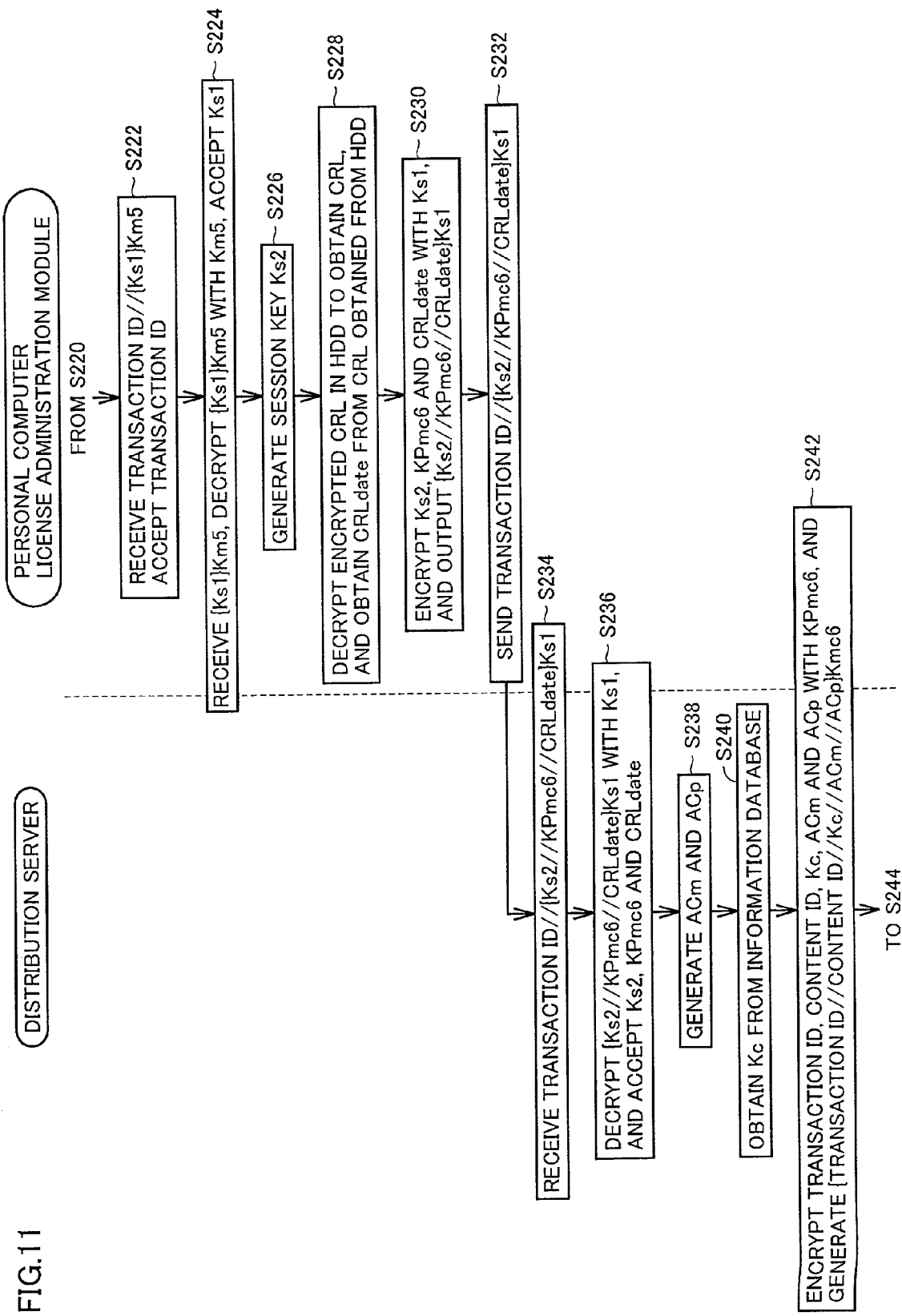

Referring to FIG. 11, when controller 510 of personal computer 50 receives transaction ID//{Ks1}Km5 (step S222), license administration module 511 receives {Ks1}Km5, decrypts it with class secret decryption key Km5 unique to license administration module 511 and accepts session key Ks1 (step S224).

License administration module 511 generates session key Ks2 when it confirms the acceptance of session key Ks1 generated by distribution server 10 (step S226). Controller 510 reads out encrypted CRL stored on HDD 530 via bus BS2. License administration module 511 decrypts encrypted CRL to obtain certificate revocation list CRL, and obtains update date/time CRLdate of the certificate revocation list from decrypted certificate revocation list CRL (step S228). License administration module 511 further encrypts session key Ks2 generated by license administration module 511 as well as unique public encryption key KPmc6 and update date/time CRLdate of the certificate revocation list with session key Ks1 generated in distribution server 10, and thereby forms one encrypted data {Ks2//KPmc6//CRLdate}Ks1 (step S230).

Controller 510 sends transaction ID//{Ks2//KPmc6//CRLdate}Ks1, which is prepared by adding the transaction ID to encrypted data {Ks2//KPmc6//CRLdate}Ks1, to distribution server 10 (step S232).

Distribution server 10 receives transaction ID//{Ks2//KPmc6//CRLdate}Ks1 (step S234), and executes decryption with session key Ks1 in decryption processing unit 320. Thereby, distribution server 10 accepts session key Ks2 generated by license administration module 511, unique public encryption key KPmc6 unique to license administration module 511 and update date/time CRLdate of the certificate revocation list in license administration module 511 (step S236).

Distribution control unit 315 generates access control information ACm and reproduction control information ACp in accordance with the content ID and data AC of license purchase conditions, which are obtained in step S206 (step S238). Further, license key Kc for decrypting encrypted content data {Dc}Kc is obtained from information database 304 (step S240).

Distribution control unit 315 applies the generated licenses, i.e., the transaction ID, content ID, license key Kc, reproduction control information ACp and access control information ACm to encryption processing unit 326. Encryption processing unit 326 generates encrypted data {transaction ID//content ID//Kc//ACm//ACp}Kmc6 by encrypting the licenses with public encryption key KPmc6, which is obtained by decryption processing unit 320 and is unique to license administration module 511 (step S242).

Figure 12:
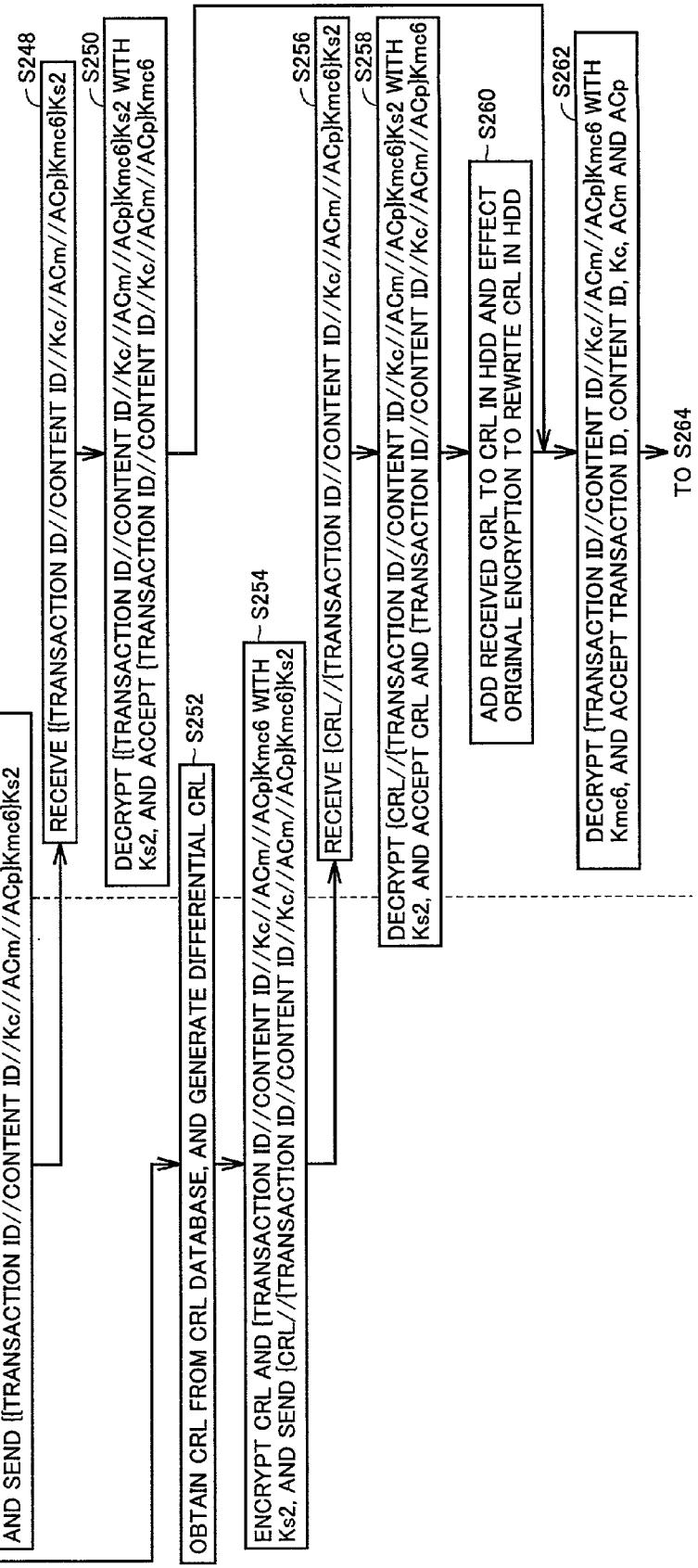

In distribution server 10, as shown in FIG. 12, update date/time CRLdate of the certificate revocation list, which is sent from license administration module 511, is compared with the update date/time of certificate revocation list CRL of distribution server 10 held in CRL database 306, and thereby it is determined whether the certificate revocation list CRL held in license administration module 511 is the latest or not. If it is determined that the certificate revocation list CRL held in license administration module 511 is the latest, the operation moves to a step S246. If the certificate revocation list CRL held in license administration module 511 is not the latest, the operation moves to a step S252 (step S244).

When it is determined that list CRL is the latest, encryption processing unit 328 encrypts the encrypted data {transaction ID//content ID//Kc//ACm//ACp}Kmc6 output from encryption processing unit 326 with session key Ks2 generated by license administration module 511, and outputs encrypted data {{transaction ID//content ID//Kc//ACm//ACp}Kmc6}Ks2 onto bus BS1. Distribution control unit 315 sends encrypted data {{transaction ID//content ID//Kc//ACm//ACp}Kmc6}Ks2 on bus BS1 to personal computer 50 via communication device 350 (step S246).

Controller 510 of personal computer 50 receives encrypted data {{transaction ID//content ID//Kc//ACm//ACp}Kmc6}Ks2 (step S248), and license administration module 511 decrypts encrypted data {{transaction ID//content ID//Kc//ACm//ACp}Kmc6}Ks2 with session key Ks2 to accept {transaction ID//content ID//Kc//ACm//ACp}Kmc6 (step S250). Thereafter, the operation moves to step S262.

If it is determined in distribution server 10 that certificate revocation list CRL held in license administration module 511 is not the latest, distribution control unit 315 obtains the latest certificate revocation list CRL from CRL database 306 via bus BS1 (step S252).

Encryption processing unit 328 receives the output of encryption processing unit 326 and certificate revocation list CRL supplied from distribution control unit 315 via bus BS1, and encrypts it with session key Ks2 generated in license administration module 511. Encrypted data {CRL//{transaction ID//content ID//Kc//ACm//ACp}Kmc6}Ks2 output from encryption processing unit 328 is sent to personal computer 50 via bus BS1 and communication device 350 (step S254).

Personal computer 50 receives encrypted data {CRL//{transaction ID//content ID//Kc//ACm//ACp}Kmc6}Ks2 sent thereto (step S256), and license administration module 511 decrypts the received data with session key Ks2 to accept latest certificate revocation list CRL and encrypted data {transaction ID//content ID//Kc//ACm//ACp}Kmc6 (step S258).

Controller 510 accepts certificate revocation list CRL recorded on HDD 530, effects unique encryption on the latest certificate revocation list CRL and rewrites certificate revocation list CRL on HDD 530 (step S260).

Steps S246, S248 and S250 are provided for distributing license key Kc and others to license administration module 511 when certificate revocation list CRL held in license administration module 511 is the latest. Steps S252, S254, S256, S258 and S260 are provided for distributing license key Kc and others to license administration module 511 when certificate revocation list CRL held in license administration module 511 is not the latest. As described above, every certificate revocation list CRL, which is administered by the license administration module 511, is determined whether it is updated or not, based on the update date/time CRLdate of the certificate revocation list sent from license administration module 511. If not updated, the latest certificate revocation list CRL is obtained from CRL database 306, and is sent to license administration module 51 so that the certificate revocation list administered by the license administration module 511 may be always the latest. Thereby, it is possible to prevent provision of the license to the content reproduction circuit, memory card and license administration module, of which security is broken and, for example, secret key is broken.

After step S250 or S260, encrypted license {transaction ID//content ID//Kc//ACm//ACp}Kmc6 is decrypted with secret decryption key Kmc6, and the licenses (license key Kc, transaction ID, content ID, access control information ACm and reproduction control information ACp) are accepted (step S262).

Figure 13:
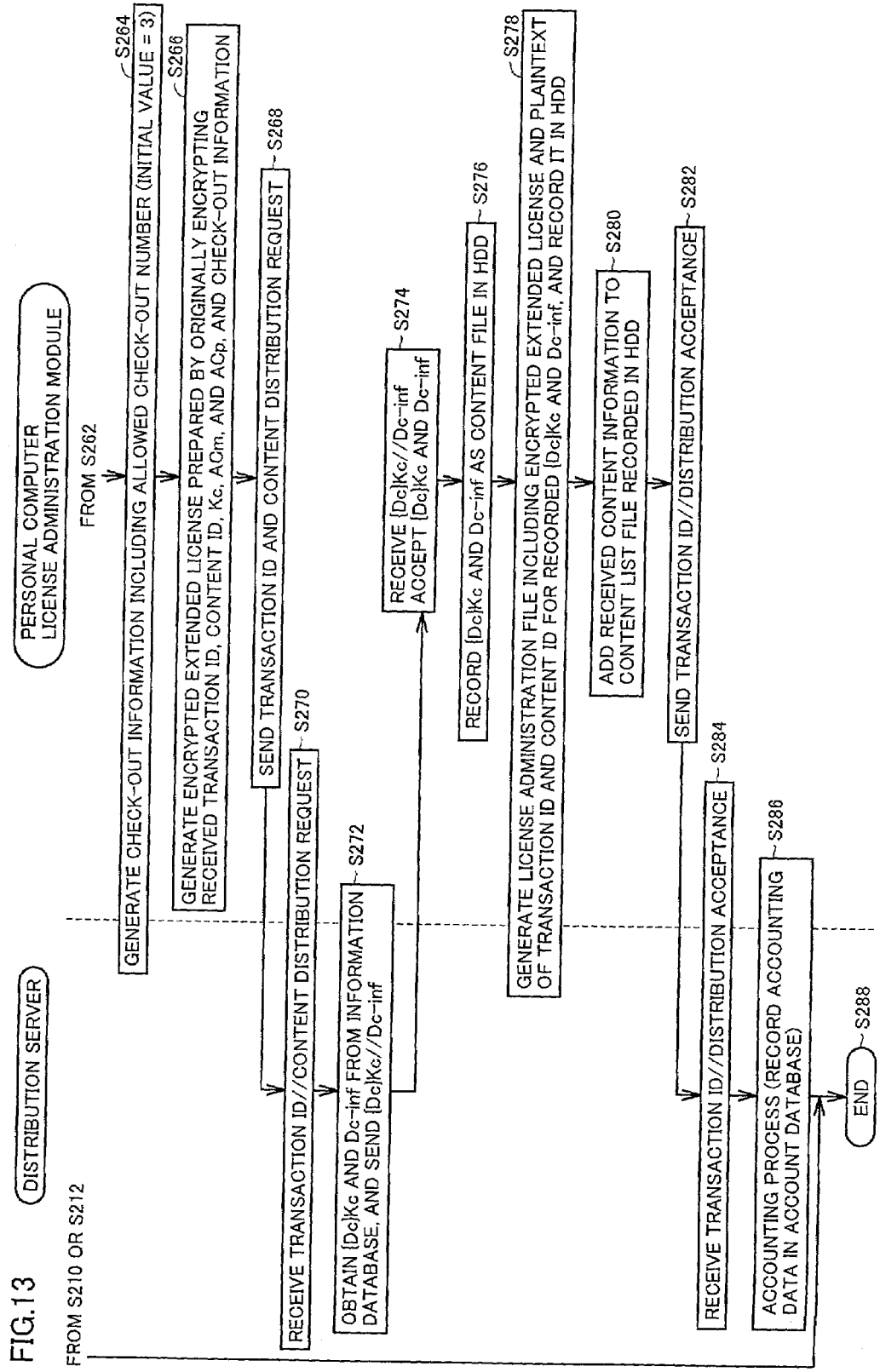

Referring to FIG. 13, license administration module 511 generates check-out information including an allowed check-out number for giving the encrypted content data and the license received from distribution server 10 to memory card 110 (step S264). In this case, the initial value of check-out is set to "3". Thereby, license administration module 511 generates the encrypted extended license by effecting unique encryption on received licenses (transaction ID, content ID, license key Kc, access control information ACm and reproduction control information ACp) and the generated check-out information (step S266). In this case, license administration module 511 performs the encryption in connection with an ID number of controller (CPU) 510 of personal computer 50 and others. Therefore, the encrypted extended license thus generated is the license unique to personal computer 50, and duplication thereof has no meaning in other computers. Further, the license cannot be sent to memory card 110 unless the check-out, which will be described later, is used.

Controller 510 of personal computer 50 sends the request of distribution of the transaction ID and the encrypted content data, which are sent from distribution server 10, to distribution server 10 (step S268).

Distribution server 10 receives the request of distribution of the transaction ID and the encrypted content data (step S270), and obtains encrypted content data {Dc}Kc and additional information Dc-inf from information database 304. Distribution server 10 outputs these data and information via bus BS1 and communication device 350 (step S272).

Personal computer 50 receives {Dc}Kc//Dc-inf, and accepts encrypted content data {Dc}Kc and additional information Dc-inf (step S274). Thereby, controller 510 records encrypted content data {Dc}Kc and additional information Dc-inf as one content file on hard disk (HDD) 530 via bus BS2 (step S276). Controller 510 generates the license administration file, which includes the encrypted extended license generated by license administration module 511 as well as plaintext of transaction ID and content ID, for encrypted content data {Dc}Kc and additional information Dc-inf, and records it on HDD 530 via bus BS2 (step S278). Further, controller 510 adds the accepted content information to the content list file recorded on HDD 530, and more specifically adds names of the recorded content file and license administration file as well as information (title of tune and name of artist) relating to the encrypted content data and extracted from additional information Dc-inf (step S280). Then, controller 510 sends the transaction ID and distribution acceptance to distribution server 10 (step S282).

When distribution server 10 receives transaction ID//distribution acceptance (step S284), it stores the accounting data in account database 302, and records the transaction ID in distribution log database 308. Then, it executes processing of ending the distribution (step S286). Thereby, the whole processing ends (step S288).

As described above, the encryption keys generated in distribution server 10 and license administration module 511 are sent and received, the encryption is executed with the received encryption key by each side, and the encrypted data is sent to the other side. Thereby, the mutual recognition can be performed in effect when sending and receiving the respective encrypted data so that the security in the data distribution system can be improved. Further, certificate revocation list CRL can be operated to prevent distribution of the license to the license administration module, of which security is broken. Further, by sending the latest certificate revocation list CRL to the license administration module, the latest certificate revocation list CRL can be operated and used even in the license administration module.

[Ripping]

The user of personal computer 50 can obtain the encrypted content data and the license distributed thereto, and further can obtain music data from music CDs owned by the user for utilizing it. From the viewpoint of the copyright protection of the copyright holder, digital duplication of the music CD cannot be performed freely, but is allowed if it is performed for personal use (i.e., for enjoying the music) by the owner with a tool provided with a copyright protection function. Accordingly, license administration module 511 includes a program executing the ripping function of obtaining music data from the music CD, and generating the encrypted content data and the license, which can be administered by license administration module 511.

In recent years, some kinds of music CDs contain electronic watermarks written in music data. The watermark describes, as rules of use, the range of use by the user determined by the copyright holder. In the ripping from the music data containing the rules of use written therein, the rules of use must be observed from the viewpoint of copyright protection. It is assumed that the rules of use define the duplication conditions (inhibition of duplication, allowance of 1st-generation duplication or allowance of duplication), effective period of duplication, maximum check-out number, edition, reproduction speed, regional code for reproduction, restricted number of reproduction times of duplication and allowed use time. There are conventional music CDs, in which the watermark cannot be detected, and thus the rules of use are not written.

The ripping is performed by obtaining the music data directly from the music CD, and further may be performed by obtaining the music data prepared by changing the analog input of music signals into a digital form. Further, ripping may be performed by obtaining the music data, which is compressed and encoded for reducing the amount of data. Further, the ripping may be performed by taking in, as the input, content data, which is distributed in a distribution system other than the distribution system of the embodiment.

Figure 14:
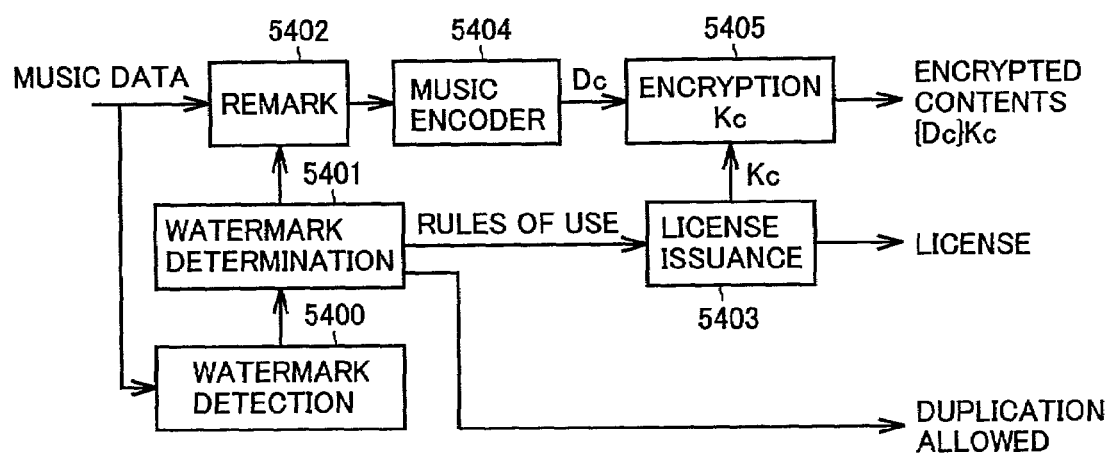
FIG. 14 is a function block diagram showing a function of software for executing ripping.
Figure 15:
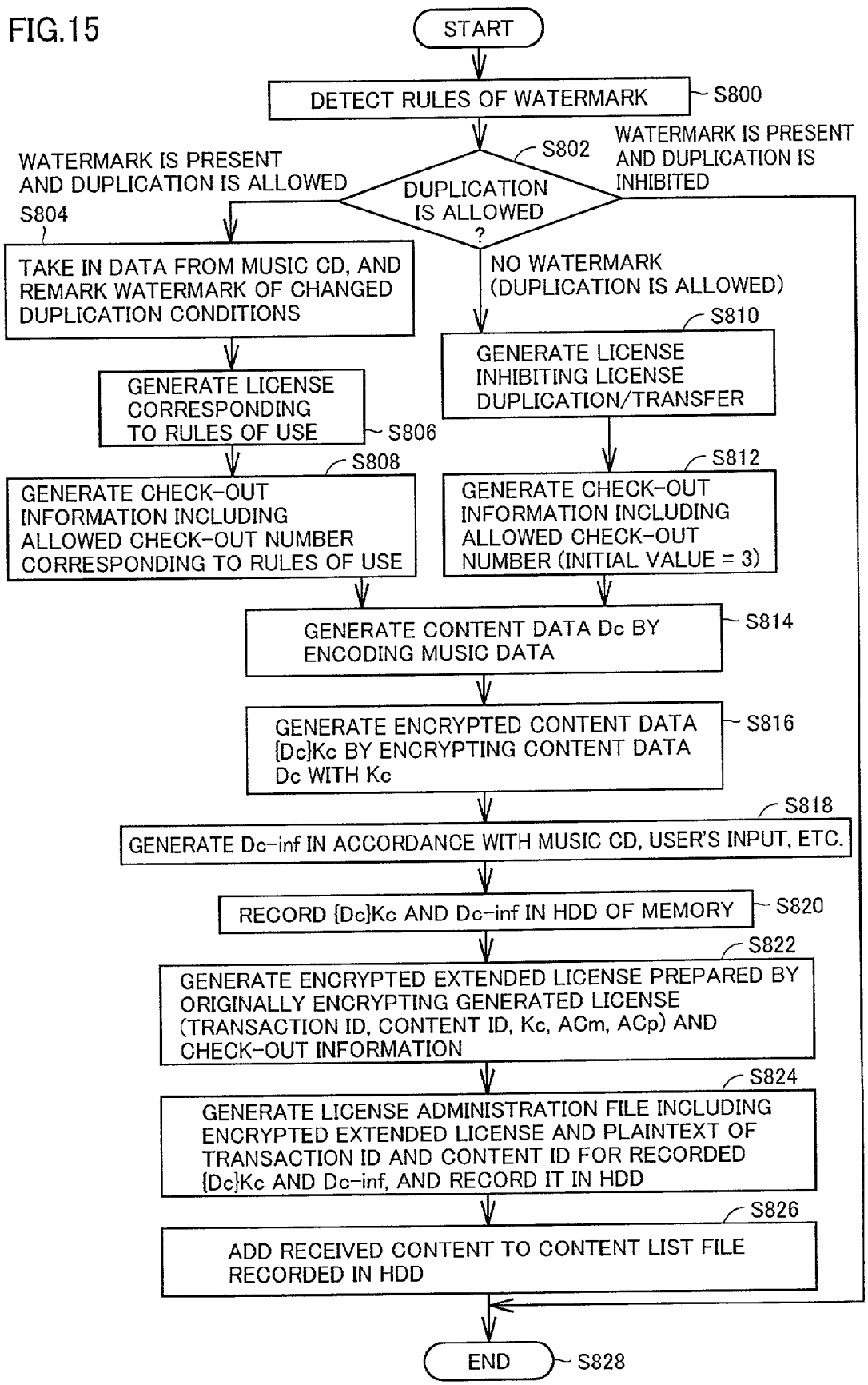
FIG. 15 is a flowchart showing an operation of ripping in the data distribution systems shown in FIGS. 1 and 2.

Referring to FIGS. 14 and 15, description will now be given on the operation of obtaining the encrypted content data and the license by ripping from the music CD storing music data.

FIG. 14 is a function block diagram showing a function of software for ripping the music data read from a CD by CD-ROM drive 540 provided in personal computer 50 shown in FIG. 7. The software for ripping the music data includes a watermark detection unit 5400, a watermark determination unit 5401, a re-mark unit 5402, a license generation unit 5403, a music encoder unit 5404 and an encryption unit 5405.

Watermark detection unit 5400 detects the watermark from the music data obtained from the music CD, and extracts the rules of use described therein. Watermark determination unit 5401 determines the result of detection by watermark detection unit 5400, and thus determines whether the watermark is detected or not. If detected, watermark determination unit 5401 determines whether the ripping is allowed or not, based on the rules of use described by the watermark. The fact that the ripping is allowed means that there is no rule of use defined in the watermark, or that the rules of use allowing duplication of the music data recorded on the music CD are described by the watermark. The fact that the ripping is not allowed means that the rules of use inhibiting duplication of the music data recorded on the music CD are described by the watermark.

If the rippling is allowed according to the result of determination by watermark determination unit 5401, and the duplication is allowed only to the first generation, re-mark unit 5402 changes the watermark for another watermark describing changed duplication conditions inhibiting the duplication. However, in the case, e.g., where the analog signal is supplied for ripping, the encoded music data is input or music data distributed by another distribution system is input, the watermarks may be deteriorated. In these cases, the watermark may be replaced even when no change occurred in the watermark. In this case, if there is an instruction relating to the duplication generation, the contents of rules of use are changed. Otherwise, the obtained rules of use are used as they are.

License generation unit 5403 generates the license based on the result of determination by watermark determination unit 5401. Music encoder 5404 encodes the music data bearing the watermark, which is changed by re-mark unit 5402, into a predetermined format. Encryption unit 5405 encrypts the music data sent from music encoder 5404 with license key Kc included in the license, which are generated by license generation unit 5403.

Referring to FIG. 15, description will now be given on the ripping operation by controller 510 in personal computer 50. When the ripping operation starts, watermark detection unit 5400 detects the rules of use in the watermark based on the data, which is detected from the music CD (step S800). Watermark determination unit 5401 performs the determination based on the result of detection by watermark detection unit 5400 and the rules of use recorded in the watermark, and more specifically determines whether the duplication is allowed or not (step S802). In a certain case, the watermark is detected, the rules of use allow duplication, and access control information ACm and reproduction control information ACp in the licenses can comply with the contents of rules of use. In this case, it is determined that the ripping is allowed, and the operation moves to a step S804. In another case, the watermark may be detected, but the rules of use may inhibit duplication, or access control information ACm and reproduction control information ACp in the licenses may not comply with the contents of rules of use. In this case, it is determined that the ripping is inhibited, and the operation moves to a step S828 for ending the ripping operation. If the CD in the drive does not contain the watermark, the operation moves to a step S810.

When it is determined in step S802 that the ripping is allowed, the music data is taken out from the music CD, and re-mark unit 5402 changes the watermark included in the music data for a new watermark describing the changed duplication conditions (step S804). If the rules of use of the original watermark allows the duplication only to the first generation, the changed watermark inhibits the duplication. License generation unit 5403 generates the license reflecting the rules of use, and thus generates the license allowing only the transfer (inhibiting the duplication) (step S806). Thereafter, license generation unit 5403 generates the check-out information including the allowed check-out number reflecting the rules of use (step S808). The allowed check-out number is equal to 3 unless otherwise specified.

In step S802, if the watermark is not detected, license generation unit 5403 generates a license inhibiting the duplication and transfer of the license (step S810). Thereafter, license generation unit 5403 generates check-out information including the allowed check-out number, of which initial value is equal to 3 (step S812).

After step S808 or S812, music encoder 5404 encodes the music data, which bears the changed watermark, in a predetermined format to generate content data {Dc} (step S814). Encryption processing unit 5405 encrypts the music data sent from music encoder 504 with license key Kc included in the license, which is generated by license generation unit 5403, to generate encrypted content data {Dc}Kc (step S816). Thereafter, additional information Dc-inf of content data {Dc} is generated by the information included in music data or entered by the user through keyboard 560 of personal computer 50 (step S818).

Thereby, controller 510 of personal computer 50 obtains encrypted content data {Dc}Kc and additional information Dc-inf thus generated, and records them as the content file on HDD 530 via bus BS2 (step S820). Controller 510 generates the encrypted extended license by effecting unique encryption on received licenses (transaction ID, content ID, license key Kc, access control information ACm and reproduction control information ACp) and the generated check-out information (step S822). Thereafter, controller 510 generates the license administration file, which includes the encrypted extended license and the plaintext of transaction ID and content ID, for the encrypted content data {Dc}Kc and the additional information Dc-inf recorded on HDD 530, and records them on HDD 530 (step S824). Finally, controller 510 adds the content file recorded in the content list file recorded on HDD 530 (step S826). Thereby, the ripping operation ends (step S828).

As described above, the encrypted content data and the license can be generated also by the ripping from the music CD, and the produced licenses are protected and administered together with the content distributed from distribution server 10.

The encrypted content data and the license generated by ripping from the music CD are administered by software similarly to the encrypted content data and the license received by license administration module 511. Therefore, personal computer 50 can send the encrypted content data and the license generated by ripping from the music CD to memory card 110 attached to cellular phone 100 or reproduction terminal 102 by the check-out to be described later. Thereby, the user of cellular phone 100 or reproduction terminal 102 can receive the encrypted content data, which personal computer 50 generated by ripping, on user's memory card 110 for enjoying it.

In the above manner, personal computer 50 obtains the content data (music data) by ripping from the music CD, and generates the license for recording it. However, the invention is not restricted to this, and may generate the encrypted content data and the license by ripping from the content data distributed and received over the internet. Personal computer 50 transmits the public keys and common keys to and from distribution server 10 over internet network 30 shown in FIGS. 1 and 2, and receives the encrypted content data and the license while performing mutual authentication. When the encrypted content data and the license are to be obtained by ripping, the above transmission of the public keys and common keys is not performed, and the content data is received in an ordinary manner over the internet.

Accordingly, personal computer 50 can generate the encrypted content data and the license by ripping from the music CD when it is not on the ordinary internet, and can obtain the encrypted content data and the license by ripping from the content data distributed on the internet when personal computer 50 is on the internet. For obtaining the encrypted content data and the license by personal computer 50 according to the invention, therefore, personal computer 50 is not essentially required to be on the internet if it includes the CD-ROM drive.

Naturally, license administration module 511 of personal computer 50 according to the invention may have either or both of the function of generating the encrypted content data and the license by ripping and the function of receiving the encrypted content data and the license by license administration module 511.

Further, license administration module 511 of personal computer 50 may have a function of decrypting and reproducing the recorded encrypted content data based on the license.

[Check-Out]

In the data distribution systems shown in FIGS. 1 and 2, the encrypted content data and the license, which is distributed from distribution server 10 to license administration module 511 of personal computer 50, is sent to memory card 110 attached to reproduction terminal 102. Description will now be given on this operation, which will be referred to as "check-out".

FIGS. 16–19 are first to fourth flowcharts of the check-out operation performed in the data distribution systems shown in FIGS. 1 and 2, respectively. In the check-out operation, the encrypted content data and the license, which are received by license administration module 511 from distribution server 10, or are generated by ripping, are given to memory card 110 attached to reproduction terminal 102 on the condition that these will be returned. Since cellular phone 100 or reproduction terminal 102 operates merely to relay the data even in the check-out, and therefore is not shown in the flowcharts. The following description is given on the case of check-out to memory card 110 attached to reproduction terminal 102 in FIG. 2. However, check-out to memory card 110 attached to cellular phone 100 in FIG. 1 is performed in a similar manner except for that cellular phone 100 functions instead of reproduction terminal 102.

In FIGS. 1 and 2, personal computer 50 is directly connected via a cable to cellular phone 100 or reproduction terminal 102 equipped with memory card 110. However, memory card 110 may be attached to cellular phone 100 and reproduction terminal 102 after storing the encrypted content data and the license in memory card 110 by attaching memory card 110 to a card writer connected to personal computer 50. In this case, the operations are performed similarly except for that the card writer functions instead of reproduction terminal 102.

Figure 16:
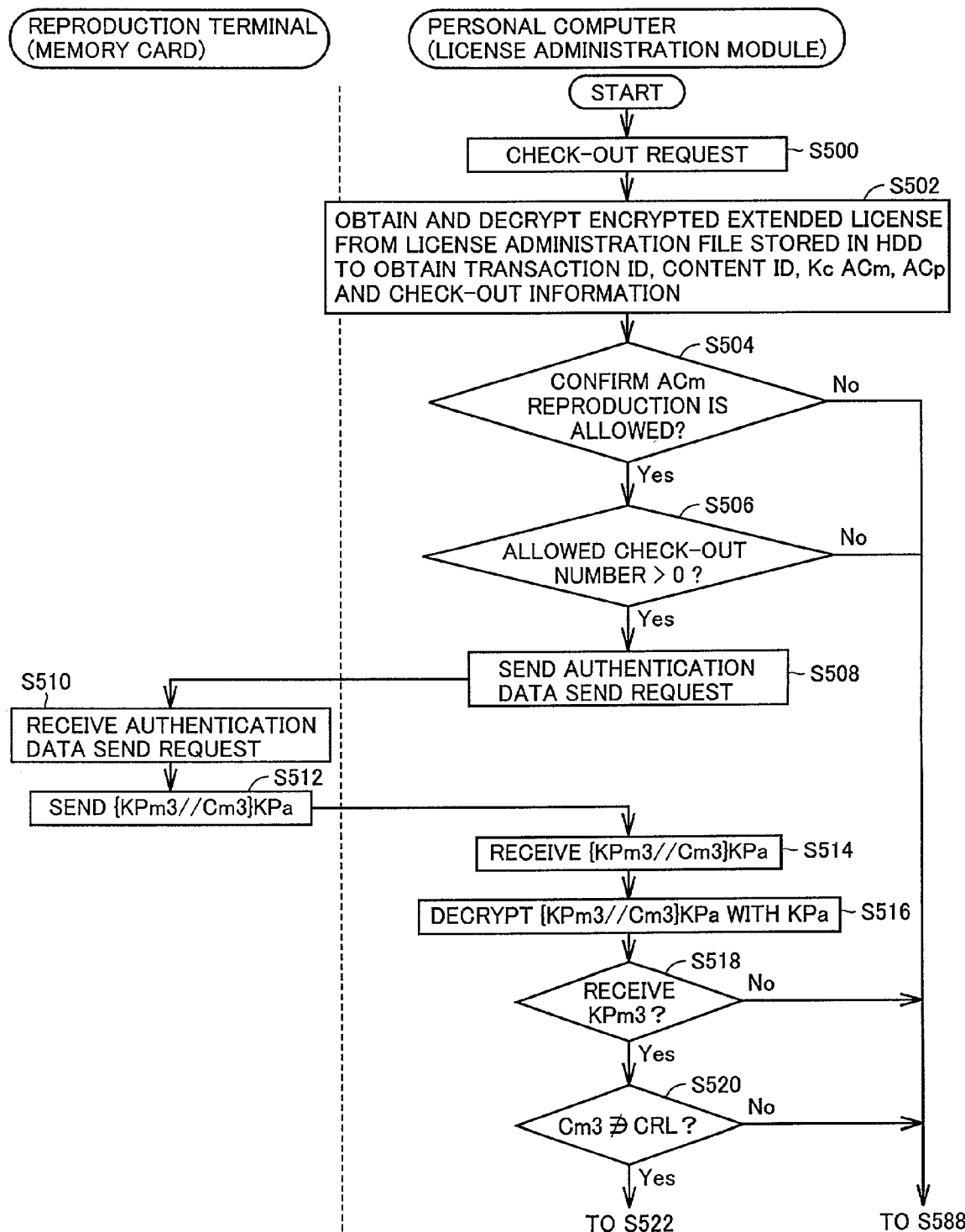
FIGS. 16–19 are first to fourth flowcharts showing a check-out operation for the license of the encrypted content data in the data distribution systems shown in FIGS. 1 and 2, respectively.

Before the processing shown in FIG. 16, the user of personal computer 50 determines the content to be checked out in accordance with the content list file, and specifies the content file and the license administration file. The following description is based on the premise that the above operation is already performed.

Referring to FIG. 16, when the user enters the check-out request through keyboard 560 of personal computer 50 (step S500), controller 510 obtains the encrypted extended license from the license administration file recorded on HDD 530. In this case, the license administration file stores the encrypted extended license, which is prepared by receiving the license by license administration module 511, adding check-out information uniquely administered by the license administration module and effecting unique encryption thereon (see step S266 in FIG. 13). License administration module 511 obtains the encrypted extended license to be checked out from the license administration file, and decrypts it to obtain licenses (transaction ID, content ID, license key Kc, access control information ACm and reproduction control information ACp) and check-out information (step S502).

License administration module 511 confirms access control information ACm (step S504). More specifically, license administration module 511 determines, based on the obtained access control information ACm, whether the license to be checked out to memory card 110 attached to reproduction terminal 102 does not include the information specified by access control information ACm and relating to the reproduction times of the encrypted content data or not, or whether the above license inhibits the reproduction or not. If the reproduction times is restricted, the encrypted content data cannot be reproduced with the checked license, and it is meaningless to check out the encrypted content data and the license to memory card 110 attached to reproduction terminal 102.

If the reproduction is restricted in step S504, the operation moves to step S588, and the check-out operation ends. In step S504, if there is no restriction on the reproduction, the operation moves to step S506. License administration module 511 determines whether the allowed check-out number included in the obtained check-out information is larger than 0 or not (step S506). If the allowed check-out number is 0 or less in step S506, there is no license for check-out so that the operation moves to step S588, and the check-out operation ends. If the allowed check-out number is larger than 0 in step S506, license administration module 511 sends the send request of the authentication data via USB interface 550, terminal 580 and USB cable 70 (step S508). Controller 1106 of reproduction terminal 102 receives the send request of the authentication data via terminal 114, USB interface 1112 and bus BS3, and sends the received request for sending the authentication data to memory card 110 via bus BS3 and memory card interface 1200. Controller 1420 of memory card 110 receives the send request of authentication data via terminal 1426, interface 1424 and bus BS4 (step S510).

When controller 1420 receives the send request of authentication data, it reads out authentication data {KPm3//Cm3}KPa from authentication data hold unit 1400 via bus BS4, and outputs authentication data {KPm3//Cm3}KPa thus read to reproduction terminal 102 via bus BS4, interface 1424 and terminal 1426. Controller 1106 of reproduction terminal 102 receives authentication data {KPm3//Cm3}KPa via memory card interface 1200 and bus BS3, and sends authentication data {KPm3//Cm3}KPa to personal computer 50 via bus BS3, USB interface 1112, terminal 1114 and USB cable 70 (step S512).

Thereby, license administration module 511 of personal computer 50 receives authentication data {KPm3//Cm3}KPa via license administration module 511, terminal 580 and USB interface 550 (step S514), and decrypts received authentication data {KPm3//Cm3}KPa with authentication key KPa (step S516). License administration module 511 performs the authentication processing based on the result of decryption for determining whether the decryption is performed correctly or not, and thus whether it receives or not the authentication data, which is encrypted for certifying its validity by a legal system, from the legal memory card for authenticating the fact that memory card 110 holds class public encryption key KPm3 and class certificate Cm3 (step S518). If it is determined that the authentication data is valid, license administration module 511 approves and accepts class public encryption key KPm3 and class certificate Cm3. The operation moves to next processing in a step S520. If the authentication data is not valid, license administration module 511 does not approve class public encryption key KPm3 and class certificate Cm3, and the processing ends without accepting these keys (S588).

Since license administration module 511 holds only pubic authentication key KPb corresponding to level 1, only the check-out with the security level of 1 can be performed.

When it is authenticated that it is the legal memory card, license administration module 511 then refers to HDD 530 to determine whether class certificate Cm3 of memory card 110 is listed up in certificate revocation list CRL or not. If class certificate Cm3 is listed in certificate revocation list CRL, the check-out operation ends (step S588). If class certificate Cm3 is not listed in certificate revocation list CRL, the operation moves to next processing (step S520).

Figure 17:
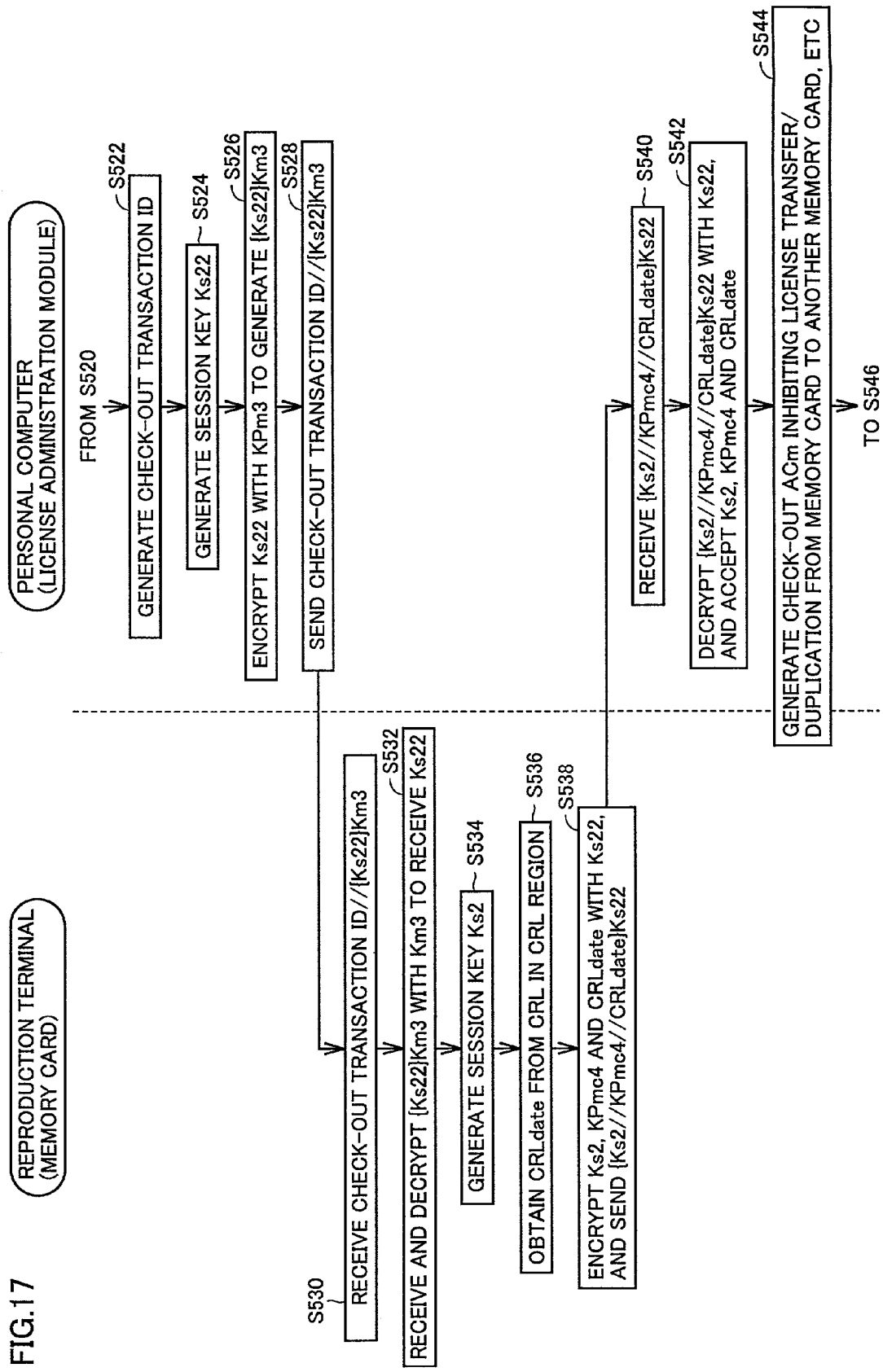

Referring to FIG. 17, if it is determined as a result of the authentication that the access is made from the reproduction terminal provided with the memory card having valid authentication data, and the class is not listed in the certificate revocation list, license administration module 511 generates transaction ID for check-out (i.e., check-out transaction ID), which is the administration code for specifying the check-out (step S522). The check-out transaction ID necessarily takes the value different from all the transaction IDs stored in memory card 110, and is generated as the transaction ID for local use. License administration module 511 generates session key Ks22 for check-out (step S524), and encrypts session key Ks22 thus generated with class public encryption key KPm3 sent from memory card 110 (step S526). License administration module 511 sends check-out transaction ID//{Ks22}Km3, which is prepared by adding check-out transaction ID to encrypted data {Ks22}Km3, to reproduction terminal 102 via USB interface 550, terminal 580 and USB cable 70 (step S528). Thereby, controller 1106 of reproduction terminal 102 receives check-out transaction ID//{Ks22}Km3 via terminal 1114, USB interface 1112 and bus BS3, and sends check-out transaction ID//{Ks22}Km3 thus received to memory card 110 via memory card interface 1200. Controller 1420 of memory card 110 receives check-out transaction ID//{Ks22}Km3 via terminal 1426, interface 1424 and bus BS4 (step S530). Decryption processing unit 1422 receives encrypted data {Ks22}Km3 from controller 1420 via bus BS4, and decrypts encrypted data {Ks22}Km3 with class secret decryption key Km3 sent from Km hold unit 1421. Thereby, decryption processing unit 1422 accepts session key Ks22 (step S532). Session key generation unit 1418 generates session key Ks2 (step S534). Controller 1420 obtains update date/time CRLdate of the certificate revocation list from CRL region 1415A of memory 1415 via bus BS4, and applies the update date/time CRLdate thus obtained to switch 1446 (step S536).

Thereby, encryption processing unit 1406 encrypts session key Ks2, unique public encryption key KPmc4 and update date/time CRLdate of the certificate revocation list, which are obtained by successively selecting the contacts of switch 1446, with session key Ks22 decrypted by decryption processing unit 1404 to generate encrypted data {Ks2//KPmc4//CRLdate}Ks22. Controller 1420 outputs encrypted data {Ks2//KPmc4//CRLdate}Ks22 to reproduction terminal 102 via bus BS4, interface 1424 and terminal 1426. Controller 1106 of reproduction terminal 102 receives encrypted data {Ks2//KPmc4//CRLdate}Ks22 via memory card interface 1200. Controller 1106 sends it to personal computer 50 via USB interface 1112, terminal 1114 and USB cable 70 (step S538).

License administration module 511 of personal computer 50 receives encrypted data {Ks2//KPmc4//CRLdate}Ks22 via terminal 580 and USB interface 550 (step S540), and decrypts encrypted data {Ks2//KPmc4//CRLdate}Ks22 thus received with session key Ks22. Thereby, license administration module 511 receives session key Ks2, unique public encryption key KPmc4 and update date/time CRLdate of the certificate revocation list (step S542). License administration module 511 generates access control information ACm for check-out, which inhibits transfer and duplication of the licenses from the memory card attached to reproduction terminal 102 to another memory card. More specifically, it generates access control information ACm, in which the reproduction times are not restricted (=255), and the transfer/duplication flag is set to 3" inhibiting the transfer and duplication (step S544).

Figure 18:
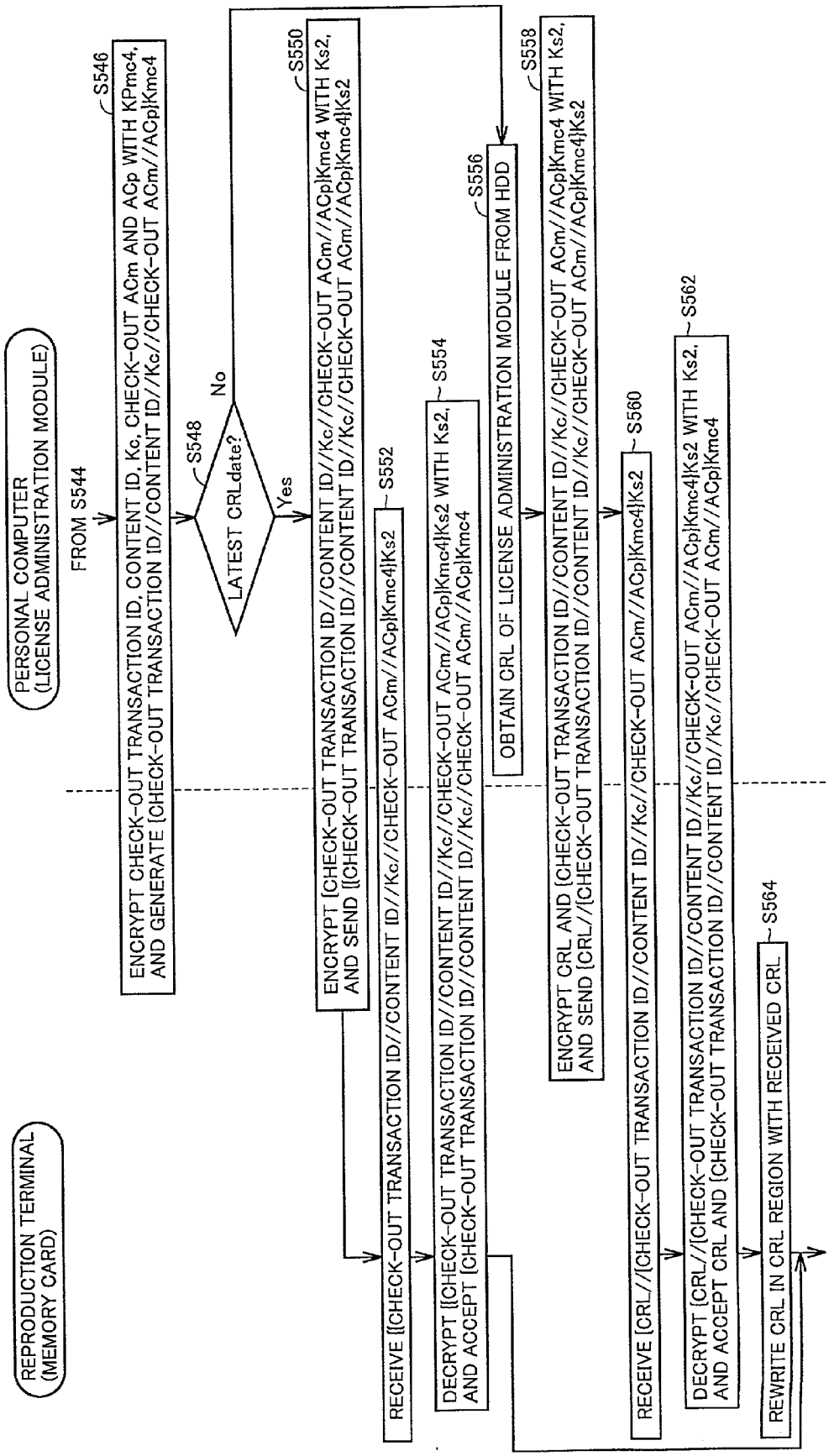

Referring to FIG. 18, license administration module 511 encrypts the license with public encryption key KPmc4 unique to memory card 110, which is received in step S542, to generate encrypted data {check-out transaction ID//content ID//Kc//check-out ACm//ACp}Kmc4 (step S546). Comparison is made between update date/time CRLdate of the certificate revocation list sent from memory card 110 and the update data/time of the certificate revocation list held on HDD 530 for determining the newer certificate revocation list. If the list sent from memory card 110 is newer than the other, the operation moves to a step S550. If the list of license administration module 511 is not older than the other, the operation moves to a step S556 (step S548).

If it is determined that the list of memory card 110 is newer than the other, license administration module 511 encrypts encrypted data {check-out transaction ID//content ID//Kc//check-out ACm//ACp}Kmc4 with session key Ks2, and sends encrypted data {{check-out transaction ID//content ID//Kc//check-out ACm//ACp}Kmc4}Ks2 to reproduction terminal 102 via USB interface 550, terminal 580 and USB cable 70 (step S550).

Controller 1106 of reproduction terminal 102 receives encrypted data {{check-out transaction ID//content ID//Kc//check-out ACm//ACp}Kmc4}Ks2 via terminal 1114, USB interface 1112 and bus BS3, and sends encrypted data {{check-out transaction ID//content ID//Kc//check-out ACm//ACp}Kmc4}Ks2 thus received to memory card 110 via bus BS3 and memory card interface 1200. Controller 1420 of memory card 110 receives encrypted data {{check-out transaction ID//content ID//Kc//check-out ACm//ACp}Kmc4}Ks2 via terminal 1426, interface 1424 and bus BS4 (step S552).

Decryption processing unit 1412 of memory card 110 receives encrypted data {{check-out transaction ID//content ID//Kc//check-out ACm//ACp}Kmc4}Ks2 via bus BS4, and decrypts it with session key Ks2 generated by session key generation unit 1418 for accepting {check-out transaction ID//content ID//Kc//check-out ACm//ACp}Kmc4 (step S554). Thereafter, the operation moves to step S566 shown in FIG. 19.

If it is determined in step S548 that the certificate revocation list of license administration module 511 is newer than the other, license administration module 511 obtains certificate revocation list CRL administered by the license administration module from HDD 530 (step S556).

License administration module 511 encrypts encrypted data {check-out transaction ID//content ID//Kc//check-out ACm//ACp}Kmc4 and data CRL of the certificate revocation list obtained from HDD 530 with session key Ks2, and sends encrypted data {CRL//{check-out transaction ID//content ID//Kc//check-out ACm//ACp}Kmc4}Ks2 to reproduction terminal 102 via USB interface 550, terminal 580 and USB cable 70 (step S558). Controller 1106 of reproduction terminal 102 receives encrypted data {CRL//{check-out transaction ID//content ID//Kc//check-out ACm//ACp}Kmc4}Ks2 via terminal 1114, USB interface 1112 and bus BS3, and outputs encrypted data {CRL//{check-out transaction ID//content ID//Kc//check-out ACm//ACp}Kmc4}Ks2 thus received to memory card 110 via bus BS3 and memory card interface 1200. Thereby, controller 1420 of memory card 110 receives encrypted data {CRL//{check-out transaction ID//content ID//Kc//check-out ACm//ACp}Kmc4}Ks2 via terminal 1426, interface 1424 and bus BS4 (step S560).

In memory card 110, decryption processing unit 1412 decrypts the received data on bus BS4 with session key Ks2 applied from session key generation unit 1418, and accepts CRL and {check-out transaction ID//content ID//Kc//check-out ACm//ACp}Kmc4 (step S562). Controller 1420 receives certificate revocation list CRL, which is accepted by decryption processing unit 1412, via bus BS4, and rewrites CRL region 1415A of memory 1415 with received certificate revocation list CRL (step S564).

In steps S550, S552 and S554, the operations are performed to check out license key Kc and others to memory card 110, and the check-out operations in these steps are performed in the case where certificate revocation list CRL of memory card 110 on the receiving side is newer than certificate revocation list CRL of license administration module 511 on the sending side. The operations in steps S556, 558, 560, 562 and 564 are performed for checking out session key Ks and others to memory card 110 in the case where certificate revocation list CRL of license administration module 511 on the sending side is newer than certificate revocation list CRL of memory card 110 on the receiving side. By these operations, determination is performed one by one based on update date/time CRLdate of the certificate revocation list sent from memory card 110, and the certificate revocation list CRL, which is as newer as possible, is obtained from HDD 530, and is stored in CRL region 1514A as certificate revocation list CRL of memory card 110. Thereby, it is possible to prevent leak of the licenses from memory card 110 of the check-out destination.

Figure 19:
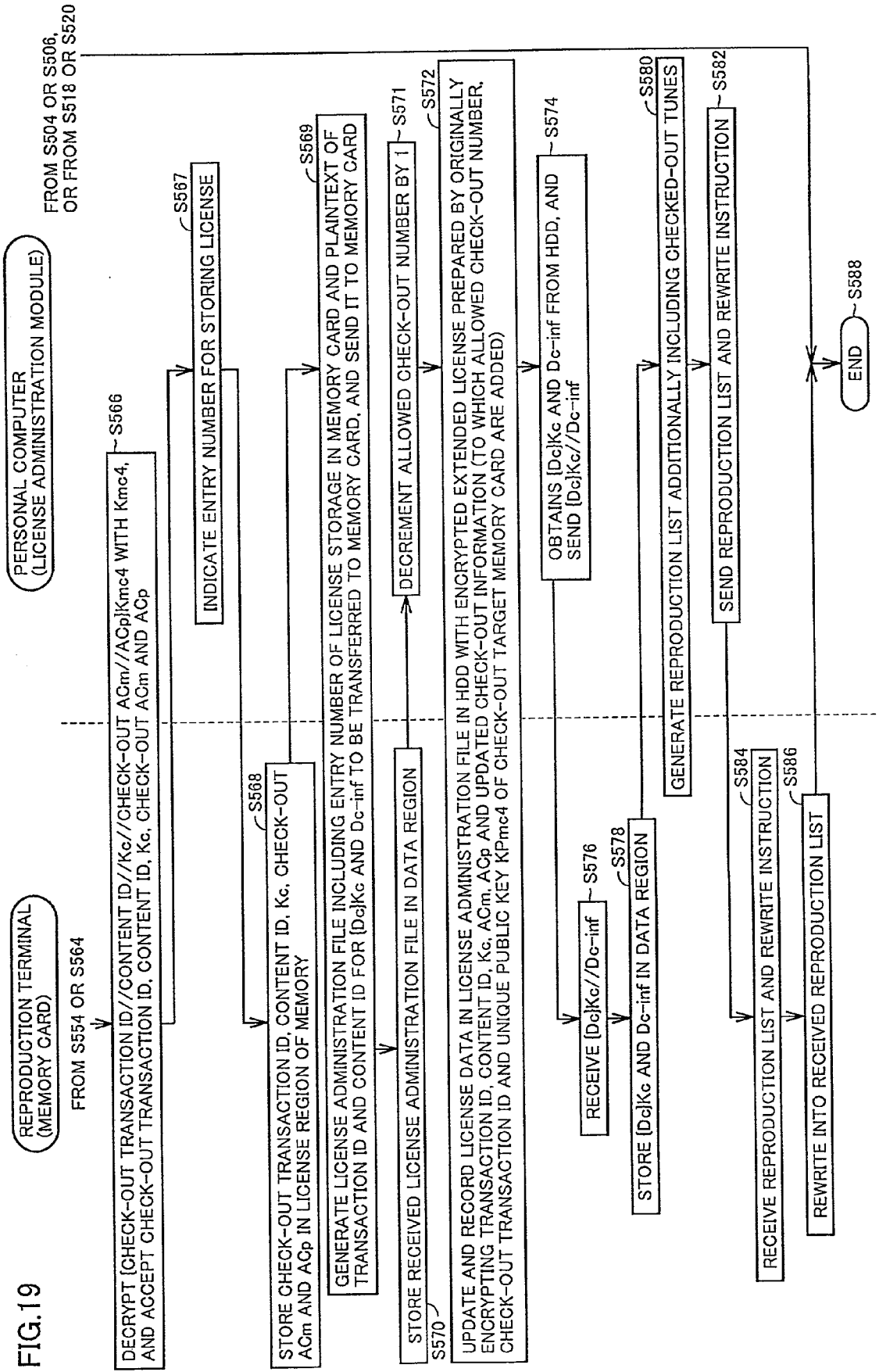

After steps S554 or S564, as shown in FIG. 19, controller 1420 instructs decryption processing unit 1404 to decrypt encrypted data {check-out transaction ID//content ID//Kc//check-out ACm//ACp}Kmc4 with secret decryption key Kmc4, and licenses (license key Kc, check-out transaction ID, content ID, check-out ACm and reproduction control information ACp) are accepted (step S566).

Controller 510 of personal computer 50 sends the entry number for storing the licenses, which are moved to memory card 110, to reproduction terminal 102 via USB interface 550, terminal 580 and USB cable 70 (step S567). Thereby, controller 1106 of reproduction terminal 102 receives the entry number via terminal 1114, USB interface 1112 and bus BS3, and stores licenses (license key Kc, check-out transaction ID, content ID, check-out ACm and reproduction control information ACp), which are obtained in step S556, in license region 1415B of memory 1415 designated by the received entry number (step S568).

Controller 510 of personal computer 50 generates the license administration file, which includes the entry number of license stored in memory 1415 of memory card 110, the plaintext of check-out transaction ID and the content ID, for encrypted content data {Dc}Kc to be moved to memory card 110 and additional information Dc-inf, and sends it to memory card 110 (step S569).

Controller 1420 of memory card 110 receives license administration file via reproduction terminal 102, and records the received license administration file in data region 1415C of memory 1415 (step S570).

License administration module 511 of personal computer 50 decrements the allowed check-out number by one (step S571), and prepares new encrypted extended license by effecting unique encryption on the transaction ID, content ID, license key Kc, access control information ACm, reproduction control information ACp and the updated check-out information (to which allowed check-out number, check-out transaction ID and unique public encryption key KPmc4 of memory card 110 of the check-out destination). With the data of the encrypted license thus produced, the license administration file recorded on HDD 530 is updated (step S572). Unique public key KPmc4 of the check-out destination is stored in an tamper resistant module of the memory card, can be obtained via a communication system using authentication and encryption to ensuring a high security level, and has a unique value independent of those of other memory cards. Therefore, unique public key KPmc4 can be suitably used as identification information for identifying the memory card.

License administration module 511 obtains encrypted content data {Dc}Kc and additional information Dc-inf, which are to be checked out to memory card 110, from HDD 530, and sends {Dc}Kc//Dc-inf to memory card 110 (step S574). Controller 1420 of memory card 110 receives {Dc}Kc//Dc-inf via reproduction terminal 102 (step S576), and records {Dc}Kc//Dc-inf, which is received via bus BS4, as the content file in data region 1415C of memory 1415 (step S578).

Thereby, license administration module 511 of personal computer 50 prepares the reproduction list additionally including the tunes (step S580), which are checked out to memory card 110, and sends the reproduction list and the instruction of rewriting the reproduction list to memory card 110 (step S582). Controller 1420 of memory card 110 receives the reproduction list and the rewriting instruction via reproduction terminal 102 (step S584), and rewrites the reproduction list, which is recorded in data region 1415C of memory 1415, with the received reproduction list via bus BS4 (step S586). Thereby, the check-out operation ends (step S588).

As described above, license administration module 511 determines that memory card 110 attached to reproduction terminal 102 is the legal or valid device, and thus, that public encryption key KPm3, which can be encrypted and sent together with class certificate Cm3, is legal. After determining these facts, the content data can be checked out only based on the check-out request to the memory card having class certificate Cm3 not listed in the certificate revocation list (i.e., the memory card having class certificate Cm3 not listed in the certificate revocation list of certificates, of which encryption with public encryption key KPm3 is broken). It is possible to inhibit the check-out to unauthorized memory card as well as the check-out using the descrambled or broken class key.

The encryption keys generated in the license administration module and the memory card are transmitted between them. Each of the module and the card executes the encryption with the received encryption key, and sends the encrypted data to the other so that the mutual authentication can be practically performed even when sending and receiving the encrypted data, and it is possible to improve the security in the operation of checking out the encrypted content data and the license.

By using the check-out operation described above, even the user of reproduction terminal 102 not having a function of communicating with distribution server 10 can record the encrypted content data and the license, which are received by software of personal computer 50, in memory card 110. This improves the user convenience.

[Check-In]

In the data distribution systems shown in FIGS. 1 and 2, the license, which is checked out to memory card 110 from license administration module 511 of personal computer 50, is returned to license administration module 511. Description will now be given on this returning operation, which is referred to as the "check-in".

Figure 20:
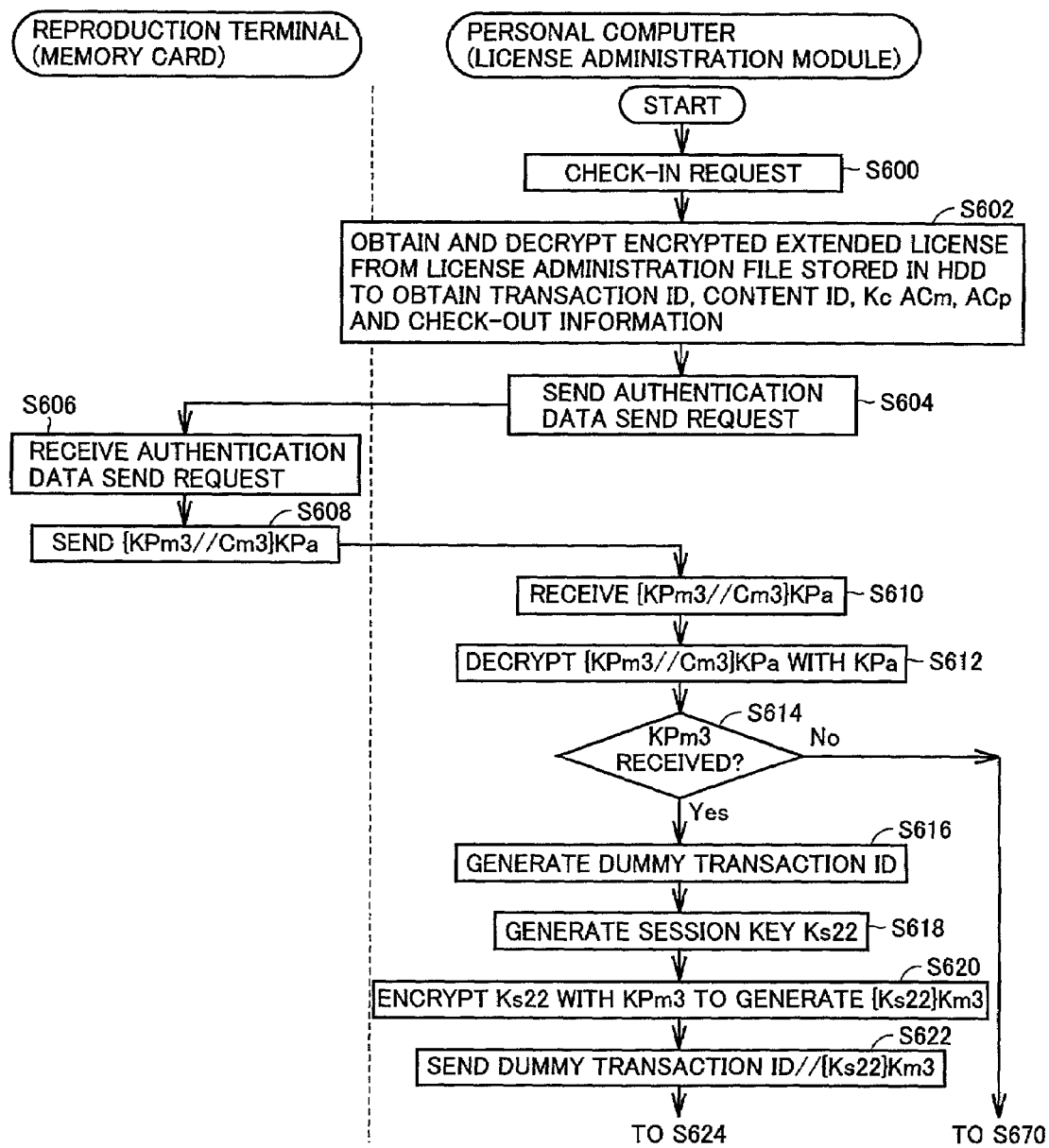
Figure 22:
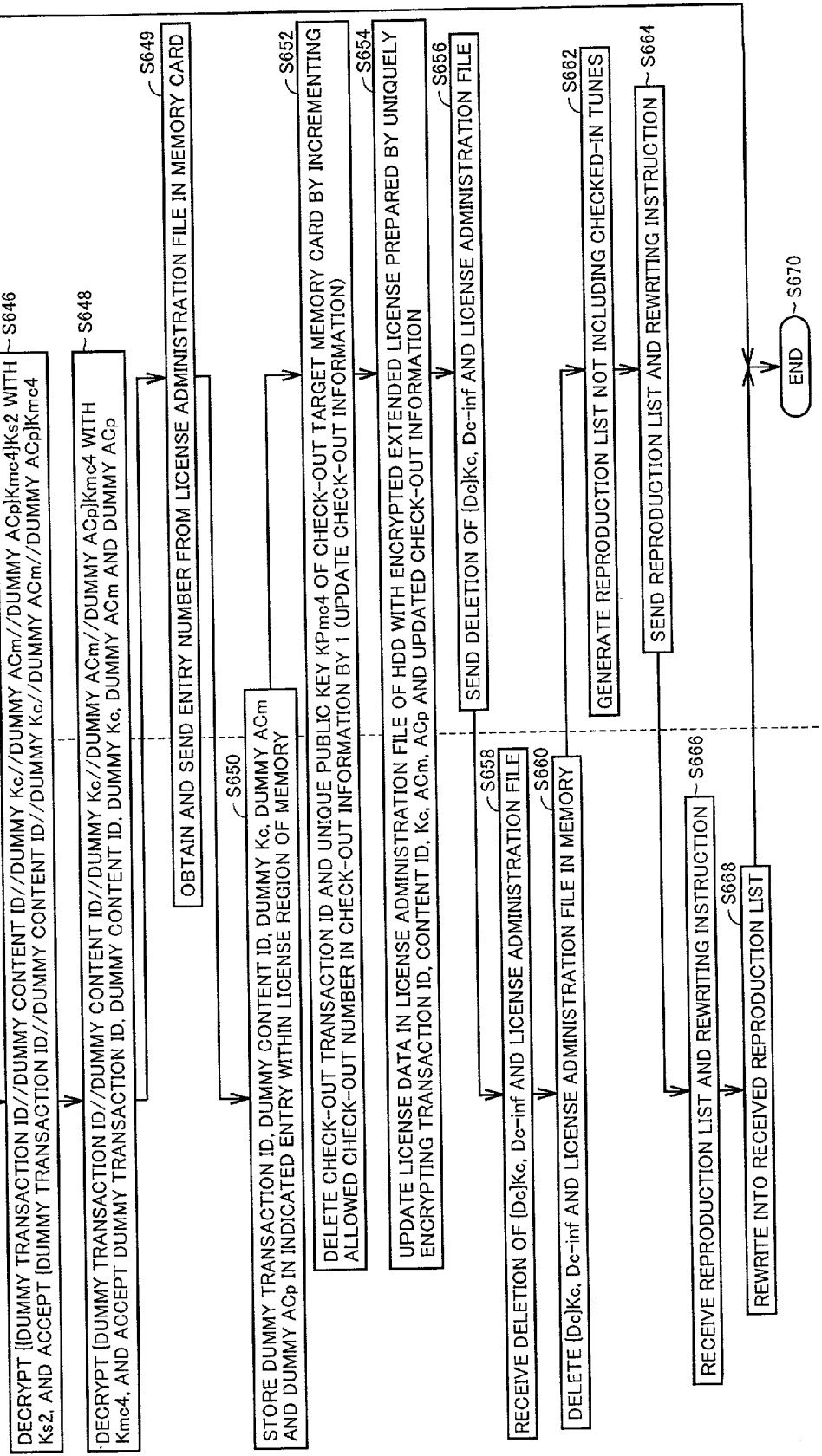

FIGS. 20–22 are first to third flowcharts showing the check-in operation for returning the encrypted content data and the license, which were given to memory card 110 by the check-out operation already described with reference to FIGS. 16–19. Cellular phone 100 and reproduction terminal 102 perform only relaying of data even in the check-in operation. Therefore, cellular phone 100 and reproduction terminal 102 are not shown in the flowcharts. Description will be given on the case where check-in is performed from memory card 110 attached to reproduction terminal 102 shown in FIG. 2. However, the check-in from memory card 110 attached to cellular phone 100 in FIG. 1 can be performed in a similar manner except for that cellular phone 100 functions instead of reproduction terminal 102. As already described in connection with the check-out, the operation is performed similarly even with a card writer.

Before the processing shown in FIG. 20, the user of personal computer 50 determines the content, which is to be checked in, in accordance with the content list file, and specifies the content file and the license administration file. The following description is based on the premise that the above operation is already performed.

Referring to FIG. 20, when the user enters the check-in request through keyboard 560 of personal computer 50 (step S600), license administration module 511 obtains the encrypted extended license data from the license administration file recorded on HDD 530, and decrypts it to obtain licenses (transaction ID, content ID, license key Kc, access control information ACm and reproduction control information ACp) and check-out information (allowed check-out number, check-out transaction ID and unique public encryption key KPmcx) (step S602). License administration module 511 sends the send request of the authentication data to reproduction terminal 102 via USB interface 550, terminal 580 and USB cable 70 (step S604). Thereby, controller 1106 of reproduction terminal 102 receives the send request for the authentication data via terminal 1114, USB interface 1112 and bus BS3, and sends the send request for the authentication data to memory card 110 via bus BS3 and memory card interface 1200. Controller 1420 of memory card 110 receives the send request for the authentication data via terminal 1426, interface 1424 and bus BS4 (step S606).

When controller 1420 receives the send request of authentication data, it reads out authentication data {KPm3//Cm3}KPa from authentication data hold unit 1400 via bus BS4, and outputs authentication data {KPm3//Cm3}KPa thus read to reproduction terminal 102 via bus BS4, interface 1424 and terminal 1426. Controller 1106 of reproduction terminal 102 receives authentication data {KPm3//Cm3}KPa via memory card interface 1200 and bus BS3, and sends authentication data {KPm3//Cm3}KPa to personal computer 50 via bus BS3, USB interface 1112, terminal 1114 and USB cable 70 (step S608).

Thereby, license administration module 511 of personal computer 50 receives authentication data {KPm3//Cm3}KPa via terminal 580 and USB interface 550 (step S610), and decrypts received authentication data {KPm3//Cm3}KPa with authentication key KPa (step S612). License administration module 511 performs the authentication processing based on the result of decryption for determining whether the decryption is performed correctly or not, and thus whether it receives or not the authentication data, which is encrypted for certifying its validity by a proper authentication station, from the legal memory card for authenticating the fact that memory card 110 holds class public encryption key KPm3 and class certificate Cm3 (step S614). If it is determined that the authentication data is valid, license administration module 511 approves and accepts class public encryption key KPm3 and class certificate Cm3. The operation moves to next processing in a step S616. If the authentication data is not valid, license administration module 511 does not approve class public encryption key KPm3 and class certificate Cm3, and the processing ends without accepting these keys (S670).

When it is authenticated that it is the legal memory card, license administration module 511 generates dummy transaction ID (step S616). The dummy transaction ID necessarily takes the value different from all the transaction IDs stored in memory card 110, and is generated as the transaction ID for local use. License administration module 511 generates session key Ks22 for check-in (step S618), and encrypts session key Ks22 thus generated with class public encryption key KPm3 sent from memory card 110 to generate encrypted data {Ks22}Km3 (step S620). License administration module 511 sends dummy transaction ID//{Ks22}Km3, which is prepared by adding dummy transaction ID to encrypted data {Ks22}Km3, to reproduction terminal 102 via USB interface 550, terminal 580 and USB cable 70 (step S622).

Referring FIG. 21, controller 1106 of reproduction terminal 102 receives dummy transaction ID//{Ks22}Km3 via terminal 1114, USB interface 1112 and bus BS3, and sends dummy transaction ID//{Ks22}Km3 thus received to memory card 110 via memory card interface 1200. Controller 1420 of memory card 110 receives check-out transaction ID//{Ks22}Km3 via terminal 1426, interface 1424 and bus BS4 (step S624). Decryption processing unit 1422 receives encrypted data {Ks22}Km3 from controller 1420 via bus BS4, and decrypts encrypted data {Ks22}Km3 with class secret decryption key Km3 sent from Km hold unit 1421. Thereby, decryption processing unit 1422 accepts session key Ks22 (step S626). Session key generation unit 1418 generates session key Ks2 (step S628). Controller 1420 obtains update date/time CRLdate of the certificate revocation list from CRL region 1415A of memory 1415 via bus BS4, and applies the update date/time CRLdate thus obtained to switch 1446 (step S630).

Thereby, encryption processing unit 1406 encrypts session key Ks2, unique public encryption key KPmc4 and update date/time CRLdate of the certificate revocation list, which are obtained by successively selecting the contacts of switch 1446, with session key Ks22, which is decrypted by decryption processing unit 1422 and is obtained via a contact Pa of switch 1442, to generate encrypted data {Ks2//KPmc4//CRLdate}Ks22 as one data. Controller 1420 outputs encrypted data {Ks2//KPmc4//CRLdate}Ks22 to reproduction terminal 102 via bus BS4, interface 1424 and terminal 1426. Controller 1106 of reproduction terminal 102 receives encrypted data {Ks2//KPmc4//CRLdate}Ks22 via memory card interface 1200. Controller 1106 sends it to personal computer 50 via USB interface 1112, terminal 1114 and USB cable 70 (step S632).

License administration module 511 of personal computer 50 receives encrypted data {Ks2//KPmc4//CRLdate}Ks22 via terminal 580 and USB interface 550 (step S634), and decrypts encrypted data {Ks2//KPmc4//CRLdate}Ks22 thus received with session key Ks22. Thereby, license administration module 511 receives session key Ks2, unique public encryption key KPmc4 and update date/time CRLdate of the certificate revocation list (step S636).

License administration module 511 determines whether accepted unique public encryption key KPmc4 is included in the check-out information obtained from the license administration file recorded on HDD 530, and thus whether it matches with unique public encryption key KPmcx stored corresponding to check-out transaction ID of the license to be checked out (step S638). Unique public encryption key KPmc4 is included in the check-out information, which is updated at the time of check-out of the encrypted content data and the license (see step S572 in FIG. 19). Therefore, by preparing the check-out information, which includes unique public encryption key KPmc4 corresponding to the destination of check-out such as the encrypted content data, the check-out destination can be easily specified at the time of check-in.

In step S638, if unique public encryption key KPmc4 is not included in the check-out information, the check-in operation ends (step S670). In step S638, if unique public encryption key KPmc4 is included in the check-out information, license administration module 511 encrypts dummy licenses (dummy transaction ID, dummy content ID, dummy Kc, dummy ACm and dummy ACp) including the dummy transaction ID with unique public encryption key KPmc4 to generate encrypted data {dummy transaction ID//dummy content ID//dummy Kc//dummy ACm//dummy ACp}Kmc4 (step S640).

License administration module 511 encrypts encrypted data {dummy transaction ID//dummy content ID//dummy Kc//dummy ACm//dummy ACp}Kmc4 with session key Ks2 to generate encrypted data {{dummy transaction ID//dummy content ID//dummy Kc//dummy ACm//dummy ACp}Kmc4}Ks2, and sends encrypted data {{dummy transaction ID//dummy content ID//dummy Kc//dummy ACm//dummy ACp}Kmc4}Ks2 to reproduction terminal 102 via USB interface 550, terminal 580 and USB cable 70 (step S642).

Controller 1106 of reproduction terminal 102 receives encrypted data {{dummy transaction ID//dummy content ID//dummy Kc//dummy ACm//dummy ACp}Kmc4}Ks2 via terminal 1114, USB interface 1112 and bus BS3. Controller 1106 sends encrypted data {{dummy transaction ID//dummy content ID//dummy Kc//dummy ACm//dummy ACp}Kmc4}Ks2 thus received to memory card 110 via bus BS3 and memory card interface 1200. Controller 1420 of memory card 110 receives encrypted data {{dummy transaction ID//dummy content ID//dummy Kc//dummy ACm//dummy ACp}Kmc4}Ks2 via terminal 1426, interface 1424 and bus BS4 (step S644).

Referring to FIG. 22, decryption processing unit 1412 of memory card 110 receives encrypted data {{dummy transaction ID//dummy content ID//dummy Kc//dummy ACm//dummy ACp}Kmc4}Ks2 via bus BS4, decrypts it with session key Ks2 generated by session key generation unit 1418, and accepts encrypted data {dummy transaction ID//dummy content ID//dummy Kc//dummy ACm//dummy ACp}Kmc4 (step S646). Decryption processing unit 1404 receives encrypted data {dummy transaction ID//dummy content ID//dummy Kc//dummy ACm//dummy ACp}Kmc4 from decryption processing unit 1412, and decrypts encrypted data {dummy transaction ID//dummy content ID//dummy Kc//dummy ACm//dummy ACp}Kmc4 thus received with unique secret decryption key Kmc4 obtained from Kmc hold unit 1402 to accept dummy licenses (dummy transaction ID, dummy content ID, dummy Kc, dummy ACm and dummy ACp) (step S648).

Controller 510 of personal computer 50 obtains entry number from the license administration file, which is recorded in data region 1415C of memory card 110 and corresponds to the license subjected to the check-out, and sends it as the entry number for storing the dummy licenses to reproduction terminal 102 via USB interface 550, terminal 580 and USB cable 70 (step S649). Thereby, controller 1106 of reproduction terminal 102 receives the entry number via terminal 1114, USB interface 1112 and bus BS3, and stores dummy licenses (dummy transaction ID, dummy content ID, dummy Kc, dummy ACm and dummy ACp), which are obtained in step S648, at the designated entry in license region 1415B of memory 1415 (step S650). By overwriting the license of the check-in target with the dummy license, the license checked out to memory card 110 can be erased.

Thereafter, license administration module 511 of personal computer 50 increments the allowed check-out number in the check-out information by one, and updates the check-out information by deleting the check-out transaction ID and the unique public encryption key KPmc4 of the memory card of the check-out destination (step S652). License administration module 511 prepares new encrypted extended license by effecting unique encryption on the transaction ID, content ID, license key Kc, access control information ACm, reproduction control information ACp and the updated check-out information, and updates the encrypted extended license in the license administration file recorded on HDD 530 (step S654).

Then, license administration module 511 sends a deletion instruction for deleting the content file (encrypted content data {Dc}Kc and additional information Dc-inf} and the license administration file for the license, which has been checked out and is recorded at data region 1415C in memory 1415 of memory card 100, to reproduction terminal 102 via USB interface 550, terminal 580 and USB cable 70 (step S656). Controller 1106 of reproduction terminal 102 receives the deletion instruction for the content file (encrypted content data {Dc}Kc and additional information Dc-inf) and the license administration file via terminal 1114, USB interface 1112 and bus BS3, and outputs the deletion instruction for the content file (encrypted content data {Dc}Kc and additional information Dc-inf) and the license administration file, which is received via bus BS3 and memory card interface 1200, to memory card 110. Thereby, controller 1420 of memory card 110 receives the deletion instruction of the content file (encrypted content data {Dc}Kc and additional information Dc-inf) and the license administration file via terminal 1426, interface 1424 and bus BS4 (step S658). Controller 1420 deletes the content file (encrypted content data {Dc}Kc and additional information Dc-inf) and the license administration file, which are recorded at data region 1415C in memory 1415 via bus BS4 (step S660).

License administration module 511 of personal computer 50 prepares the reproduction list, from which the tunes subjected to check-in are deleted (step S662), and sends the reproduction list and the instruction for rewriting the reproduction list to memory card 110 (step S664). Controller 1420 of memory card 110 receives the reproduction list and the rewriting instruction via reproduction terminal 102 (step S666), and rewrites the reproduction list at data region 1415C in memory 1415 with received reproduction list via bus BS4 (step S668). Thereby, the check-in operation ends (step S670).

As described above, the encrypted content data and the license are returned from the opposite side, from which the encrypted content data and the license are checked out. Thereby, the license distributed via the personal computer or the license obtained by ripping from the CD are given from the license administration module to the memory card (check-out), the license obtained by the license administration module is stored in the memory card and reproduction terminal 102 can reproduce the encrypted content data with the license obtained by the license administration module for the user.

The license given to the memory card cannot be output from the memory card to another record device (memory card or license administration module) according to specification by access control information ACm. Therefore, the given license does not leak. By returning the given license administration module (check-in), the right of the given license returns to the original license administration module. Accordingly, the system described above allows neither unauthorized duplication nor the processing at a reduced security level, and can secure the copyright.

[Distribution 2]

In the data distribution system shown in FIG. 1, the encrypted content data and the license are distributed from distribution server 10 to memory card 110 attached to cellular phone 100 via distribution carrier 20. Description will now be given on the operation of distributing the encrypted content data and the license from distribution server 10 to memory card 110 attached to cellular phone 100. This operation will be referred to as the "distribution 2".

FIGS. 23–26 are first to fourth flowcharts, respectively, which show the distribution operation in the data distribution system shown in FIG. 1, and more specifically, show the distribution to memory card 110 attached to cellular phone 100 at the time of purchasing the encrypted content data.

Figure 23:
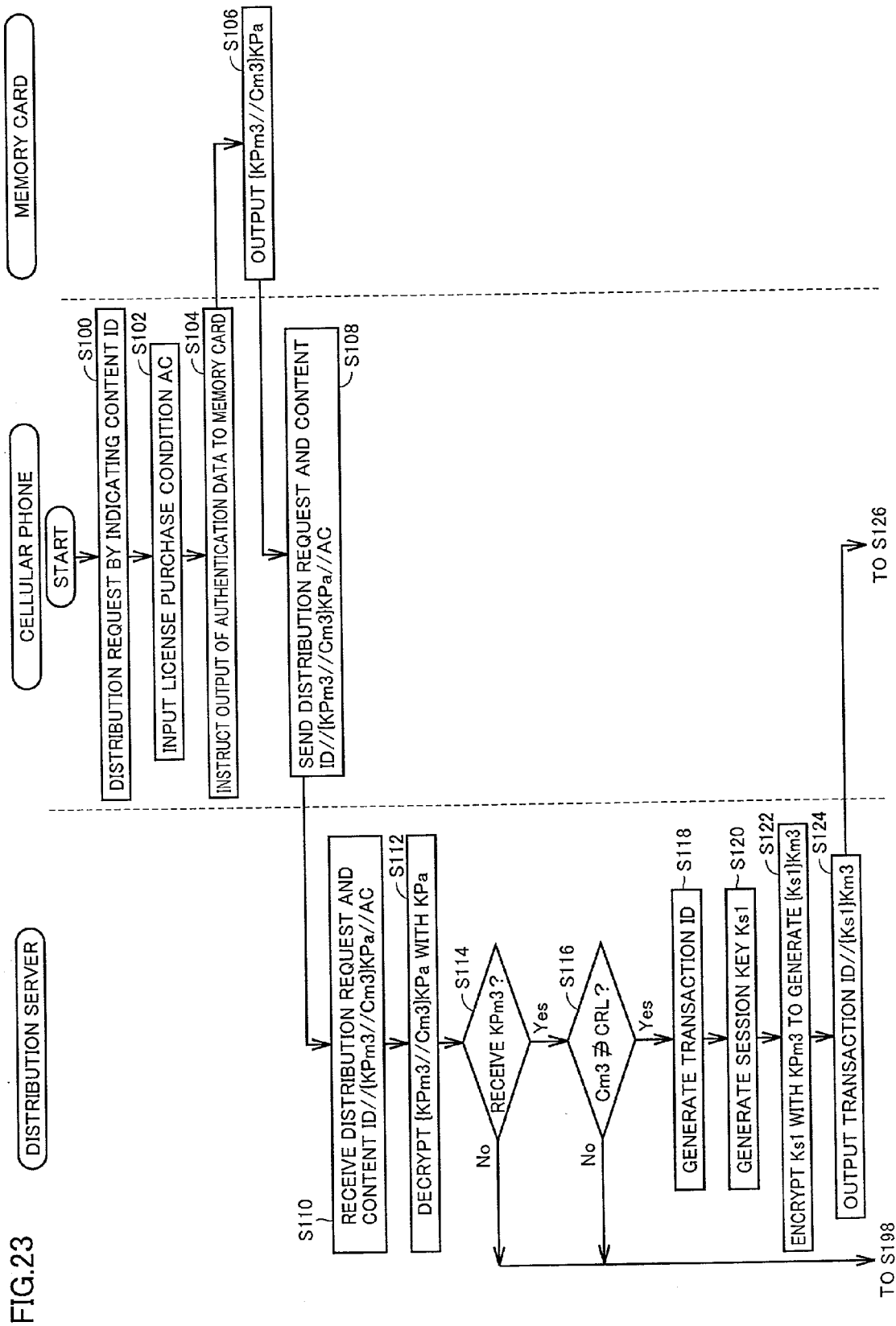
FIGS. 23–26 are first to fourth flowcharts showing an operation of distributing the encrypted content data and the license to a memory card attached to a cellular phone shown in FIG. 1, respectively.

Before the processing shown in FIG. 23, the user of cellular phone 100 connects cellular phone 100 to distribution server 10 over the cellular phone network, and obtains the content ID for the intended content to be purchased. The following description is based on the premise that the above operation is already performed.

Referring to FIG. 23, the user of cellular phone 100 requests the distribution via operation panel 1108 by designating the content ID (step S100). Through operation panel 1108, purchase conditions AC for purchasing the license of the encrypted content data are entered (step S102). More specifically, access control information ACm and reproduction control information ACp of the encrypted content data are set, and purchase conditions AC are input for purchasing license key Kc for decrypting the selected encrypted content data.

When purchase conditions AC of encrypted content data are input, controller 1106 applies the instruction of outputting the authentication data via bus BS3 and memory card interface 1200 to memory card 110 (step S104). Controller 1420 of memory card 110 receives the instruction of outputting the authentication data via terminal 1426, interface 1424 and bus BS4. Controller 1420 reads out authentication data {KPm3//Cm3}KPa from authentication data hold unit 1400 via bus BS4, and outputs authentication data {KPm3//Cm3}KPa via bus BS4, interface 1424 and terminal 1426 (step S106).

In addition to authentication data {KPm3//Cm3}KPa sent from memory card 110, controller 1106 of cellular phone 100 sends the content ID, data AC of license purchase conditions and distribution request to distribution server 10 (step S108).

Distribution server 10 receives the distribution request, content ID, authentication data {KPm3//Cm3}KPa and data AC of license purchase conditions from cellular phone 100 (step S110), and decryption processing unit 312 decrypts the authentication data output from cellular phone 100 with public authentication key KPa (step S112).

Distribution control unit 315 performs authentication processing based on the result of decryption by decryption processing unit 312, and more specifically determines whether it receives the authentication data encrypted for the purpose of verifying its authenticity or validity by a proper authentication station or not (step S114). When it is determined that authentication data is the valid data, distribution control unit 315 approves and accepts class public encryption key KPm3 and class certificate Cm3. The operation moves to a step S116. When distribution control unit 315 determines that it is not the valid authentication data, the data is not approved, and the processing ends without accepting class public encryption key KPm3 and class certificate Cm3 (step S198).

When class public encryption key KPm3 and class certificate Cm3 are accepted as a result of authentication, distribution control unit 315 then refers to CRL database 306 to determine whether class certificate Cm3 of memory card 110 is listed up in certificate revocation list CRL. If this class certificate is listed up in the certificate revocation list, the distribution session ends (step S198).

If the class certificate of memory card 110 is not listed in the certificate revocation list, next processing starts (step S116).

When it is determined from the result of authentication that the access is made from the cellular phone equipped with the memory card having valid authentication data, and the class certificate is not listed in the certificate revocation list, distribution server 10 generates by distribution control unit 315 the transaction ID, which is the administration code for specifying the distribution (step S118). Session key generation unit 316 generates session key Ks1 for distribution (step S120). Session key Ks1 is encrypted by encryption processing unit 318 with class public encryption key KPm3 corresponding to memory card 110 and obtained by decryption processing unit 312 (step S122).

The transaction ID and encrypted session key Ks1 are externally output as transaction ID//{Ks1}Km3 via bus BS1 and communication device 350.

Figure 24:
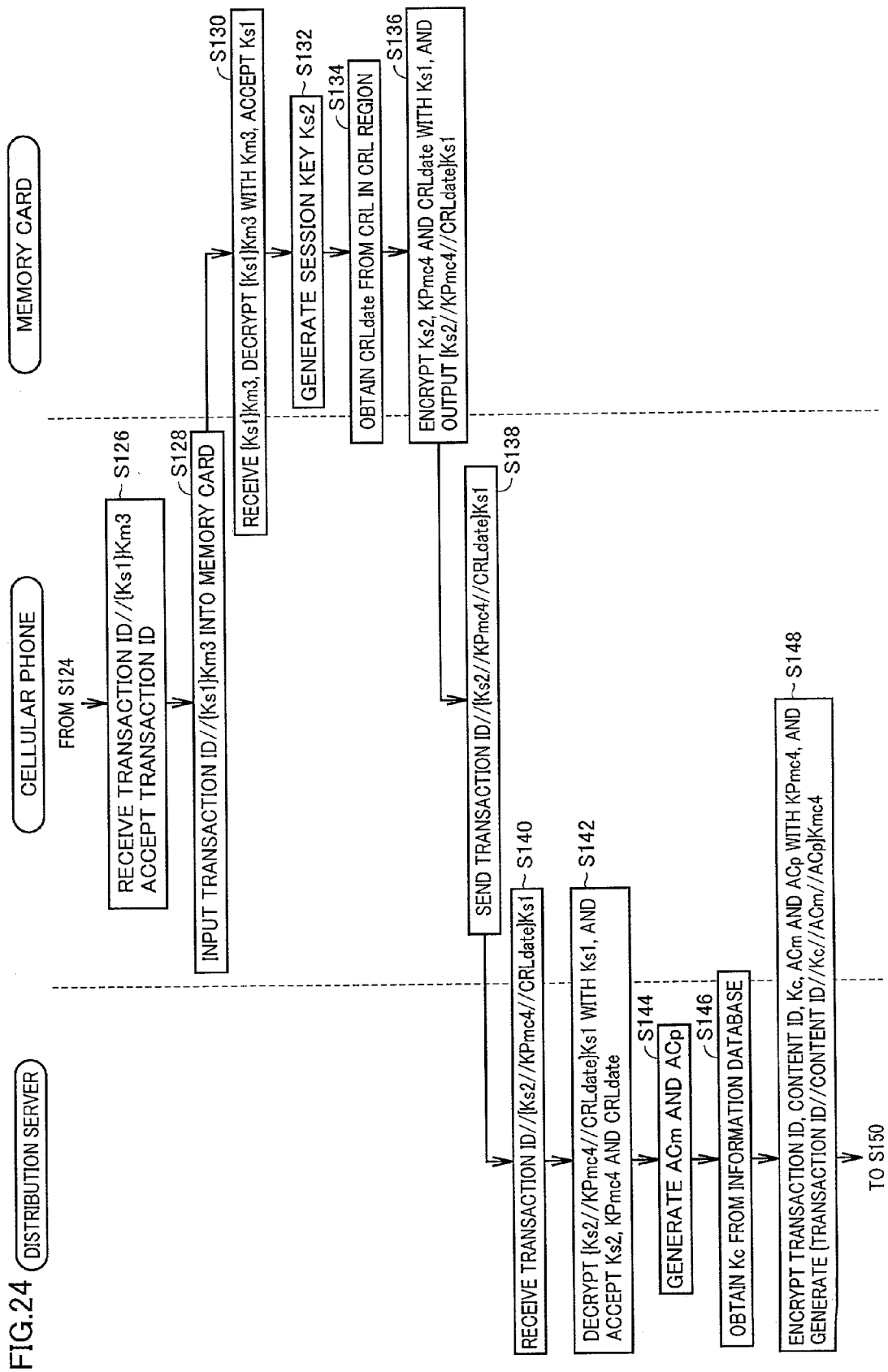

Referring to FIG. 24, when cellular phone 100 receives transaction ID//{Ks1}Km3 (step S126), controller 1106 inputs transaction ID//{Ks1}Km3 to memory card 110 (step S128). In memory card 110, thereby, decryption processing unit 1422 decrypts the received data, which is applied to bus BS4 via terminal 1426 and interface 1424, with class secret decryption key Km3, which is unique to memory card 110 held in Km hold unit 1421, so that session key Ks1 is decrypted and accepted (step S130).

When confirming the acceptance of session key Ks1 generated by distribution server 10, controller 1420 instructs session key generation unit 1418 to generate session key Ks2 to be used at the time of distribution operation in memory card 110. Session key generation unit 1418 generates session key Ks2 (step S132).

In the distribution session, controller 1420 extracts update date/time CRLdate from certificate revocation list CRL recorded in memory 1415 of memory card, and outputs it to switch 1446 (step S134).

Encryption processing unit 1406 encrypts session key Ks2, unique public encryption key KPmc4 and update date/time CRLdate of the certificate revocation list, which are obtained by successively selecting the contacts of switch 1446, with session key Ks1, which is applied by decryption processing unit 1422 via contact Pa of switch 1442, to generate one data, and outputs this data, i.e., encrypted data {Ks2//KPmc4//CRLdate}Ks1 onto bus BS4 (step S136).

Encrypted data {Ks2//KPmc4//CRLdate}Ks1 output onto bus BS4 is sent to cellular phone 100 from bus BS4 via interface 1424 and terminal 1426. Cellular phone 100 adds transaction ID to encrypted data {Ks2//KPmc4//CRLdate}Ks1, and sends transaction ID//{Ks2//KPmc4//CRLdate}Ks1 to distribution server 10 (step S138).

Distribution server 10 receives transaction ID//{Ks2//KPmc4//CRLdate}Ks1, decrypts it with session key Ks1 by decryption processing unit 320 and accepts session key Ks2 generated by cellular phone 100, public encryption key KPmc4 unique to cellular phone 100 and update date/time CRLdate of the certificate revocation list in cellular phone 100 (step S142).

Distribution control unit 315 generates access control information ACm and reproduction control information ACp in accordance with content ID and data AC of the license purchase conditions obtained in step S110 (step S144).

Distribution control unit 315 further obtains license key Kc for decrypting the encrypted content data from information database 304 (step S146).

Distribution control unit 315 applies the generated licenses, i.e., transaction ID, content ID, license key Kc, reproduction control information ACp and access control information ACm to encryption processing unit 326. Encryption processing unit 326 encrypts the licenses with public encryption key KPmc4, which is unique to cellular phone 100 and is obtained by decryption processing unit 320, to generate encrypted content data {transaction ID//content ID//Kc//ACm//ACp}Kmc4 (step S148).

Figure 25:
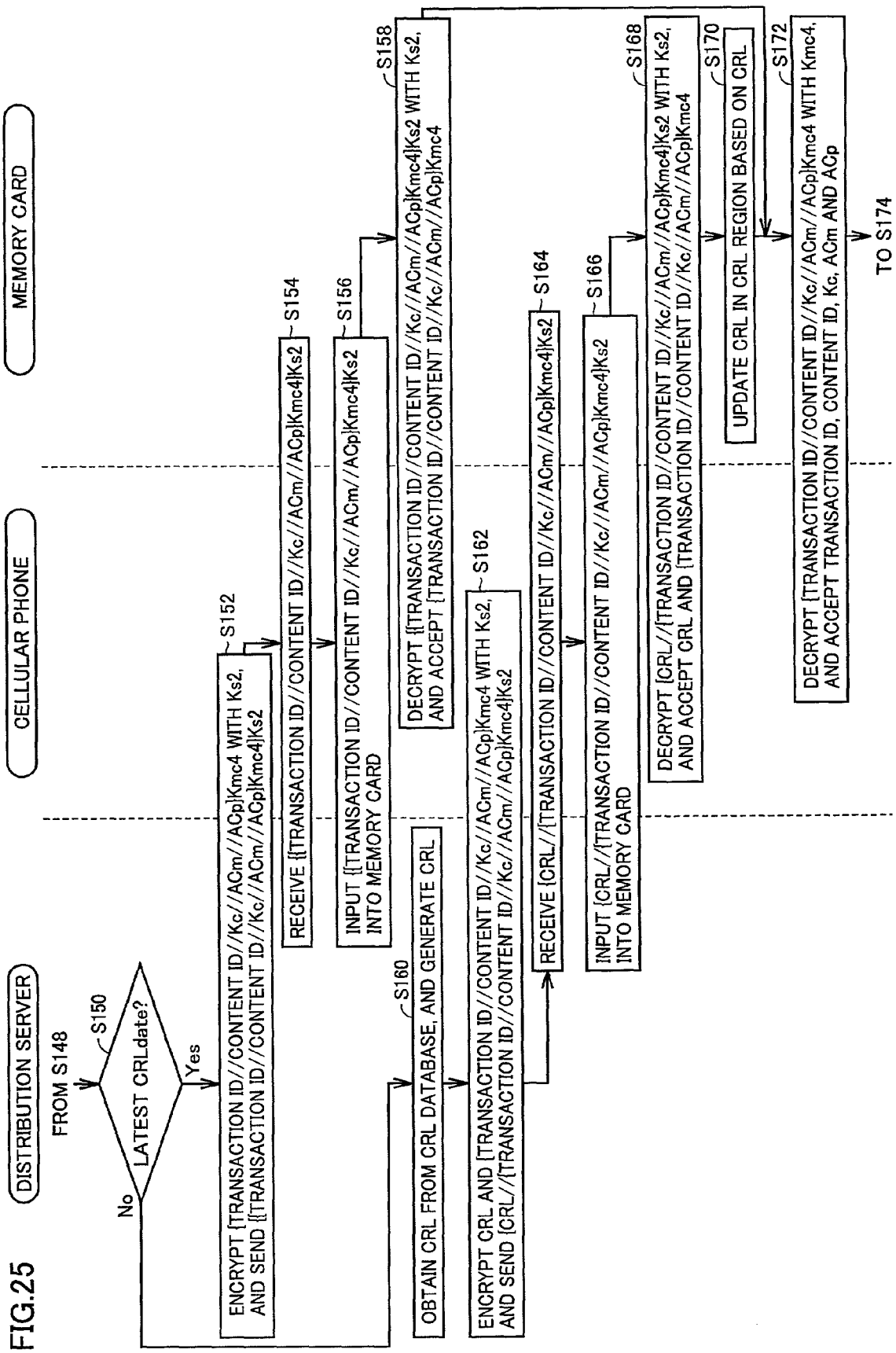

In distribution server 10, as shown in FIG. 25, update date/time CRLdate of the certificate revocation list, which is sent from memory card 110, is compared with the update date/time of certificate revocation list CRL of distribution server 10 held in CRL database 306, and thereby it is determined whether the certificate revocation list CRL held in memory card 110 is the latest or not. If it is determined that the certificate revocation list CRL held in memory card 110 is the latest, the operation moves to a step S152. If the certificate revocation list CRL held in memory card 110 is not the latest, the operation moves to a step S160 (step S150).

When it is determined that list CRL is the latest, encryption processing unit 328 encrypts the encrypted data {transaction ID//content ID//Kc//ACm//ACp}Kmc4 output from encryption processing unit 326 with session key Ks2 generated by memory card 110, and outputs encrypted data {{transaction ID//content ID//Kc//ACm//ACp}Kmc4}Ks2 onto bus BS1. Distribution control unit 315 sends encrypted data {{transaction ID//content ID//Kc//ACm//ACp}Kmc4}Ks2 on bus BS1 to cellular phone 100 via communication device 350 (step S152).

Controller 1106 of cellular phone 100 receives encrypted data {{transaction ID//content ID//Kc//ACm//ACp}Kmc4}Ks2 (step S154), and inputs it to memory card 110 via bus BS3 and memory card interface 1200. Decryption processing unit 1412 of memory card 110 receives {{transaction ID//content ID//Kc//ACm//ACp}Kmc4}Ks2 via terminal 1426 and interface 1424, and decrypts it with session key Ks2 generated by session key generation unit 1418 to accept {transaction ID//content ID//Kc//ACm//ACp}Kmc4 (step S158). Thereafter, the operation moves to a step S172.

If it is determined in distribution server 10 that certificate revocation list CRL held in memory card 110 is not the latest, distribution control unit 315 obtains the latest certificate revocation list CRL from CRL database 306 via bus BS1 (step S160).

Encryption processing unit 328 receives the output of encryption processing unit 326 and latest certificate revocation list CRL supplied from distribution control unit 315 via bus BS1, and encrypts it with session key Ks2 generated in memory card 110. Encrypted data {CRL//{transaction ID//content ID//Kc//ACm//ACp}Kmc4}Ks2 output from encryption processing unit 328 is sent to cellular phone 100 via bus BS1 and communication device 350 (step S162).

Cellular phone 100 receives encrypted data {CRL//{transaction ID//content ID//Kc//ACm//ACp}Kmc4}Ks2 sent thereto (step S164), and controller 1106 inputs encrypted data {CRL//{transaction ID//content ID//Kc//ACm//ACp}Kmc4}Ks2 via bus BS3 and memory card interface 1200 (step S166). In memory card 110, decryption processing unit 1412 decrypts the received data applied onto bus BS4 via terminal 1426 and interface 1424. Decryption processing unit 1412 decrypts the received data on bus BS4 with session key Ks2, which is applied from session key generation unit 1418, and outputs it onto bus BS4 (step S168).

In this stage, bus BS4 receives encrypted content data {transaction ID//content ID//Kc//ACm//ACp}Kmc4, which can be decrypted with secret decryption key Kmc4 held on Kmc hold unit 1402, and latest certificate revocation list CRL is output (step S168). In accordance with the instruction from controller 1420, CRL region 1415A in memory 1415 is updated with accepted certificate revocation list CRL (step S170).

The operations in steps S152, S154, S156 and S158 are executed for distributing the licenses to memory card 110 when certificate revocation list CRL in memory card 110 is the latest. The operations in steps S160, S162, S164, S166, S168 and S170 are likewise executed for distributing the licenses to memory card 110 when certificate revocation list CRL in memory card 110 is not the latest. By these operations, it is determined whether the certificate revocation list CRL of the memory card obtained by the distribution is the latest or not, and this determination is performed one by one based on update date/time CRLdate of the certificate revocation list sent from memory card 110. If it is not the latest, the latest certificate revocation list CRL is obtained from CRL database 306, and is distributed to memory card 110. Thereby, distribution of the license to the memory card, of which license is broken, can be prevented.

After steps S158 or S170, controller 1420 instructs decryption processing unit 1404 to decrypt encrypted data {transaction ID//content ID//Kc//ACm//ACp}Kmc4 with unique secret decryption key Kmc4, and licenses (license key Kc, transaction ID, content ID, access control information ACm and reproduction control information ACp) are accepted (step S172).

Figure 26:
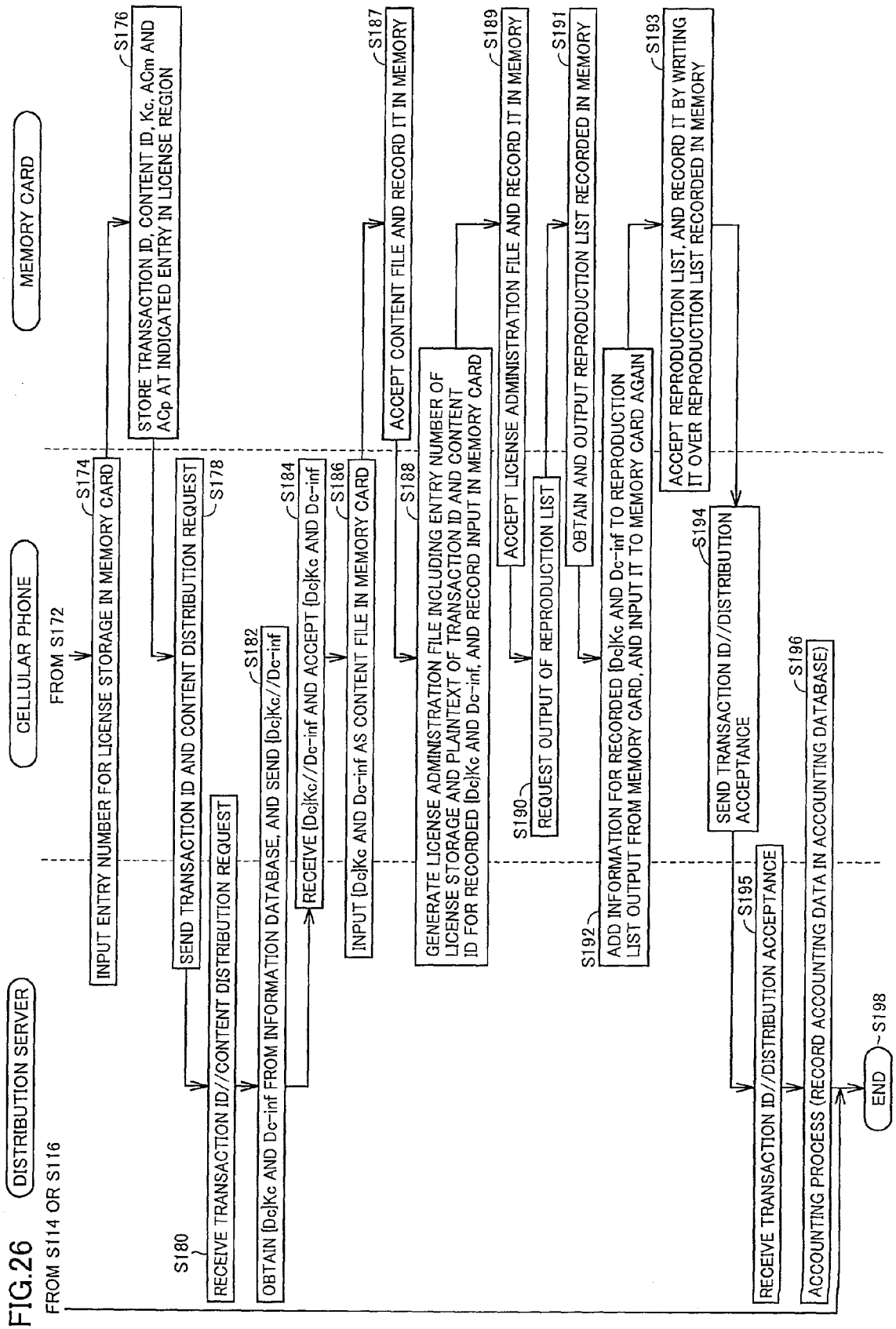

Referring to FIG. 26, controller 1106 of cellular phone 100 inputs the entry number indicating the entry for storing the licensees, which are received by memory card 110, to memory card 110 (step S174). Thereby, controller 1420 of memory card 110 receives the entry number via terminal 1426 and interface 1424, and stores licenses (license key Kc, transaction ID, content ID, access control information ACm and reproduction control information ACp), which are obtained in step S172, at license region 1415B in memory 1415 designated by the received entry number (step S176).

Controller 1106 of cellular phone 100 sends the request of distribution of the transaction ID and the encrypted content data, which are sent from distribution server 10, to distribution server 10 (step S178).

Distribution server 10 receives the request of distribution of the transaction ID and the encrypted content data (step S180). Distribution control unit 315 obtains encrypted content data {Dc}Kc and additional information Dc-inf from information database 304, and outputs these data and information via bus BS1 and communication device 350 (step S182).

Cellular phone 100 receives {Dc}Kc//Dc-inf, and accepts encrypted content data {Dc}Kc and additional information Dc-inf (step S184). Thereby, controller 1106 inputs encrypted content data {Dc}Kc and additional information Dc-inf as one content file to memory card 110 via bus BS3 and memory card interface 1200 (step S186). Controller 1420 of memory card 110 receives content file (encrypted content data {Dc}Kc and additional information Dc-inf) via terminal 1426, interface 1424 and bus BS4, and records then in data region 1415C of memory 1415 (step S187). Controller 1106 generates the license administration file, which includes the entry number of the license stored in memory card 110 as well as plaintext of transaction ID and content ID, for encrypted content data {Dc}Kc and additional information Dc-inf, and inputs it in memory card 110 (step S188) Controller 1420 of memory card 110 receives the license administration file, and records it in data region 1415C of memory 1415 via bus BS4 (step S189). Further, cellular phone 100 inputs the request for output of the reproduction list to memory card 110 (step S190). Controller 1420 accepts the request for output of the reproduction list, and obtains the reproduction list recorded in memory 1415 from data region 1415C of memory 1415 for outputting it via terminal 1426 (step S191). Thereby, controller 1106 of cellular phone 100 adds to the reproduction list, which is output from memory card 110, the accepted content information, and more specifically adds names of the recorded content file and license administration file as well as information (titles of tunes and names of artists) relating to the encrypted content data and extracted from additional information Dc-inf for inputting them to the memory card 110 again (step S192). Controller 1420 of memory card 110 receives the input of the reproduction list, to which information relating to the received content is added, and record it by writing it over the reproduction list stored in data region 1415C of memory 1415 (step S193). Then, controller 1106 of the cellular phone 100 sends the transaction ID and distribution acceptance to distribution server 10 (step S194).

When distribution server 10 receives transaction ID//distribution acceptance (step S195), it stores the accounting data in account database 302, and records the transaction ID in distribution log database 308. Then, it executes processing of ending the distribution (step S196). Thereby, the whole processing ends (step S198).

As described above, it is determined that memory card 110 attached to cellular phone 100 is the device holding the legal or valid authentication data, and at the same time, it is determined that public encryption key KPm3, which can be encrypted and sent together with class certificate Cm3, is valid. After determining these facts, the content data can be distributed only in response to the distribution request, which is sent from the memory card having class certificate Cm3 not listed in the certificate revocation list (i.e., the memory card not mentioned in the certificate revocation list of certificates, of which encryption with public encryption key KPm3 is broken). It is possible to inhibit the distribution to unauthorized memory card as well as the distribution using the descrambled or broken class key.

The encryption keys generated in the distribution server and the memory card are transmitted between them. Each of the distribution server and the memory card executes the encryption with the received encryption key, and sends the encrypted data to the other so that the mutual authentication can be practically performed even when sending and receiving the encrypted data, and it is possible to improve the security in the data distribution system.

Figure 27:
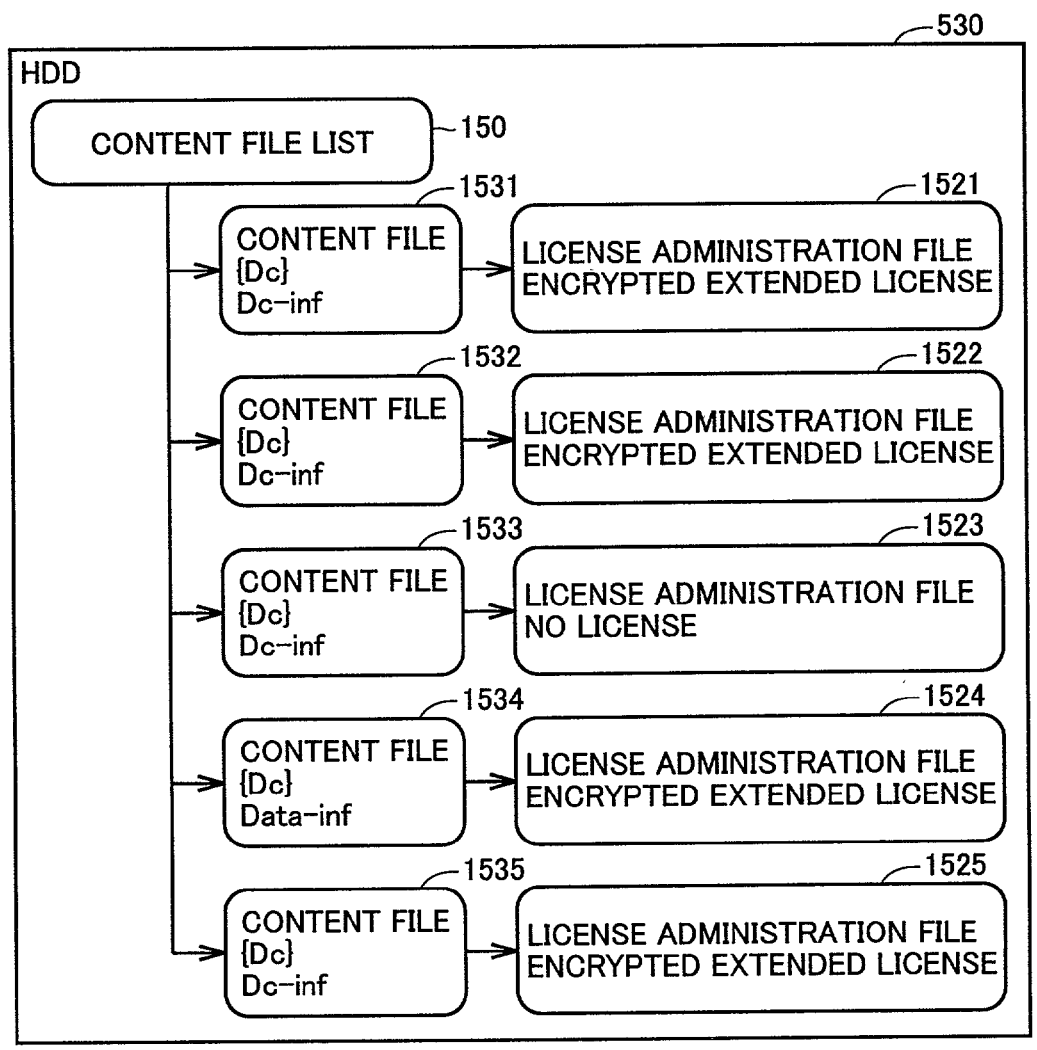
FIG. 27 shows a structure of a content list file in a hard disk of the personal computer.

Referring to FIG. 27, description will now be given on the administration of the encrypted content data and the license received by license administration module 511 of personal computer 50. HDD 530 of personal computer 50 includes a content list file 150, content files 1531–1535 and license administration files 1521–1525.

Content list file 150 is a data file of owned contents in a list format, and includes information (e.g., title of tune and name of artist) for each content as well as information (file names) representing the content files and license administration files. Information of each content is mentioned by obtaining necessary information from additional information Dc-inf at the time of reception of the content, or is mentioned in accordance with the instruction by the user. The contents, which include only the content file or license administration file, and thus cannot be reproduced, can be administered in the list.

Content files 1531–1535 are files storing encrypted content data {Dc}Kc and additional information Dc-inf, which are obtained by license administration module 511, and are provided for the respective contents.

License administration files 1521–1525 are recorded corresponding to content files 1531–1535, respectively, and are employed for administering the licenses obtained by license administration module 511. As can be seen from the description already given, it is usually impossible to refer to the licenses, and information other that license key Kc does not cause a problem relating to copyright only if rewriting by the user is merely inhibited. However, if license key Kc and the other information were administered separately or independently of each other when operating the system, this would lower the security level. Accordingly, in the case of receiving the distributed licenses, the transaction ID and content ID, which can be referred to as information of plaintext, as well as copies of matters restricted by access control information ACm and reproduction control information ACp, which can be easily determined from license purchase conditions AC, are recorded in the form of plain text. As the license, the encrypted extended license (license and check-out information) is recorded. The encrypted extended license is subjected to unique encryption by license administration module 511. The unique encryption is achieved by relating the encryption to information, which can be obtained from personal computer 50, and allows specification of personal computer 50. This information is, e.g., an individual number of the controller (CPU) of each personal computer 50 or a version number of BIOS, which is a startup program of the personal computer. Therefore, the encrypted content data and the license thus generated forms the license unique to personal computer 50, and duplication thereof is meaningless with respect to other devices.

When encrypted content data of the file names recorded in content file 1531 is moved to memory card 110 attached to cellular phone 100 or reproduction terminal 102, content file 1531 can be extracted by searching content list file 150. Thereby, it can be determined that the license for reproducing the encrypted content data is stored in license administration file 1521. In the case where the content file is present but the license file is not present, "no license" is recorded as is done in license administration file 1523.

Figure 28:
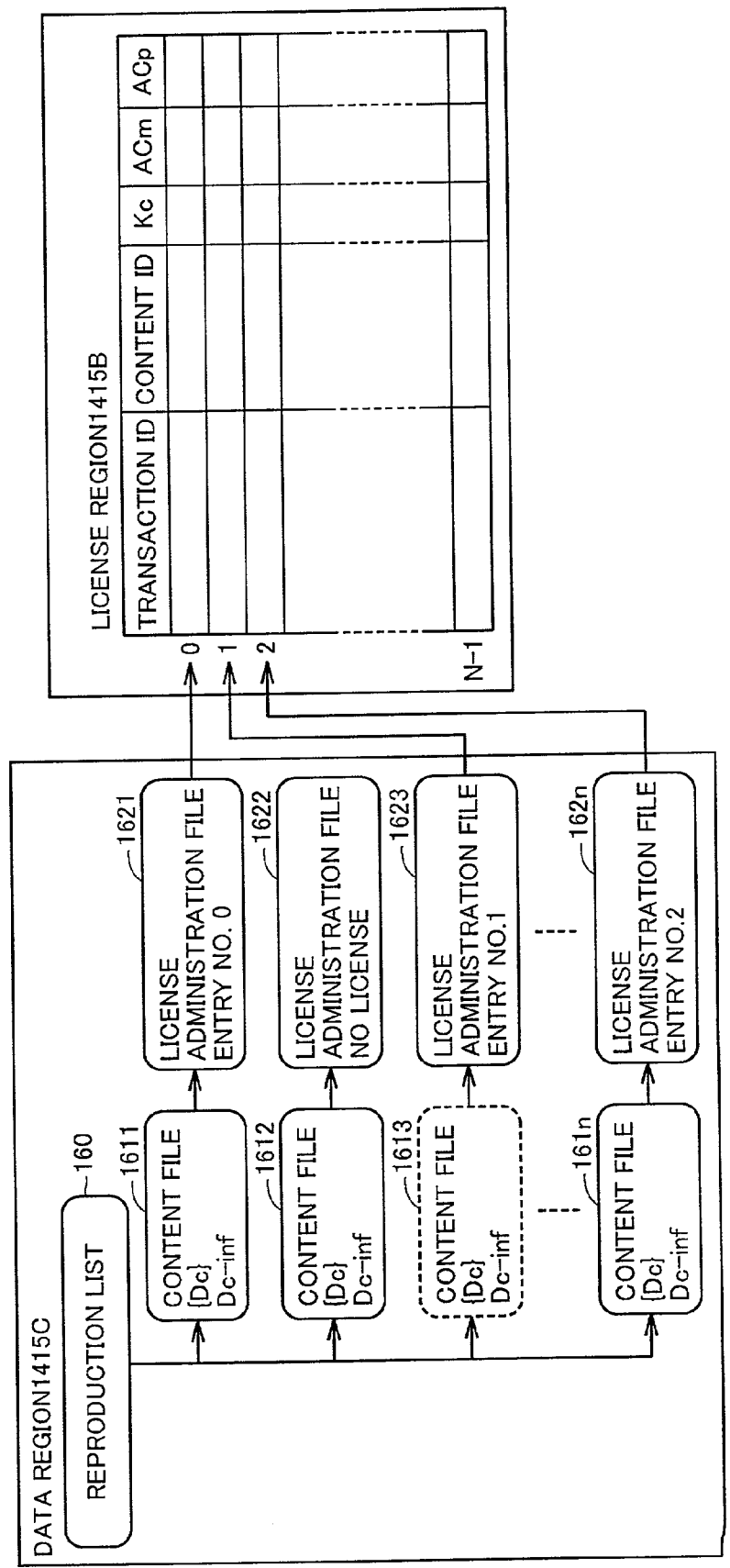
FIG. 28 shows a structure of a reproduction list file in the memory card.

FIG. 28 shows data region 1415C and license region 1415B in memory 1415 of memory card 110. In data region 1415C, there are recorded reproduction file 160, content files 1611–161n and license administration files 1621–162n. Each of content files 1611–161n includes encrypted content data {Dc}Kc and additional information Dc-inf recorded as one file. License administration files 1621–162n are recorded corresponding to content files 1611–161n, respectively.

Memory card 110 records the encrypted content data and the license in memory 1415 when it receives the encrypted content data and the license from distribution server 10, or when it receives by "check-out" the encrypted content data and the license from personal computer 50. Thus, memory card 110 administers the license by hardware.

Accordingly, the license, which is received by license administration module 511 of personal computer 50 and is sent to memory card 110 by the check-out, is recorded at a region designated by the entry number in license region 1415B of memory 1415, and can be read out by specifying the license administration file in accordance with the reproduction list file 160 recorded at data region 1415C of memory 1415. By this reading, the entry number can be obtained, and the license corresponding to the entry number thus obtained can be read from license region 1415B.

[Reproduction]

As described above, memory card 110 attached to cellular phone 100 or reproduction terminal 102 can directly receive the encrypted content data and the license from distribution server 10. Memory card 110 can receive the encrypted content data and the license, which are taken into personal computer 50 by software from distribution server 10, by the concept of "check-out" from personal computer 50. Further, memory card 110 can receive the encrypted content data and the license, which are taken into personal computer 50 by ripping from the music CD, by the concept of "check-out" from personal computer 50.

As described above, memory card 110 receives the encrypted content data and the license in various manners. Encrypted content data, which is received in the memory card in these manners, is reproduced as follows.

Figure 29:
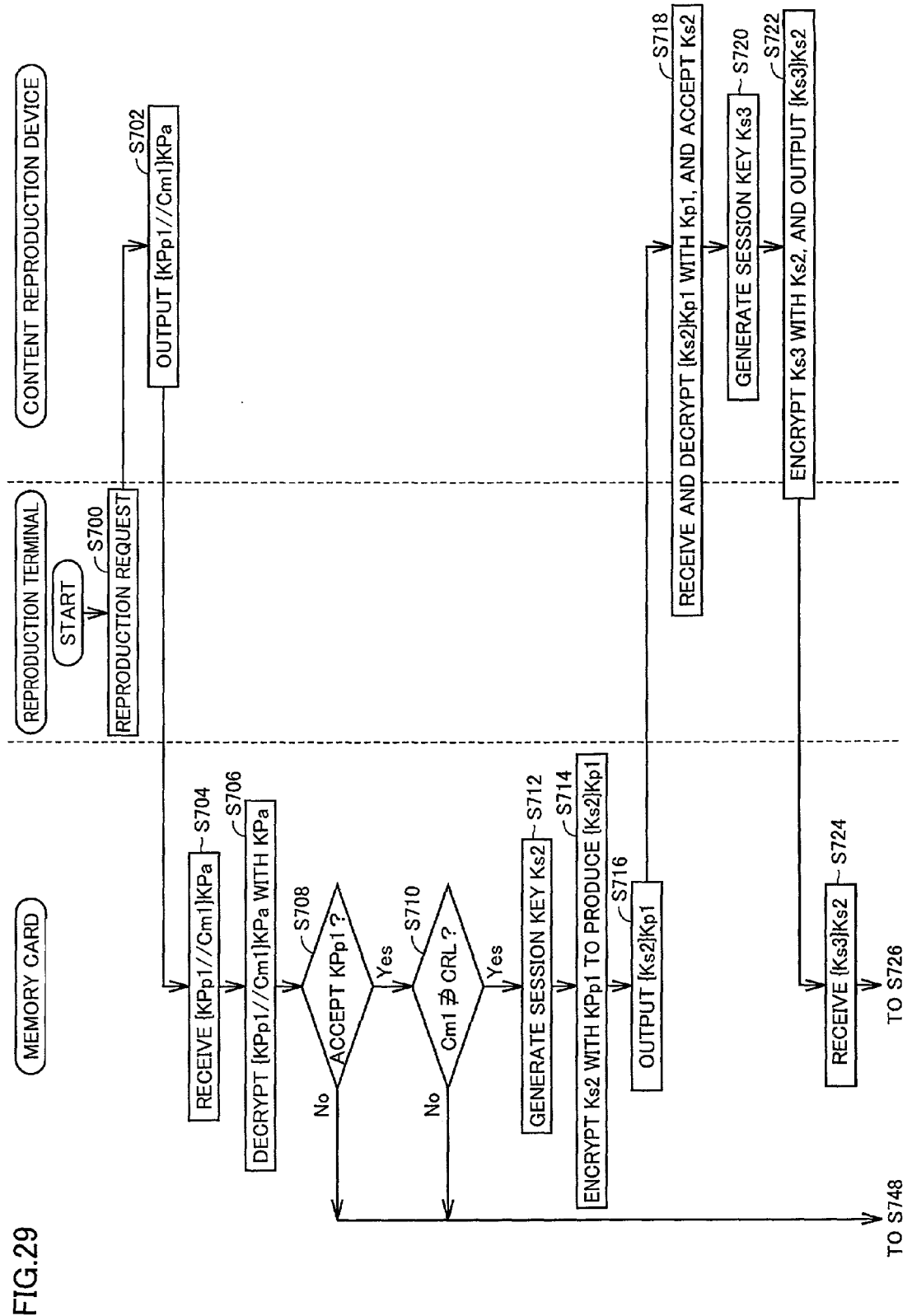
FIGS. 29 and 30 are first and second flowcharts showing a reproduction operation in the cellular phone, respectively.
Figure 30:
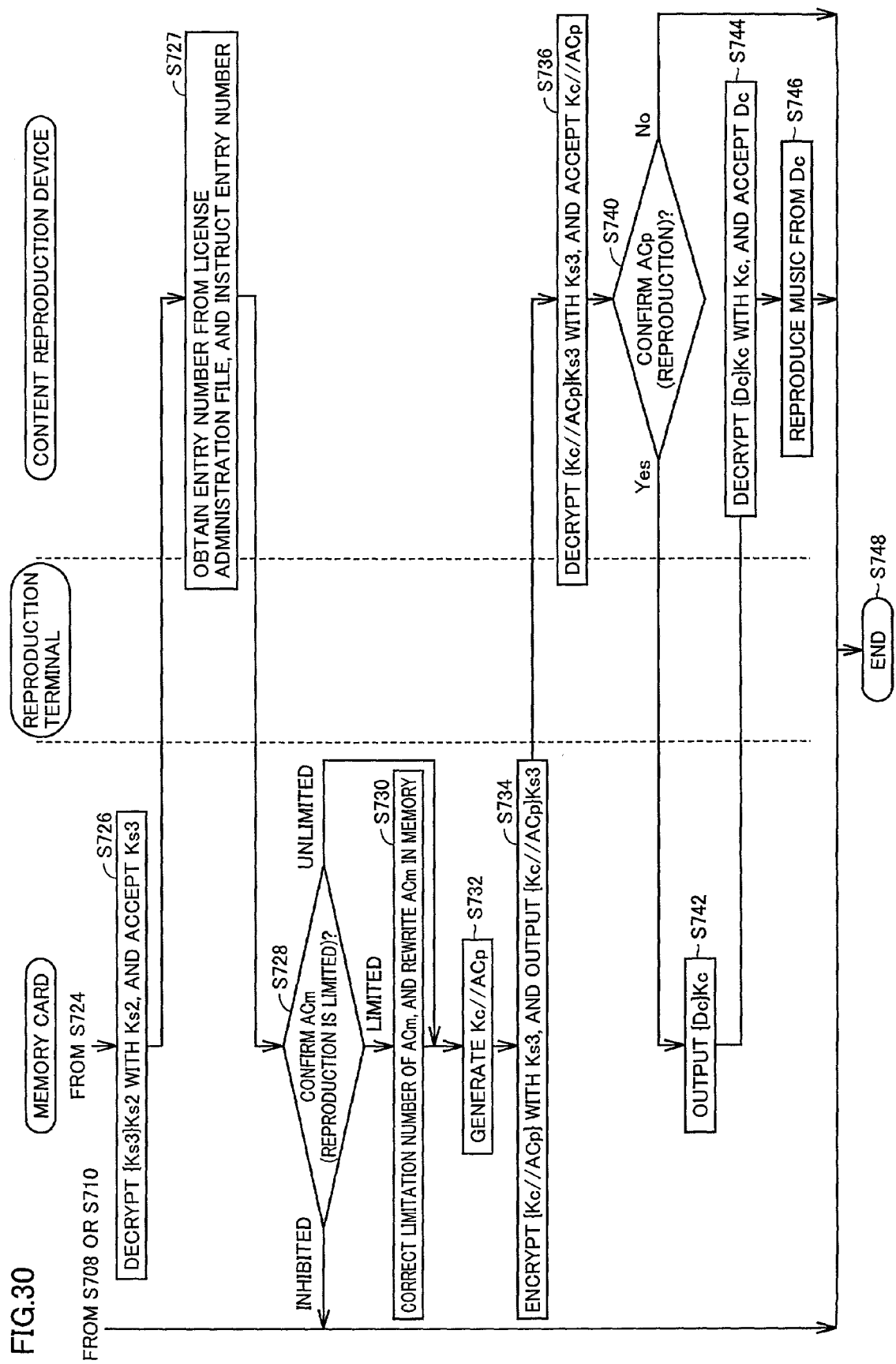

FIGS. 29 and 30 are first and second flowcharts showing the operation of reproducing the content data, which is received by memory card 110, by reproduction terminal 102, respectively. The following description will be given on the case of the reproduction by reproduction terminal 102 shown in FIG. 2. However, reproduction by cellular phone 100 shown in FIG. 1 is similar to that by reproduction terminal 102 except for that reproduction terminal 102 is replaced with cellular phone 100. Before the processing shown in FIG. 29, the user of reproduction terminal 102 determines the content (song or tune) to be reproduced in accordance with the reproduction list file, which is recorded at data region 1415C in memory card 110, specifies the content file and obtains the license administration file. The following description is based on the premise that the above operation is already performed.

Upon start of the reproduction, as shown in FIG. 29, the user of reproduction terminal 102 inputs the reproduction instruction through operation panel 1108 to reproduction terminal 102 (step S700). Thereby, controller 1106 reads out authentication data {KPp1//Cp1}KPa from authentication data hold unit 1500 via bus BS3, and outputs authentication data {KPp1//Cp1}KPa to memory card 110 via memory card interface 1200 (step S702).

Thereby, memory card 110 accepts authentication data {KPp1//Cp1}KPa (step S704). Decryption processing unit 1408 of memory card 110 decrypts accepted authentication data {KPp1//Cp1}KPa with public authentication key KPa held in KPa hold unit 1414 (step S706), and controller 1420 performs the authentication based on the result of decryption in decryption processing unit 1408. This authentication is performed for determining whether authentication data {KPp1//Cp1}KPa is the legal authentication data or not (step S708). If it cannot be decrypted, the operation moves to step S748, and the reproduction operation ends. When the authentication data can be decrypted, controller 1420 determines whether certificate Cm1 obtained thereby is included in certificate revocation list CRL read from CRL region 1415A in memory 1415 or not (step S710). In this case, an identification number is assigned to class certificate Cp1, and controller 1420 determines whether the identification number of accepted class certificate Cp1 is included in certificate revocation list data or not. When it is determined that class certificate Cp1 is included in certificate revocation list data, the operation moves to a step S748, and the reproduction operation ends.

When it is determined in step S710 that class certificate Cp1 is not included in certificate revocation list data CRL, session key generation unit 1418 of memory card 110 generates session key Ks2 for reproduction session (step S712). Encryption processing unit 1410 encrypts session key Ks2 generated by session key generation unit 1418 with public encryption key KPp1, which is decoded by decryption processing unit 1408, and outputs data {Ks2}Kp1 thus encrypted onto bus BS3 (step S714). Thereby, controller 1420 outputs encrypted data {Ks2}Kp1 to memory card interface 1200 via interface 1424 and terminal 1426 (step S716). Controller 1106 of reproduction terminal 102 obtains encrypted data {Ks2}Kp1 via memory card interface 1200. Kp hold unit 1502 outputs class secret decryption key Kp1 to decryption processing unit 1504.

Decryption processing unit 1504 decrypts encrypted data {Ks2}Kp1 with class secret decryption key Kp1, which is paired with class public encryption key KPp1, and outputs session key Ks2 to encryption processing unit 1506 (step S718). Thereby, session key generation unit 1508 generates session key Ks3 for reproduction session, and outputs session key Ks3 to encryption processing unit 1506 (step S720). Encryption processing unit 1506 encrypts session key Ks3 generated by session key generation unit 1508 with session key Ks2 sent from decryption processing unit 1504 to output encrypted data {Ks3}Ks2. Controller 1106 outputs encrypted data {Ks3}Ks2 to memory card 110 via bus BS3 and memory card interface 1200 (step S722).

Thereby, decryption processing unit 1412 of memory card 110 inputs encrypted data {Ks3}Ks2 via terminal 1426, interface 1424 and bus BS4 (step S724).

Referring to FIG. 30, decryption processing unit 1412 decrypts encrypted data {Ks3}Ks2 with session key Ks2 generated by session key generation unit 1418, and accepts session key Ks3 generated by reproduction terminal 102 (step S726).

Controller 1106 of reproduction terminal 102 obtains the number of entry, in which the license is stored, from the license administration file of the reproduction request tunes obtained in advance from memory card 110, and outputs the obtained entry number to memory card 110 via memory card interface 1200 (step S727).

In accordance with input of the entry number, controller 1420 determines access control information ACm (step S728).

In step S728, access control information ACm, which is the information relating to the restriction on the access to memory 1415, is determined. More specifically, the reproduction number is determined. If reproduction is already impossible, the reproduction operation ends, and the reproduction number of access control information ACm is updated (decremented by one) if the reproduction number of access control information ACm is restricted. Then, the processing moves to the next step (step S730). If the reproduction time of access control information ACm does not restrict the reproduction, step S730 is skipped, and the processing moves to the next step (step S732) without updating the reproduction number of access control information ACm (step S732).

If it is determined in step S728 that the reproduction can be performed in the current reproduction operation, license key Kc of the reproduction request tune and reproduction control information ACp recorded at license region 1415B in memory 1415 are output onto bus BS4 (step S732).

License key Kc and reproduction control information ACp thus obtained are sent to encryption processing unit 1406 via a contact Pf of switch 1446. Encryption processing unit 1406 encrypts license key Kc and reproduction control information ACp received via switch 1446 with session key Ks3, which is received from decryption processing unit 1412 via contact Pb of switch 1442, and outputs encrypted data {Kc//ACp}Ks3 onto bus BS4 (step S734).

Encrypted data {Kc//ACp}Ks3 output onto bus BS4 is sent to reproduction terminal 102 via interface 1424, terminal 1426 and memory card interface 1200.

In reproduction terminal 102, decryption processing unit 1510 decrypts encrypted data {Kc//ACp}Ks3 transmitted onto bus BS4 via memory card interface 1200, and license key Kc and reproduction control information ACp are accepted (step S736). Decryption processing unit 1510 transmits license key Kc to decryption processing unit 1516, and outputs reproduction control information ACp onto bus BS3.

Controller 1106 accepts reproduction control information ACp via bus BS3, and determines whether the reproduction is allowed or not (step S740).

If it is determined in step S740 from reproduction control information ACp that the reproduction is not allowed, the reproduction operation ends.

If it is determined in step S740 that the reproduction is allowed, controller 1106 requests encrypted content data {Dc}Kc to memory card 110 via memory card interface 1200. Thereby, controller 1420 of memory card 110 obtains encrypted content data {Dc}Kc from memory 1415, and outputs it to memory card interface 1200 via bus BS4, interface 1424 and terminal 1426 (step S742).

Controller 1106 of reproduction terminal 102 obtains encrypted content data {Dc}Kc via memory card interface 1200, and applies encrypted content data {Dc}Kc to content decrypting circuit 1540 via bus BS3.

Content decrypting circuit 1540 decrypts encrypted content data {Dc}Kc with license key Kc sent from decryption processing unit 1510 to obtain content data Dc (step S744). Content data Dc thus decrypted is output to music reproduction unit 1518. Music reproduction unit 1518 reproduces content data Dc, and D/A converter 1519 converts digital signals into analog signals, and outputs them to terminal 1520. The music data is output from terminal 1520 via the external output device to headphones 130, and is reproduced thereby (step S746). Thereby, the reproduction operation ends.

The operations in steps S742, S744 and S746 are performed for each of blocks BLK1, BLK2, . . . BLKk of encrypted content data {Dc}Kc. In step S742, controller 1106 receives block BLK1 from memory card 110 via memory card interface 1200, and determines whether the received block BLK1 is encrypted or not. Then, controller 1106 outputs block BLK1 to header detection unit 1511 of content decrypting circuit 1504 via bus BS3. Header detection unit 1511 separates header 831 of received block BLK1 from data 832, and determines whether the scramble flag contained in separated header 831 is "1" or "0", If the scramble flag is "1", header detection unit 1511 outputs the data to decryption processing unit 1513. If it is "0", header detection unit 1511 outputs the data to delay unit 1512. Decryption unit 1513 decrypts the data sent from header detection unit 1511, i.e., the encrypted content data with license key Kc sent from decryption processing unit 1510, and outputs plaintext of the content data to terminal 1516. Delay unit 1512 delays the plaintext of content data sent from header detection unit 1511 by a time, which is equal to decryption processing time required for decrypting the encrypted content data with license key Kc, and outputs it to terminal 1517.

Switch 1530 selects terminal 1516 or 1517 depending on the result of determination of the scramble flag sent from header detection unit 1511, and selects the content data output onto terminal 1516 or 1517. More specifically, when switch 1530 receives the signal indicating the input of the encrypted block from header detection unit 1511, it closes terminal 1516 to select the content data output to terminal 1516 for outputting it to music reproduction unit 1518. When switch 1530 receives the signal indicating the input of non-encrypted block from header detection unit 1511, it closes terminal 1517 to select the content data output to terminal 1517 for outputting it to music reproduction unit 1518. Controller 1514 sends to controller 1106 the request for obtaining next block BLK2 so that lack of data does not occur in music reproduction unit 1518.

Controller 1106 obtains next block BLK2 from memory card 110 in accordance with the request for obtaining the next block BLK2, and outputs it to header detection unit 1511 via bus BS3.

By repeating the above operations, encrypted content data {Dc}Kc for blocks BLK1, BLK2, . . . BLKk is reproduced block by block. After the final block BLKk is reproduced, the reproduction operation ends.

When supplying blocks BLK1, BLK2, . . . BLKk to content decrypting circuit 1540 in response to the request for the blocks, controller 1106 refers to the scramble flags included in the headers of respective blocks BLK1, BLK2, . . . BLKk. Based on the scramble flags, controller 1106 counts the encrypted blocks or the non-encrypted blocks, which are continuously input to content decrypting circuit 1540. Based on the result of this counting or measurement, controller 1106 stops decryption and reproduction of encrypted content data {Dc}Kc, e.g., when a predetermined number or more of the non-encrypted blocks are continuously obtained from memory card 110 in the manner, which will be described later.

According to the feature of this invention, reproduction of encrypted content data {Dc}Kc is stopped if the predetermined number or more of non-encrypted blocks are continuous to each other. The operation of controller 1106 for the above will now be described with reference to a flowchart of FIG. 31. When the operation starts, controller 1106 sets n (n: natural number) to "0" (step S900). Controller 1106 determines whether obtaining of data from memory card 110 is completed or not (step S901). If completed, the operation moves to step S908, and the reproduction operation ends.

If it is determined in step S901 that the obtaining of data is not completed, controller 1106 reads out one block from memory card 110 (step S902). When controller 1106 reads out one block from memory card 110, it add 1 to n (step S903). Thereafter, controller 1106 determines from the scramble flag included in the header whether the block obtained from memory card 110 is encrypted or not (step S904). When scramble flag is "0", it is determined whether n is equal to P (n=P) or not (step S905). If n =P, and therefore if it is determined that non-encrypted blocks of P or more in number are continuous in the encrypted content data, the operation moves to step S908, and the reproduction operation ends. In this case, the non-encrypted blocks of P in number are continuously input to content decrypting circuit 1540, and it is controlled to stop the reproduction of the encrypted content data, which can be freely reproduced without a license, from the viewpoint of copyright protection of the encrypted content data.

If it is determined in step S905 that n is not equal to P, the operation moves to a step S907. When it is determined in step S904 that the scramble flag of "0" is recorded in the header, controller 1106 sets n to "0" (step S906). Thus, the count of non-encrypted blocks is reset in controller 1106. When it is determined in step S905 that n is not equal to P, or after the step S906 is completed, controller 1106 supplies the block obtained from memory card 110 to content decrypting circuit 1540 (step S907). Steps S901–S907 are repeated until the end of data obtaining operation.

As described above, when a predetermined number (P) or more of non-encrypted blocks are continuously read from memory card 110, reproduction of the encrypted content data is stopped.

Figure 32:
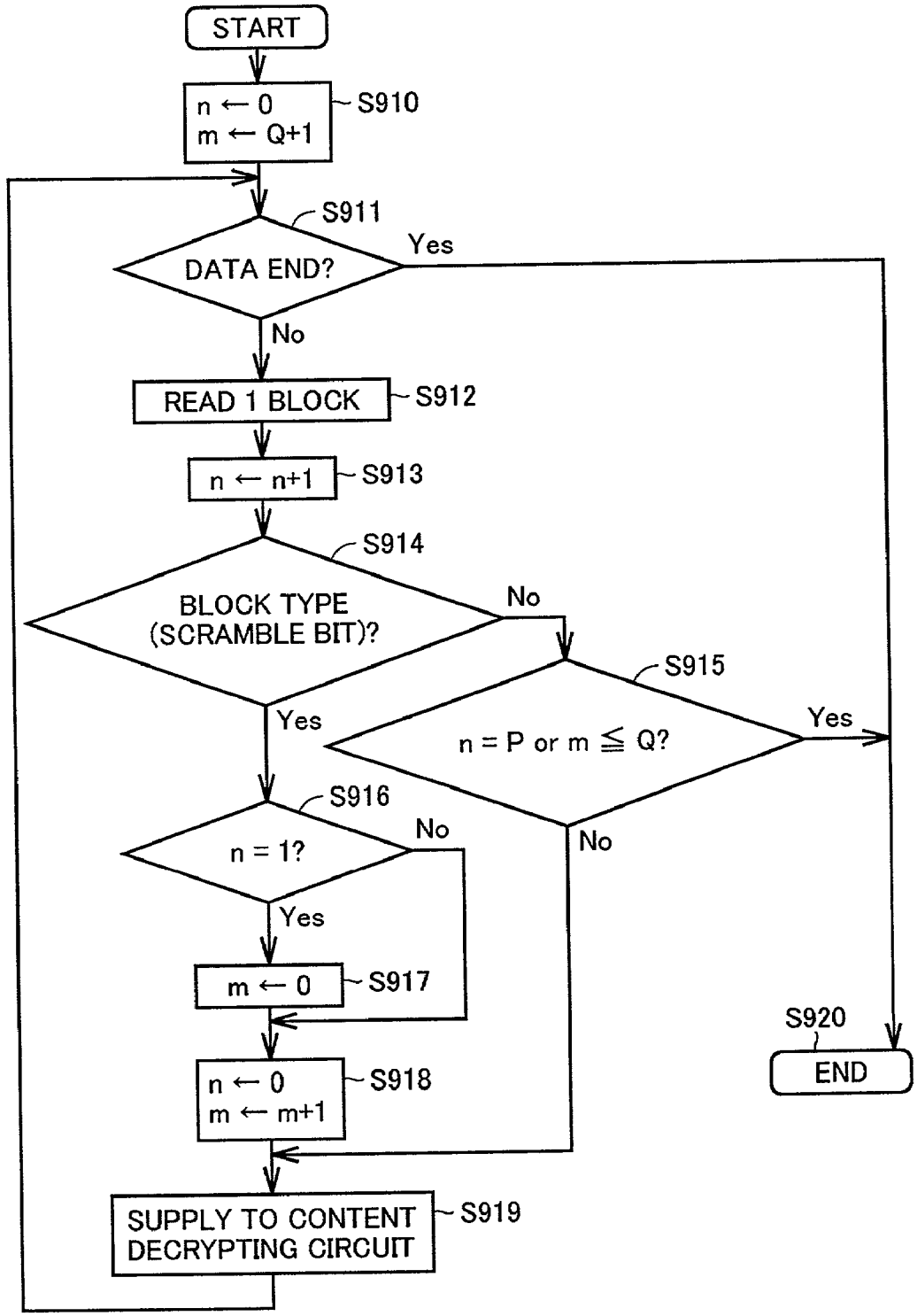
FIG. 32 is a flowchart showing an operation of the controller for detecting a predetermined number or less of encrypted blocks in the reproducing operation for each block of the encrypted content data.

In the invention, a method shown in FIG. 32 may be employed to stop the reproduction of the encrypted content data. FIG. 32 is a flowchart showing another manner of stopping the reproduction of encrypted content data by controller 1106. When the operation starts, controller 1106 sets n to "0", and sets m (m: natural number) to "Q+1" (step S910). Natural number m represents the number of continuous encrypted blocks.

Controller 1106 determines whether obtaining of data from memory card 110 is completed or not (step S911). If completed, the operation moves to a step S920, and the reproduction operation ends.

If it is determined in step S911 that the obtaining of data is not completed, controller 1106 reads one block from memory card 110 (step S912). When one block is read from memory card 110, controller 1106 adds 1 to n (step S913). Thereafter, controller 1106 determines from the scramble flag included in the header whether the block obtained from memory card 110 is encrypted or not (step S914). When the scramble flag is "0", it is determined whether either a relationship of n=P or a relationship of m≦Q is satisfied or not (step S915). If n=P and m≦Q, the operation moves to step S920, and the reproduction operation ends.

When non-encrypted blocks of P or more in number are continuously obtained from memory card 110 (i.e., when it is determined that the encrypted content data includes the non-encrypted blocks of P in number continuous to each other), or when encrypted blocks of Q or less in number are continuously obtained from memory card 110 (i.e., when it is determined that the encrypted content data includes the continuous non-encrypted blocks of Q or less in number), the reproduction of the encrypted content data is stopped. For the same reason as that already described, the reproduction of the encrypted content data is stopped when the non-encrypted blocks of P or more in number are continuously obtained from memory card 110. The reproduction of the encrypted content data is stopped when the encrypted blocks of Q or less in number are continuously obtained from memory card 110 although the number n of the continuous non-encrypted blocks is smaller than Q, as described above, The reason for this is as follows. If the number m of continuous encrypted blocks is equal to or smaller than Q, the number n of non-encrypted blocks is relatively large, and consequently the encrypted content data can be reproduced without obtaining the license, resulting in insufficient protection of the encrypted content data. In step S910, m is set to (Q+1) for the following reason. When the first block is determined as the non-encrypted block, m is equal to 0 so that m is set to (Q+1) for preventing stop of the reproduction of the encrypted content data even in this case.

It is necessary in the regular encrypted content data that the non-encrypted and encrypted blocks are arranged in advance in accordance with the above determination rules.

When it is determined in step S915 that n is not equal to P and m is larger than Q (not m≦Q), the operation moves to a step S919. When "1" is recorded in the scramble flag in step S914, controller 1106 determines whether n is equal to "1" or not (step S916), and the operation moves to a step S918 if n is not equal to 0. If n is equal to 0 in step S916, controller 1106 set m to 0 (step S917). The relationship of n=1 represents the fact that the last processed block is the encrypted block. The relationship of n≠1 represents the fact that the last processed block is the non-encrypted block. If n is equal to 1, the operation moves to a step S918. If n is not equal to 1 in step S916, controller 1106 sets m to "0" (step S917), and adds 1 to m (step S918).

Thereafter, controller 1106 supplies the blocks obtained from memory card 110 to content decrypting circuit 1540 (step S919). Steps S911–S919 are repeated.

Figure 33:
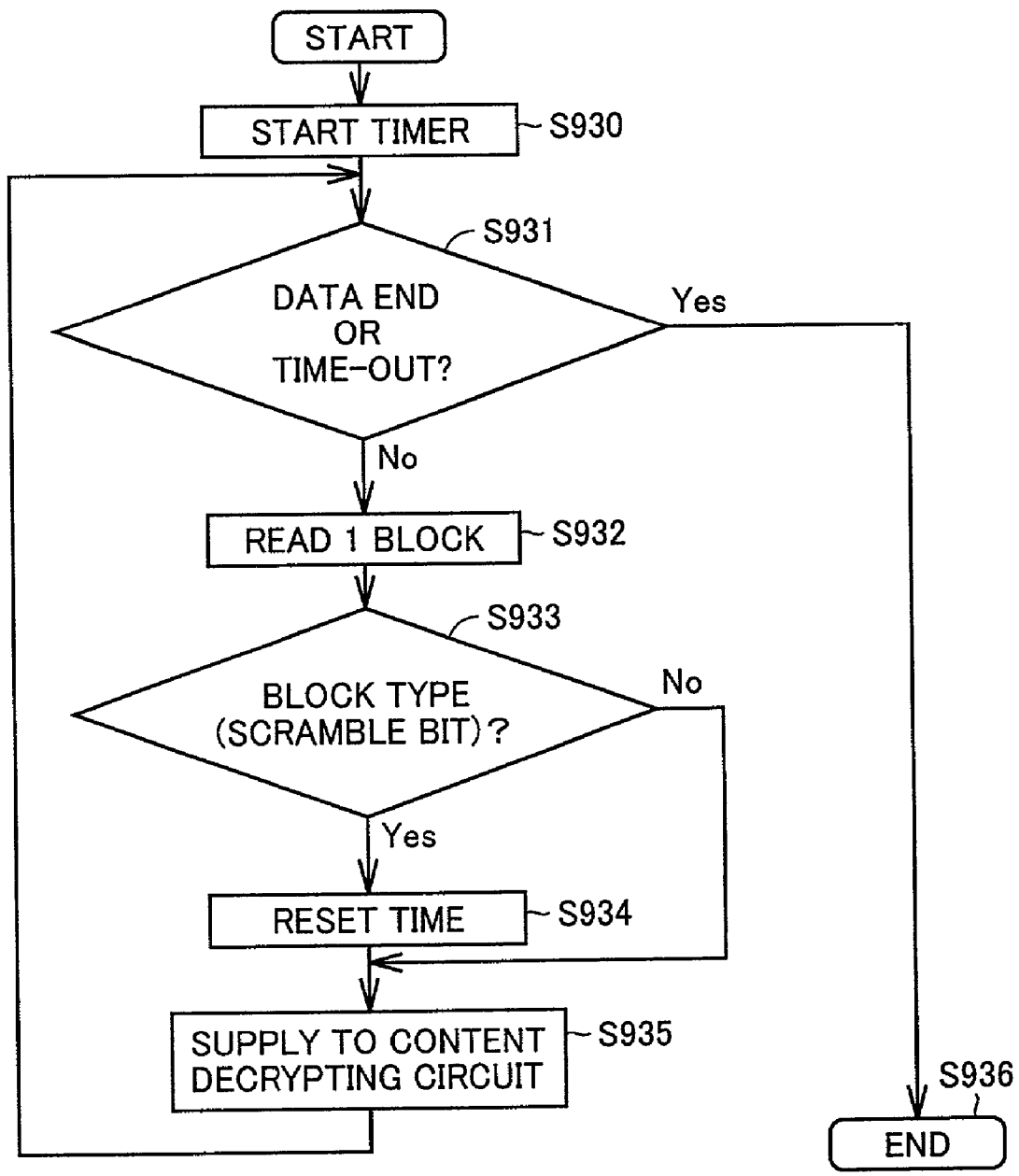
FIG. 33 is a flowchart showing an operation of the controller for detecting, based on a time, non-encrypted blocks in the reproducing operation for each block of the encrypted content data.

In the invention, reproduction of the encrypted content data may be stopped in a manner shown in FIG. 33. FIG. 33 is a flowchart showing an operation, in which the reproduction of the encrypted content data is stopped when controller 1106 continuously obtains the non-encrypted blocks from memory card 110 for a predetermined period.

When the operation starts, a timer (not shown) starts (step S930), and it is determined whether the obtaining of data is completed or not, or whether a time-out occurs (step S931). When the data obtaining operation is completed or the time-out occurs, the reproduction operation ends (step S936).

When it is determined in step S931 that the data obtaining operation is not completed and the time-out has not occurred, controller 1106 reads out one block from memory card 110 (step S932). Controller 1106 determines based on the scramble flag included in the header of the block whether the block is encrypted or not (step S933). When the read block is the non-encrypted block, the operation moves to a step S935. When the read block is the encrypted block in step S933, the timer is reset (step S934). Thereafter, controller 1106 supplies the read block to content decrypting circuit 1540 (step S935). Steps S931–S935 are repeated.

Figure 31:
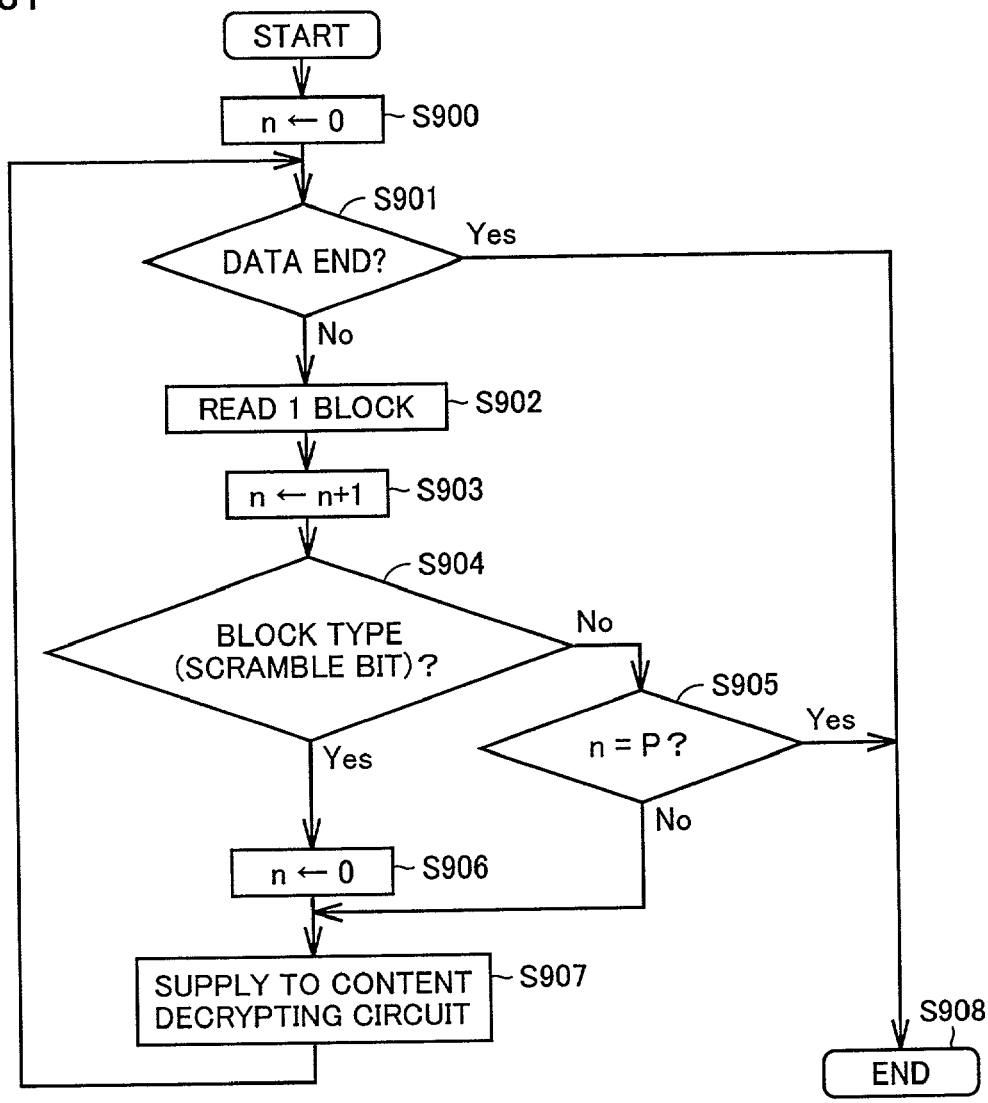
FIG. 31 is a flowchart showing an operation of a controller for detecting a predetermined number or more of non-encrypted blocks in the reproducing operation for each block of the encrypted content data.

The flowchart shown in FIG. 33 differs from the flowchart of FIG. 31 in that the detection of the continuous non-encrypted blocks of P or more in number is performed based on the time. The detection of the continuous non-encrypted blocks of P or more in number shown in FIG. 32 as well as the detection of the continuous encrypted blocks of Q or less in number can be performed based on the time. In the invention, both the determination of the number of blocks shown in FIG. 31 and the determination based on the time shown in FIG. 33 can be performed.

Figure 34:
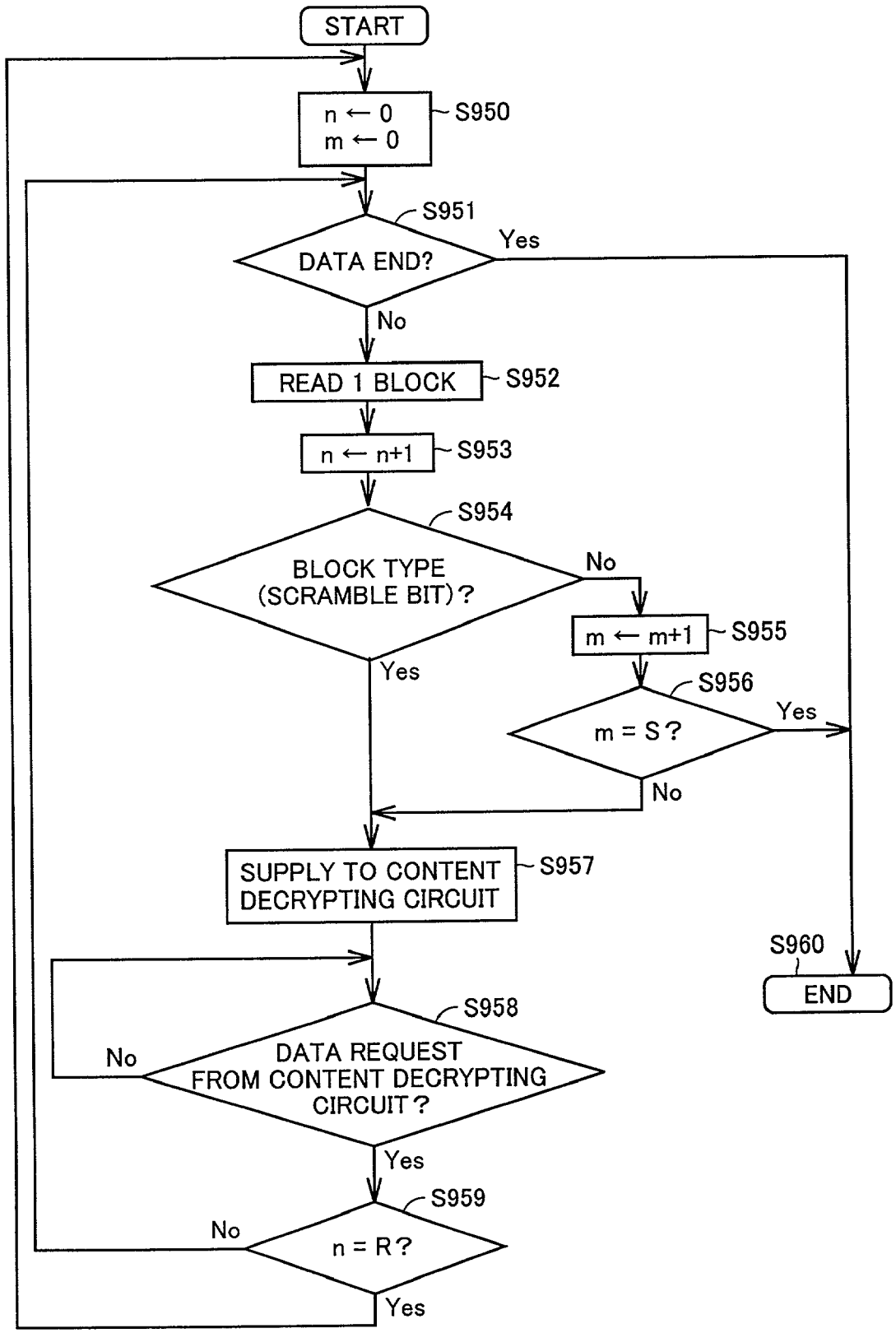
FIG. 34 is a flowchart showing an operation of the controller for detecting a predetermined number or more of non-encrypted blocks per another predetermined number of blocks in the reproducing operation for respective blocks of the encrypted content data.

In the invention, reproduction of the encrypted content data may be stopped in a method shown in FIG. 34. FIG. 34 is a flowchart showing further another manner of stopping the reproduction of the encrypted content data by controller 1106. The reproduction is stopped when the non-encrypted blocks of S (R>S) or more in number are present in the continuous R blocks forming the content data. The regular encrypted content data is configured to arrange the encrypted and non-encrypted blocks such that the encrypted blocks of (R−S) or more in number may be present in an arbitrary group of the continuous blocks of R in number. When the operation starts, controller 1106 sets n and m to 0 (step S950), where n is a variable for calculating the number of blocks, and m is a variable for counting the non-encrypted blocks.

Controller 1106 determines whether the operation of obtaining data from memory card 110 is completed or not (step S951). When completed, the operation moves to a step S960, and the reproduction operation ends.

If it is determined in step S951 that the data obtaining operation is not completed, controller 1106 reads one block from memory card 110 (step S952). When controller 1106 reads one block from memory card 110, it adds 1 to n (step S953). Thereafter, controller 1106 determines from the scramble flag included in the header whether the block obtained from memory card 110 is encrypted or not (step S954).

When it is determined in step S954 that the block is not encrypted, controller 1106 adds 1 to m (step S955). Controller 1106 determines whether m is equal to S or not (step S956). If m=S, the operation moves to step S960, and the reproduction operation ends. In this case, the non-encrypted blocks of S in number are continuously input to content decrypting circuit 1540. Therefore, control is performed to stop the reproduction of the encrypted content data, which can be freely reproduced without a license, from the viewpoint of copyright protection of the encrypted content data.

When it is determined in step S956 that m is not equal to S, the operation moves to step S957. When it is determined in step S954 that the scramble flag of 0 is recorded in the header, controller 1106 supplies the blocks to content decrypting circuit 1540 (step S957). Controller 1106 determines whether content decrypting circuit 1540 has requested the data or not (step S958). If there is no data request, step S958 is repeated until the request for data is issued.

If it is determined in step S958 that the data request is issued, controller 1106 determines whether n is equal to R (step S959). If n≠R, operations from step S951 to step S959 are repeated. If n=R in step S959, operations from step S950 to step S959 are repeated.

Accordingly, controller 1106 stops the reproduction of the encrypted content data when the number of continuous non-encrypted blocks reaches S (see step S956) while the number of blocks obtained from memory card 110 is smaller than R (n≠R in step S959). When the number of blocks obtained from memory card 110 reaches R (n=R in step S959), controller 1106 resets the number of blocks obtained from memory card 110.

According to the flowchart of FIG. 34, as described above, controller 1106 makes the determination about the plurality of blocks, into which the encrypted content data is divided, at a rate of R blocks per determination operation, and more specifically determines whether the non-encrypted blocks of S or more in number are present among the blocks of R in number. When the non-encrypted blocks of S or more in number are present among the R blocks, controller 1106 stops the reproduction of the encrypted content data.

Determination similar to that in FIG. 34 may be performed with a timer similar to that in FIG. 33. In this case, the non-encrypted blocks, which are present within a predetermined period (reproduction time for R blocks) indicated by the timer, are counted. The reproduction is stopped when presence of the non-encrypted blocks of R or more in number for the predetermined period is determined. After elapsing of the predetermined period, the count of the non-encrypted blocks is restored to 0 so that the regular encrypted content data according to the rules will be entirely reproduced.

Figure 35:
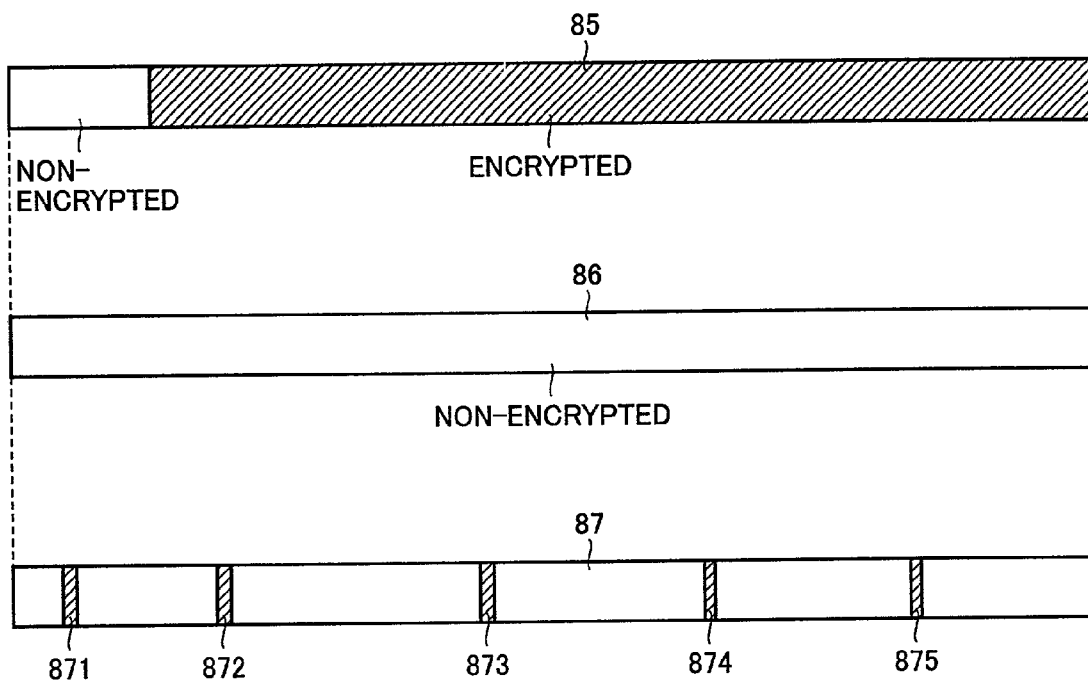
FIG. 35 conceptually shows content data.

According to the invention, as shown in FIG. 35, encrypted content data 85 including the encrypted portions of a predetermined number (or amount) or more is handled as the data to be reproduced, and content data 86 including no encrypted portion as well as content data 87, in which encrypted data 871–875 are present but are not continuous to each other, are not handled as the data to be reproduced. Content data 86 is not handled as the data to be reproduced in any of the flowcharts of FIGS. 31–34. Content data 87 is not handled as the data to be reproduced in the flowcharts of FIGS. 32–34.

According to the invention, as described above, the encrypted content data is reproduced without handling, as the data to be reproduced, the encrypted content data including a predetermined number or more of non-encrypted blocks as well as the encrypted content data including a predetermined number or less of the encrypted content data. Thereby, only the encrypted content data, which is produced based on the regular rules, can be reproduced, and the encrypted content data, which is produced and supplied in an invalid manner, cannot be reproduced. Further, the encrypted content data, which is produced based on the regular rules, necessarily requires the license key, and the license key can be obtained and utilized for reproduction only through the protected procedures. Therefore, the copyright of the encrypted content data can be protected.

Description has been given on the case where the encrypted content data recorded in memory card 110 is reproduced by reproduction terminal 102. However, the encrypted content data administered by license administration module 511 in personal computer 50 can likewise be reproduced.

In the invention, detection of the non-encrypted content data may be performed based on the number of blocks, and also may be performed based on the time. Thus, the reproducing device according to the invention may be merely required to stop the reproduction of the encrypted content data when the non-encrypted content data of a predetermined length or more is detected, or when only the encrypted content data of a predetermined length or less can be detected.

In the foregoing description, controller 1106 determines the possibility of reproduction based on the scramble flag. Alternatively, such a structure may be employed that performs similar determination by controller 1514 in content decrypting circuit 1540.

Figure 36:
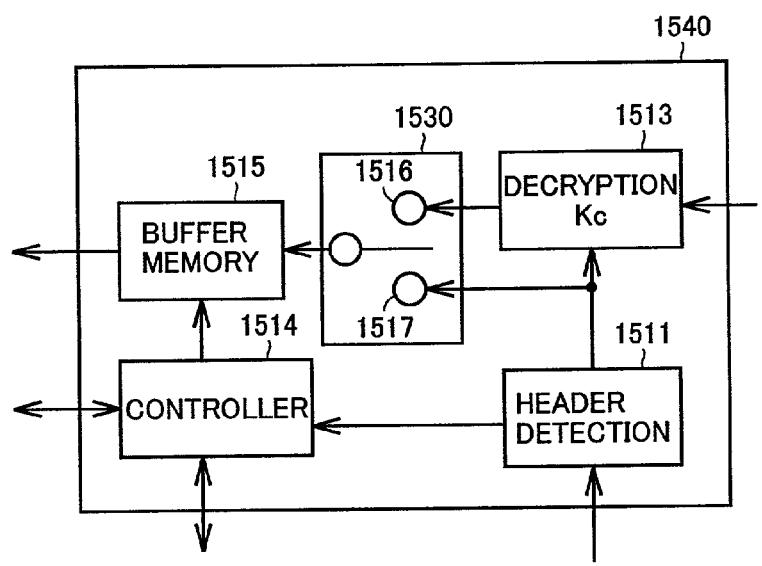
FIG. 36 is another block diagram of a content decrypting circuit.
Figure 37:
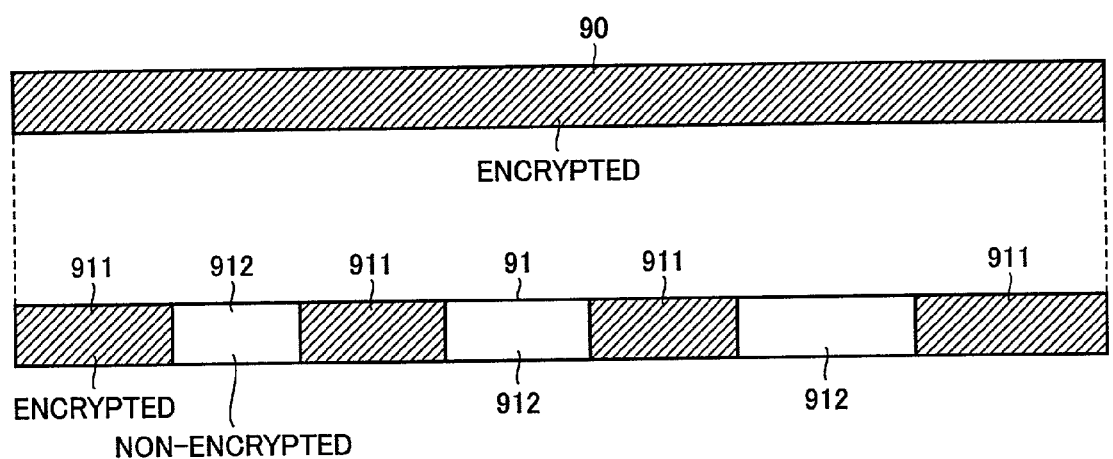
FIG. 37 conceptually shows content data.
Figure 38:
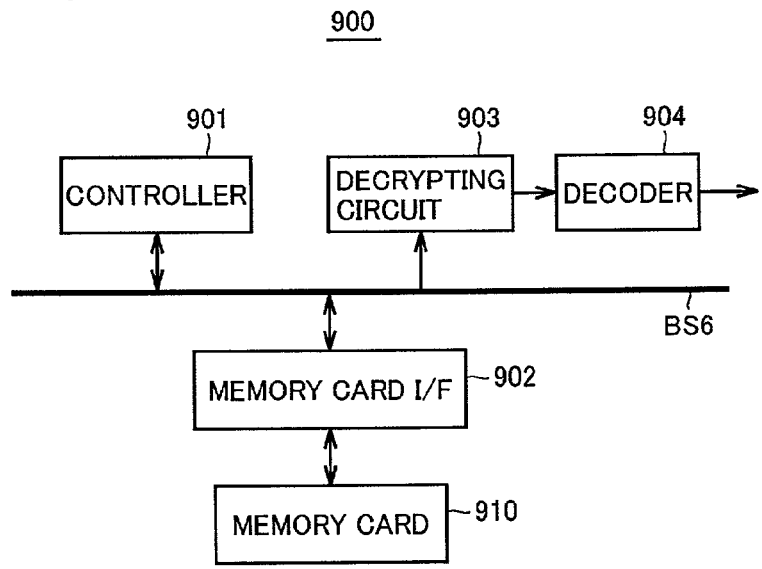
FIG. 38 is a schematic block diagram of a conventional reproducing device.
Figure 39:
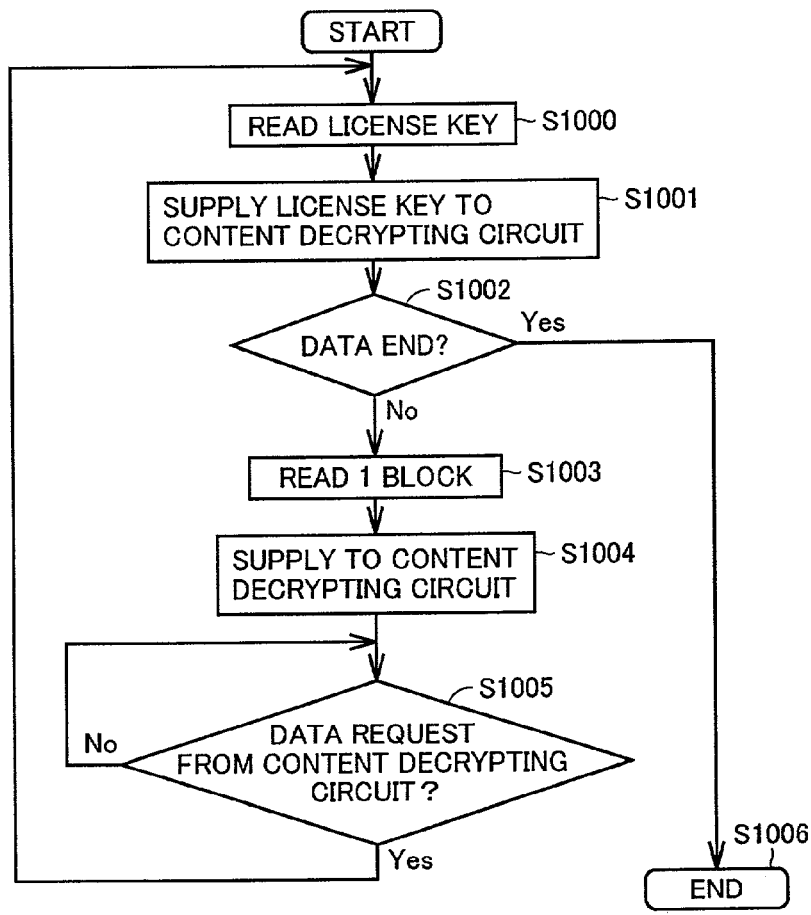
FIG. 39 is a flowchart showing a conventional operation of a controller in a reproducing operation for each block of the encrypted content data.

In the invention, content decrypting circuit 1540 may have a structure shown in FIG. 36. In contrast to with the structure shown in FIG. 8, the structure in FIG. 36 is not provided with delay unit 1512, and is additionally provided with buffer memory 1515 at the rear of switch 1530. In the content decrypting circuit shown in FIG. 36, header detecting circuit 1511 outputs the block supplied thereto to decryption processing unit 1513 if the supplied block is encrypted, and outputs the block supplied thereto to terminal 1517 of switch 1530 if the supplied block is not encrypted. Buffer memory 1515 stores the content data sent from switch 1530, and adjusts the timing between the content data sent from terminal 1516 and content data sent from terminal 1517 for supplying the content data to music reproduction unit 1518 (see FIG. 8). In content decrypting circuit 1540 shown in FIG. 38, it is not necessary to delay the content data included in the non-encrypted block for a predetermined time, in contrast to the content decrypting circuit shown in FIG. 8.

The content decrypting circuit shown in FIG. 36 performs the operation similar to that of the content decrypting circuit shown in FIG. 8.

As describe above, the encrypted and non-encrypted blocks may be arranged in accordance with the following rules:

(1) The predetermined number or more of non-encrypted blocks of a predetermined value or more in number are not continuously arranged, or the non-encrypted blocks are not arranged to allow continuous reproduction for a predetermined time or more.

(2) The predetermined number of more of non-encrypted blocks of a predetermined value or more in number are not continuously arranged, and the predetermined number of more of encrypted blocks of a predetermined value of more in number are necessarily and continuously arranged. Thus, such an arrangement is employed that the reproduction of the non-encrypted blocks cannot be continuously performed for a first predetermined time, and the reproduction time of the continuous encrypted blocks may be longer than the first predetermined time.

(3) A constant number of more of the encrypted blocks are arranged within the predetermined number of continuous blocks in the encrypted content data or within a predetermined reproduction period. Preferably, the constant number of encrypted blocks are arranged within the predetermined number of continuous blocks or within any reproduction period, regardless of the value of the predetermined number.

These rules have been described with reference to FIGS. 31–34. More specifically, the following manners of determination and processing, which are performed at the time of reproducing the encrypted content data, have been described with reference to the flowcharts.

(1) When it is determined that the predetermined number or more of the non-encrypted blocks are continuously arranged, or the non-encrypted blocks for reproduction for the predetermined time or more are continuously arranged, the supply of the next block is stopped, and the reproduction is stopped (see FIGS. 31 and 33).

(2) When it is determined that the predetermined number or more of the non-encrypted blocks are continuously arranged, or only the predetermined number or less of the encrypted block are continuously arranged, the supply of the next block is stopped, and the reproduction is stopped (see FIG. 32).

(3) When it is determined that the predetermined number or more of encrypted blocks are arranged within the predetermined number of continuous blocks or within the predetermined reproduction period, the supply of the next block is stopped, and the reproduction is stopped (see FIG. 34).

However, the foregoing manners do not restrict the manners of determination processing. In the respective manners already described, the non-encrypted blocks may be counted during reproduction of the encrypted content data according to the regular rules, and, if necessary or preferable, the counting of the encrypted blocks may be performed. Based on these counting, it may be determined whether the encrypted content data is prepared according to the regular rules or not. If it is determined that the encrypted content data is not prepared according to the regular rules, the reproduction processing is stopped. The determination may be performed in any manner provided that reproduction processing can be stopped as described above.

According to the embodiments of the invention, the encrypted content data, which is received in the memory card in various manners, can be reproduced only when the encrypted content data includes the encrypted data at a predetermined rate or more.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reproducing device for decrypting and reproducing encrypted content data divided into a plurality of blocks formed of an encrypted block including encrypted data and a non-encrypted block including non-encrypted data, comprising:
- a decrypting circuit for detecting whether each of said plurality of blocks is said encrypted block or said non-encrypted block, and operating:
  - (1) in the case of the encrypted block, to decrypt said encrypted data and output the resulting non-encrypted data: and
  - (2) in the case of the non-encrypted block, to output said non-encrypted data from the non-encrypted block; and
- a control circuit, wherein
- said control circuit receives a result of detection in said decrypting circuit, and stops supplying said block to said decrypting circuit when the number of the detected non-encrypted blocks in said content data is equal to or larger than a predetermined non-zero number.

2. The reproducing device according to claim 1, wherein said control circuit stops supplying said block to said decrypting circuit when the number of the non-encrypted blocks which are consecutively detected in said content data is equal to or larger than a predetermined non-zero number.

3. The reproducing device according to claim 1, wherein said control circuit stops supplying said block to said decrypting circuit when the number of the non-encrypted blocks which are consecutively detected in said content data is equal to or larger than a first predetermined non-zero number, or when the number of the encrypted blocks which are consecutively detected in said content data is equal to or smaller than a second predetermined non-zero number.

4. The reproducing device according to claim 1, wherein said control circuit stops supplying said block to said decrypting circuit when the number of the non-encrypted blocks which are detected among a predetermined non-zero number of said blocks in said content data is equal to or larger than a predetermined non-zero number.

5. The reproducing device according to claim 1, wherein said control circuit stops supplying said block to said decrypting circuit when said non-encrypted blocks are consecutively detected for a predetermined non-zero period.

6. The reproducing device according to claim 1, wherein said control circuit stops supplying said block to said decrypting circuit when said non-encrypted blocks are consecutively detected for a first predetermined non-zero period, or when said encrypted blocks are not consecutively detected for a period equal to a second predetermined non-zero period.

7. The reproducing device according to claim 1, wherein said control circuit stops supplying said block to said decrypting circuit when the number of said non-encrypted blocks detected for a predetermined non-zero period is equal to or larger than a predetermined non-zero number.

8. The reproducing device according to claim 2, wherein said control circuit further stops supplying said block to said decrypting circuit when said non-encrypted blocks are consecutively detected for a predetermined non-zero period.

9. The reproducing device according to claim 3, wherein said control circuit further stops supplying said block to said decrypting circuit when said non-encrypted blocks are consecutively detected for a predetermined non-zero period.

10. The reproducing device according to claim 1, wherein each of said plurality of blocks includes:
- a data region storing said encrypted data or said non-encrypted data, and
- a header region storing a first flag indicating the fact that said data region includes said encrypted data, or a second flag indicating the fact that said data region includes said non-encrypted data; and
- said decrypting circuit detects said first or second flag to detect whether each of said blocks is the encrypted block or the non-encrypted block.

11. The reproducing device according to claim 2, wherein each of said plurality of blocks includes:
- a data region storing said encrypted data or said non-encrypted data, and
- a header region storing a first flag indicating the fact that said data region includes said encrypted data, or a second flag indicating the fact that said data region includes said non-encrypted data; and
- said decrypting circuit detects said first or second flag to detect whether each of said blocks is the encrypted block or the non-encrypted block.

12. The reproducing device according to claim 3, wherein each of said plurality of blocks includes:
- a data region storing said encrypted data or said non-encrypted data, and
- a header region storing a first flag indicating the fact that said data region includes said encrypted data, or a second flag indicating the fact that said data region includes said non-encrypted data; and
- said decrypting circuit detects said first or second flag to detect whether each of said blocks is the encrypted block or the non-encrypted block.

13. The reproducing device according to claim 4, wherein each of said plurality of blocks includes:
- a data region storing said encrypted data or said non-encrypted data, and
- a header region storing a first flag indicating the fact that said data region includes said encrypted data, or a second flag indicating the fact that said data region includes said non-encrypted data; and
- said decrypting circuit detects said first or second flag to detect whether each of said blocks is the encrypted block or the non-encrypted block.

14. The reproducing device according to claim 5, wherein each of said plurality of blocks includes:
- a data region storing said encrypted data or said non-encrypted data, and
- a header region storing a first flag indicating the fact that said data region includes said encrypted data, or a second flag indicating the fact tat said data region includes said non-encrypted data; and
- said decrypting circuit detects said first or second flag to detect whether each of said blocks is the encrypted block or the non-encrypted block.

15. The reproducing device according to claim 6, wherein each of said plurality of blocks includes:
- a data region storing said encrypted data or said non-encrypted data, and
- a header region storing a first flag indicating the fact that said data region includes said encrypted data, or a second flag indicating the fact that said data region includes said non-encrypted data; and
- said decrypting circuit detects said first or second flag to detect whether each of said blocks is the encrypted block or the non-encrypted block.

16. The reproducing device according to claim 7, wherein each of said plurality of blocks includes:
a data region storing said encrypted data or said non-encrypted data, and
a header region storing a first flag indicating the fact that said data region includes said encrypted data, or a second flag indicating the fact that said data region includes said non-encrypted data; and
said decrypting circuit detects said first or second flag to detect whether each of said blocks is the encrypted block or the non-encrypted block.

17. The reproducing device according to claim 8, wherein each of said plurality of blocks includes:
a data region storing said encrypted data or said non-encrypted data, and
a header region storing a first flag indicating the fact that said data region includes said encrypted data, or a second flag indicating the fact that said data region includes said non-encrypted data; and
said decrypting circuit detects said first or second flag to detect whether each of said blocks is the encrypted block or the non-encrypted block.

18. The reproducing device according to claim 9, wherein each of said plurality of blocks includes:
a data region storing said encrypted data or said non-encrypted data, and
a header region storing a first flag indicating the fact tat said data region includes said encrypted data, or a second flag indicating the fact tat said data region includes said non-encrypted data; and
said decrypting circuit detects said first or second flag to determine whether each of said blocks is the encrypted block or the non-encrypted block.

19. The reproducing device according to claim 10, wherein
said encrypted content data is prepared by dividing the encoded content data prepared by encoding source data in a predetermined encoding format into a plurality of blocks, and selectively encrypting said blocks on the block-by-block basis;
said reproducing device further comprises a decoder for decoding said encoded content data in accordance with said predetermined encoding format and reproducing the source data; and
said decrypting circuit includes:
a header detection unit for detecting said header region from each of said plurality of blocks, outputting a first signal when said first flag is recorded in the detected header region, outputting a second signal when a second flag is recorded in said header region, and outputting said encrypted data or said non-encrypted data included in each of said blocks,
a decryption unit for decrypting said encrypted data and outputting the non-encrypted data, and
a selection unit for selecting the non-encrypted data sent from said decryption unit in accordance with said first signal for output to said decoder, and selecting said non-encrypted data in accordance with said second signal for output to said decoder.

20. The reproducing device according to claim 19, wherein
said decrypting circuit further includes a delay unit for delaying the non-encrypted data in the data region output from said header detection unit, and
said delay unit delays said non-encrypted data by a time corresponding to a decrypting time of said encrypted content data in said decryption unit.

21. The reproducing device according to claim 1, wherein
said encrypted content data and a license key for decrypting said encrypted content data are recorded in a data recording device; and said control circuit reads said license key from the data recording device for applying said license key to said decrypting circuit, and reads one block from said data recording device for applying said one block to said decrypting circuit upon every reception of an input request for each of said blocks from said decrypting circuit.

* * * * *